US011201981B1

(12) United States Patent
Suiter et al.

(10) Patent No.: US 11,201,981 B1
(45) Date of Patent: Dec. 14, 2021

(54) SYSTEM FOR NOTIFICATION OF USER ACCESSIBILITY OF CURATED LOCATION-DEPENDENT CONTENT IN AN AUGMENTED ESTATE

(71) Applicant: Pipbin, Inc., Omaha, NE (US)

(72) Inventors: Maximillian John Suiter, Omaha, NE (US); Sean Patrick Suiter, Omaha, NE (US); Ian Padraic Suiter, Omaha, NE (US); Valerie Michele Morrison, Columbus, MT (US); Scott David Morrison, Columbus, MT (US)

(73) Assignee: Pipbin, Inc., Omaha, NE (US)

( * ) Notice: Subject to any disclaimer, the term of this patent is extended or adjusted under 35 U.S.C. 154(b) by 0 days.

(21) Appl. No.: 16/660,276

(22) Filed: Oct. 22, 2019

Related U.S. Application Data

(63) Continuation-in-part of application No. 16/155,661, filed on Oct. 9, 2018, now Pat. No. 10,839,219, which
(Continued)

(51) Int. Cl.
*H04N 1/21* (2006.01)
*G06F 3/0481* (2013.01)
(Continued)

(52) U.S. Cl.
CPC .......... *H04N 1/2125* (2013.01); *G06F 3/011* (2013.01); *G06F 3/04817* (2013.01);
(Continued)

(58) Field of Classification Search
CPC ................. H04N 1/2125; H04N 1/212; H04N 2201/0084; H04N 5/232939;
(Continued)

(56) References Cited

U.S. PATENT DOCUMENTS 4,581,634 A   4/1986  Williams
4,975,690 A   12/1990 Torres
(Continued)

FOREIGN PATENT DOCUMENTS

CA    2804096 C    1/2012
CA    2863124 A1   7/2015
(Continued)

OTHER PUBLICATIONS

A Whole New Story, [Online]. Retrieved from the Internet: <https://www.snap.com/en-US/news/>, (2017), 13 pgs.
(Continued)

*Primary Examiner* — Albert H Cutler
(74) *Attorney, Agent, or Firm* — Suiter Swantz pc llo

(57) ABSTRACT

A device for recording filterable content tagged to a location or object and available when a user is notified they are proximate to relevant filterable content. The filterable content preferably includes a location, a product or a service purchase fact, a coupon, an advertisement, a promotional offer, a public transportation advisement, a travel advisement, a review, a moment proximity alert, a monetary amount, a map of locations where moments were created by a specific user, a time certification, a resume, a biography, a headshot, a moment "like" notification, a riddle, a challenge, textual material, an audio file, a video file, or a multimedia file.

18 Claims, 63 Drawing Sheets
(1 of 63 Drawing Sheet(s) Filed in Color)

Related U.S. Application Data is a continuation of application No. 15/478,973, filed on Apr. 4, 2017, now Pat. No. 10,223,738, which is a continuation-in-part of application No. 15/231,241, filed on Aug. 8, 2016, now Pat. No. 10,334,134, application No. 16/660,276, which is a continuation-in-part of application No. 16/167,227, filed on Oct. 22, 2018, now Pat. No. 10,805,696, which is a continuation-in-part of application No. 16/155,661, filed on Oct. 9, 2018, now Pat. No. 10,839,219, and a continuation-in-part of application No. 15/469,245, filed on Mar. 24, 2017, now Pat. No. 10,108,859, and a continuation-in-part of application No. 15/231,241, filed on Aug. 8, 2016, now Pat. No. 10,334,134.

(60) Provisional application No. 62/352,433, filed on Jun. 20, 2016.

(51) Int. Cl.
| | |
|---|---|
| *G06T 19/00* | (2011.01) |
| *H04N 5/232* | (2006.01) |
| *G06F 3/01* | (2006.01) |
| *G06K 9/00* | (2006.01) |
| *H04N 1/00* | (2006.01) |
| *G06Q 30/06* | (2012.01) |
| *G06F 40/169* | (2020.01) |
| *G06Q 30/08* | (2012.01) |
| *H04W 4/02* | (2018.01) |
| *G06F 16/78* | (2019.01) |

(52) U.S. Cl.
CPC ............ *G06F 16/78* (2019.01); *G06F 40/169* (2020.01); *G06K 9/00671* (2013.01); *G06K 9/00684* (2013.01); *G06Q 30/0639* (2013.01); *G06Q 30/08* (2013.01); *G06T 19/006* (2013.01); *H04N 1/00244* (2013.01); *H04N 1/212* (2013.01); *H04N 5/23293* (2013.01); *H04W 4/025* (2013.01); *H04N 5/232939* (2018.08); *H04N 2201/0084* (2013.01)

(58) Field of Classification Search
CPC ........... H04N 5/23293; H04N 1/00244; G06K 9/00671; G06K 9/00684; G06F 3/04817; G06F 40/169; G06F 3/011; G06F 16/78; H04W 4/025; G06Q 30/08; G06Q 30/0639; G06T 19/006
See application file for complete search history.

(56) References Cited

U.S. PATENT DOCUMENTS

| | | |
|---|---|---|
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Ben-Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,349,203 B1 | 2/2002 | Asaoka et al. |
| 6,446,004 B1 | 9/2002 | Cao et al. |
| 6,449,657 B2 | 9/2002 | Stanbach, Jr. et al. |
| 6,456,852 B2 | 9/2002 | Bar et al. |
| 6,484,196 B1 | 11/2002 | Maurille |
| 6,523,008 B1 | 2/2003 | Avrunin et al. |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,257 B1 | 1/2004 | Camut et al. |
| 6,698,020 B1 | 2/2004 | Zigmond et al. |
| 6,700,506 B1 | 3/2004 | Winkler et al. |
| 6,724,403 B1 | 4/2004 | Santoro et al. |
| 6,757,713 B1 | 6/2004 | Ogilvie et al. |
| 6,834,195 B2 | 12/2004 | Brandenberg et al. |
| 6,836,792 B1 | 12/2004 | Chen |
| 6,898,626 B2 | 5/2005 | Ohashi |
| 6,970,088 B2 | 11/2005 | Kovach |
| 6,980,909 B2 | 12/2005 | Root et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,203,380 B2 | 4/2007 | Chiu et al. |
| 7,206,568 B2 | 4/2007 | Sudit |
| 7,227,937 B1 | 6/2007 | Yoakum et al. |
| 7,269,426 B2 | 9/2007 | Kokkonen et al. |
| 7,315,823 B2 | 1/2008 | Brondrup |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,607,096 B2 | 10/2009 | Oreizy et al. |
| 7,639,943 B1 | 12/2009 | Kalajan |
| 7,668,537 B2 | 2/2010 | De Vries |
| 7,770,137 B2 | 8/2010 | Forbes et al. |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 8,001,204 B2 | 8/2011 | Burtner et al. |
| 8,082,255 B1 | 12/2011 | Carlson, Jr. et al. |
| 8,098,904 B2 | 1/2012 | Ioffe et al. |
| 8,099,109 B2 | 1/2012 | Altman et al. |
| 8,131,597 B2 | 3/2012 | Hudetz et al. |
| 8,135,166 B2 | 3/2012 | Rhoads et al. |
| 8,136,028 B1 | 3/2012 | Loeb et al. |
| 8,146,001 B1 | 3/2012 | Reese |
| 8,161,417 B1 | 4/2012 | Lee |
| 8,195,203 B1 | 6/2012 | Tseng |
| 8,214,443 B2 | 7/2012 | Hamburg |
| 8,276,092 B1 | 9/2012 | Narayanan et al. |
| 8,279,319 B2 | 10/2012 | Date |
| 8,285,199 B2 | 10/2012 | Hsu et al. |
| 8,306,922 B1 | 11/2012 | Kunal et al. |
| 8,312,097 B1 | 11/2012 | Siegel et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,405,773 B2 | 3/2013 | Hayashi et al. |
| 8,418,067 B2 | 4/2013 | Cheng et al. |
| 8,471,914 B2 | 6/2013 | Sakiyama et al. |
| 8,472,935 B1 | 6/2013 | Fujisaki |
| 8,560,612 B2 | 10/2013 | Kilmer et al. |
| 8,639,803 B2 | 1/2014 | Moritz et al. |
| 8,660,358 B1 | 2/2014 | Bergboer et al. |
| 8,660,793 B2 | 2/2014 | Ngo et al. |

(56) References Cited

U.S. PATENT DOCUMENTS

| | | | |
|---|---|---|---|
| 8,681,178 B1 * | 3/2014 | Tseng | G06T 19/006 345/633 |
| 8,694,026 B2 | 4/2014 | Forstall et al. | |
| 8,718,333 B2 | 5/2014 | Wolf et al. | |
| 8,744,523 B2 | 6/2014 | Fan et al. | |
| 8,761,800 B2 | 6/2014 | Kuwahara | |
| 8,788,680 B1 | 7/2014 | Naik | |
| 8,790,187 B2 | 7/2014 | Walker et al. | |
| 8,797,415 B2 | 8/2014 | Arnold | |
| 8,798,646 B1 | 8/2014 | Wang et al. | |
| 8,856,349 B2 | 10/2014 | Jain et al. | |
| 8,909,725 B1 | 12/2014 | Sehn | |
| 8,910,081 B2 | 12/2014 | Fennel | |
| 9,015,285 B1 | 4/2015 | Ebsen et al. | |
| 9,040,574 B2 | 5/2015 | Wang et al. | |
| 9,104,293 B1 | 8/2015 | Kofeld et al. | |
| 9,131,342 B2 | 9/2015 | Forstall et al. | |
| 9,152,477 B1 | 10/2015 | Campbell et al. | |
| 9,225,897 B1 | 12/2015 | Sehn | |
| 9,258,373 B2 | 2/2016 | Harris et al. | |
| 9,258,459 B2 | 2/2016 | Hartley | |
| 9,396,354 B1 | 7/2016 | Murphy et al. | |
| 9,430,783 B1 | 8/2016 | Sehn | |
| 9,459,778 B2 | 10/2016 | Hogeg et al. | |
| 9,521,515 B2 | 12/2016 | Zimerman et al. | |
| 9,537,811 B2 | 1/2017 | Allen et al. | |
| 9,584,694 B2 | 2/2017 | Ito et al. | |
| 9,626,070 B2 | 4/2017 | Cowles et al. | |
| 9,628,950 B1 | 4/2017 | Noeth et al. | |
| 9,652,896 B1 | 5/2017 | Jurgenson et al. | |
| 9,681,265 B1 | 6/2017 | Davis et al. | |
| 9,710,554 B2 | 7/2017 | Sandberg | |
| 9,736,371 B2 | 8/2017 | Taneichi et al. | |
| 9,736,518 B2 | 8/2017 | Houston et al. | |
| 9,754,355 B2 | 9/2017 | Chang et al. | |
| 9,756,373 B2 | 9/2017 | Houston et al. | |
| 9,792,876 B2 | 10/2017 | Xie et al. | |
| 9,823,803 B2 | 11/2017 | Tseng | |
| 9,843,720 B1 | 12/2017 | Ebsen et al. | |
| 9,852,543 B2 | 12/2017 | Hare et al. | |
| 9,854,219 B2 | 12/2017 | Sehn | |
| 9,881,094 B2 | 1/2018 | Pavlovskaia et al. | |
| 9,936,333 B2 | 4/2018 | Lau et al. | |
| 9,978,125 B1 | 5/2018 | Chang et al. | |
| 9,984,499 B1 | 5/2018 | Jurgenson et al. | |
| 10,055,895 B2 | 8/2018 | Li et al. | |
| 10,078,863 B2 | 9/2018 | Loganathan | |
| 10,083,245 B1 | 9/2018 | Jezewski | |
| 10,102,423 B2 | 10/2018 | Shaburov et al. | |
| 10,102,447 B1 | 10/2018 | Gusarov | |
| 10,108,859 B1 | 10/2018 | Suiter et al. | |
| 10,123,166 B2 | 11/2018 | Zimerman et al. | |
| 10,135,949 B1 | 11/2018 | Pavlovskaia et al. | |
| 10,157,333 B1 | 12/2018 | Wang et al. | |
| 10,203,855 B2 | 2/2019 | Al Majid et al. | |
| 10,206,059 B1 | 2/2019 | Tseng | |
| 10,219,111 B1 | 2/2019 | Chen et al. | |
| 10,223,397 B1 | 3/2019 | Sehn et al. | |
| 10,229,717 B1 | 3/2019 | Davis | |
| 10,244,186 B1 | 3/2019 | Chen et al. | |
| 10,270,839 B2 | 4/2019 | Andreou et al. | |
| 10,285,001 B2 | 5/2019 | Allen et al. | |
| 10,311,916 B2 | 6/2019 | Sehn | |
| 10,318,574 B1 | 6/2019 | Bonechi et al. | |
| 10,319,149 B1 | 6/2019 | Cowburn et al. | |
| 10,327,096 B1 | 6/2019 | Ahmed et al. | |
| 10,338,773 B2 | 7/2019 | Murarka et al. | |
| 10,339,365 B2 | 7/2019 | Gusarov et al. | |
| 10,349,209 B1 | 7/2019 | Noeth et al. | |
| 10,354,425 B2 | 7/2019 | Yan et al. | |
| 10,360,708 B2 | 7/2019 | Bondich et al. | |
| 10,366,543 B1 | 7/2019 | Jurgenson et al. | |
| 10,382,373 B1 | 8/2019 | Yang et al. | |
| 10,387,514 B1 | 8/2019 | Yang et al. | |
| 10,387,730 B1 | 8/2019 | Cowburn et al. | |
| 10,397,469 B1 | 8/2019 | Yan et al. | |
| 10,402,650 B1 | 9/2019 | Suiter et al. | |
| 10,423,983 B2 | 9/2019 | Shim et al. | |
| 10,430,838 B1 | 10/2019 | Andreou | |
| 10,448,201 B1 | 10/2019 | Sehn et al. | |
| 2002/0047868 A1 | 4/2002 | Miyazawa | |
| 2002/0087631 A1 | 7/2002 | Sharma | |
| 2002/0097257 A1 | 7/2002 | Miller et al. | |
| 2002/0122659 A1 | 9/2002 | McGrath et al. | |
| 2002/0144154 A1 | 10/2002 | Tomkow | |
| 2003/0001846 A1 | 1/2003 | Davis et al. | |
| 2003/0016247 A1 | 1/2003 | Lai et al. | |
| 2003/0017823 A1 | 1/2003 | Mager et al. | |
| 2003/0020623 A1 | 1/2003 | Cao et al. | |
| 2003/0023874 A1 | 1/2003 | Prokupets et al. | |
| 2003/0052925 A1 | 3/2003 | Daimon et al. | |
| 2003/0126215 A1 | 7/2003 | Udell et al. | |
| 2003/0148773 A1 | 8/2003 | Spriestersbach et al. | |
| 2003/0164856 A1 | 9/2003 | Prager et al. | |
| 2003/0229607 A1 | 12/2003 | Zellweger et al. | |
| 2004/0027371 A1 | 2/2004 | Jaeger | |
| 2004/0078367 A1 | 4/2004 | Anderson et al. | |
| 2004/0111467 A1 | 6/2004 | Willis | |
| 2004/0158739 A1 | 8/2004 | Wakai et al. | |
| 2004/0189465 A1 | 9/2004 | Capobianco et al. | |
| 2004/0203959 A1 | 10/2004 | Coombes | |
| 2004/0215625 A1 | 10/2004 | Svendsen et al. | |
| 2004/0243531 A1 | 12/2004 | Dean | |
| 2005/0022211 A1 | 1/2005 | Veselov et al. | |
| 2005/0048989 A1 | 3/2005 | Jung | |
| 2005/0078804 A1 | 4/2005 | Yomoda | |
| 2005/0097176 A1 | 5/2005 | Schatz et al. | |
| 2005/0104976 A1 | 5/2005 | Currans | |
| 2005/0114783 A1 | 5/2005 | Szeto | |
| 2005/0119936 A1 | 6/2005 | Buchanan et al. | |
| 2005/0122405 A1 | 6/2005 | Voss et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson et al. | |
| 2005/0223066 A1 | 10/2005 | Buchheit et al. | |
| 2005/0288954 A1 | 12/2005 | McCarthy et al. | |
| 2006/0026067 A1 | 2/2006 | Nicholas et al. | |
| 2006/0107297 A1 | 5/2006 | Toyama et al. | |
| 2006/0114338 A1 | 6/2006 | Rothschild | |
| 2006/0119882 A1 | 6/2006 | Harris et al. | |
| 2006/0242239 A1 | 10/2006 | Morishima et al. | |
| 2006/0252438 A1 | 11/2006 | Ansamaa et al. | |
| 2006/0270419 A1 | 11/2006 | Crowley et al. | |
| 2006/0287878 A1 | 12/2006 | Wadhwa et al. | |
| 2007/0004426 A1 | 1/2007 | Pfleging et al. | |
| 2007/0032244 A1 | 2/2007 | Counts et al. | |
| 2007/0040931 A1 | 2/2007 | Nishizawa | |
| 2007/0073517 A1 | 3/2007 | Panje | |
| 2007/0073823 A1 | 3/2007 | Cohen et al. | |
| 2007/0075898 A1 | 4/2007 | Markhovsky et al. | |
| 2007/0082707 A1 | 4/2007 | Flynt et al. | |
| 2007/0136228 A1 | 6/2007 | Petersen | |
| 2007/0192128 A1 | 8/2007 | Celestini | |
| 2007/0198340 A1 | 8/2007 | Lucovsky et al. | |
| 2007/0198495 A1 | 8/2007 | Buron et al. | |
| 2007/0208751 A1 | 9/2007 | Cowan et al. | |
| 2007/0210936 A1 | 9/2007 | Nicholson | |
| 2007/0214180 A1 | 9/2007 | Crawford | |
| 2007/0214216 A1 | 9/2007 | Carrer et al. | |
| 2007/0233556 A1 | 10/2007 | Koningstein | |
| 2007/0233801 A1 | 10/2007 | Eren et al. | |
| 2007/0233859 A1 | 10/2007 | Zhao et al. | |
| 2007/0243887 A1 | 10/2007 | Bandhole et al. | |
| 2007/0244750 A1 | 10/2007 | Grannan et al. | |
| 2007/0255456 A1 | 11/2007 | Funayama | |
| 2007/0281690 A1 | 12/2007 | Altman et al. | |
| 2008/0022329 A1 | 1/2008 | Glad | |
| 2008/0025701 A1 | 1/2008 | Ikeda | |
| 2008/0032703 A1 | 2/2008 | Krumm et al. | |
| 2008/0033930 A1 | 2/2008 | Warren | |
| 2008/0043041 A2 | 2/2008 | Hedenstroem et al. | |
| 2008/0076505 A1 | 3/2008 | Nguyen et al. | |
| 2008/0092233 A1 | 4/2008 | Tian et al. | |
| 2008/0104503 A1 | 5/2008 | Beall et al. | |

(56) References Cited

U.S. PATENT DOCUMENTS

| | | |
|---|---|---|
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0207176 A1 | 8/2008 | Brackbill et al. |
| 2008/0214210 A1 | 9/2008 | Rasanen et al. |
| 2008/0222545 A1 | 9/2008 | Lemay et al. |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089710 A1 | 4/2009 | Wood et al. |
| 2009/0093261 A1 | 4/2009 | Ziskind et al. |
| 2009/0132341 A1 | 5/2009 | Klinger et al. |
| 2009/0132453 A1 | 5/2009 | Hangartner et al. |
| 2009/0132665 A1 | 5/2009 | Thomsen et al. |
| 2009/0153492 A1 | 6/2009 | Popp |
| 2009/0157450 A1 | 6/2009 | Athsani et al. |
| 2009/0160970 A1 | 6/2009 | Fredlund et al. |
| 2009/0163182 A1 | 6/2009 | Gatti et al. |
| 2009/0192900 A1 | 7/2009 | Collison et al. |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0237328 A1* | 9/2009 | Gyorfi ............... G06F 3/04845 345/9 |
| 2009/0239552 A1 | 9/2009 | Churchill et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0185552 A1 | 7/2010 | DeLuca et al. |
| 2010/0185665 A1 | 7/2010 | Horn et al. |
| 2010/0198683 A1 | 8/2010 | Aarabi |
| 2010/0198694 A1 | 8/2010 | Muthukrishnan |
| 2010/0198828 A1 | 8/2010 | Petersen et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | DAngelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf et al. |
| 2011/0320373 A1 | 12/2011 | Lee et al. |
| 2012/0001938 A1 | 1/2012 | Sandberg |
| 2012/0028659 A1 | 2/2012 | Whitney et al. |
| 2012/0036015 A1 | 2/2012 | Sheikh |
| 2012/0059722 A1 | 3/2012 | Rao |
| 2012/0062805 A1 | 3/2012 | Candelore |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0210244 A1 | 8/2012 | de Francisco Lopez et al. |
| 2012/0212632 A1 | 8/2012 | Mate et al. |
| 2012/0220264 A1 | 8/2012 | Kawabata |
| 2012/0231814 A1 | 9/2012 | Calman et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0268490 A1 | 10/2012 | Sugden |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0323933 A1 | 12/2012 | He et al. |
| 2013/0006759 A1 | 1/2013 | Srivastava et al. |
| 2013/0036364 A1 | 2/2013 | Johnson |
| 2013/0045753 A1 | 2/2013 | Obermeyer et al. |

(56) References Cited

U.S. PATENT DOCUMENTS

| | | |
|---|---|---|
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0095857 A1 | 4/2013 | Garcia et al. |
| 2013/0128059 A1 | 5/2013 | Kristensson |
| 2013/0129252 A1 | 5/2013 | Lauper et al. |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201182 A1 | 8/2013 | Kuroki et al. |
| 2013/0218965 A1 | 8/2013 | Abrol et al. |
| 2013/0218968 A1 | 8/2013 | McEvilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0290443 A1 | 10/2013 | Collins et al. |
| 2013/0311255 A1 | 11/2013 | Cummins et al. |
| 2013/0325964 A1 | 12/2013 | Berberat |
| 2013/0339864 A1 | 12/2013 | Uusitalo et al. |
| 2013/0339868 A1* | 12/2013 | Sharpe ............... G06Q 10/10 715/739 |
| 2013/0344896 A1 | 12/2013 | Kirmse et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0045530 A1 | 2/2014 | Gordon et al. |
| 2014/0046923 A1 | 2/2014 | Ruble et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0096029 A1 | 4/2014 | Schultz |
| 2014/0114565 A1 | 4/2014 | Aziz et al. |
| 2014/0118483 A1 | 5/2014 | Rapoport et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0139519 A1 | 5/2014 | Mit |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0204117 A1 | 6/2014 | Kinnebrew et al. |
| 2014/0189592 A1 | 7/2014 | Benchenaa et al. |
| 2014/0207679 A1 | 7/2014 | Cho |
| 2014/0214471 A1 | 7/2014 | Schreiner |
| 2014/0237578 A1 | 8/2014 | Bryant et al. |
| 2014/0253743 A1 | 9/2014 | Loxam et al. |
| 2014/0258405 A1 | 9/2014 | Perkin |
| 2014/0266703 A1 | 9/2014 | Dalley, Jr. et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | OKeefe et al. |
| 2014/0289833 A1 | 9/2014 | Briceno et al. |
| 2014/0304646 A1 | 10/2014 | Rossmann |
| 2014/0324627 A1 | 10/2014 | Haver et al. |
| 2014/0325383 A1 | 10/2014 | Brown et al. |
| 2014/0372945 A1 | 12/2014 | Fan et al. |
| 2015/0029180 A1 | 1/2015 | Komatsu |
| 2015/0046278 A1 | 2/2015 | Pei et al. |
| 2015/0087263 A1 | 3/2015 | Branscomb |
| 2015/0088622 A1 | 3/2015 | Ganschow |
| 2015/0116529 A1 | 4/2015 | Wu et al. |
| 2015/0169827 A1 | 6/2015 | LaBorde |
| 2015/0172534 A1 | 6/2015 | Miyakawa et al. |
| 2015/0222814 A1 | 8/2015 | Li et al. |
| 2015/0261917 A1 | 9/2015 | Smith |
| 2015/0350136 A1 | 12/2015 | Flynn et al. |
| 2015/0356063 A1* | 12/2015 | Jiang ............... H04L 67/18 715/232 |
| 2016/0014063 A1 | 1/2016 | Hogeg et al. |
| 2016/0085773 A1 | 3/2016 | Chang et al. |
| 2016/0085863 A1* | 3/2016 | Allen ............... G06Q 30/08 707/754 |
| 2016/0132231 A1 | 5/2016 | Rathod |
| 2016/0180602 A1 | 6/2016 | Fuchs |
| 2016/0180887 A1 | 6/2016 | Sehn |
| 2016/0182422 A1 | 6/2016 | Sehn |
| 2016/0182875 A1 | 6/2016 | Sehn |
| 2016/0212538 A1 | 7/2016 | Fullam et al. |
| 2016/0223335 A1 | 8/2016 | Tabata |
| 2016/0277419 A1 | 9/2016 | Allen et al. |
| 2016/0283595 A1 | 9/2016 | Folkens et al. |
| 2016/0335289 A1* | 11/2016 | Andrews ............... G06Q 50/16 |
| 2017/0006094 A1 | 1/2017 | Abou Mahmoud et al. |
| 2017/0021273 A1 | 1/2017 | Rios |
| 2017/0132267 A1 | 5/2017 | Zhou et al. |
| 2017/0150037 A1 | 5/2017 | Rathod |
| 2017/0185869 A1 | 6/2017 | Dua et al. |
| 2017/0193300 A1 | 7/2017 | Shatz et al. |
| 2017/0195554 A1 | 7/2017 | Shatz et al. |
| 2017/0201803 A1 | 7/2017 | Wald et al. |
| 2017/0256097 A1 | 9/2017 | Finn et al. |
| 2018/0026925 A1 | 1/2018 | Kennedy |
| 2018/0072833 A1 | 3/2018 | Chang et al. |
| 2018/0116346 A1 | 5/2018 | Hertlein |
| 2018/0129905 A1 | 5/2018 | Soundararajan et al. |
| 2019/0244436 A1* | 8/2019 | Stansell ............ G06Q 30/0643 |
| 2020/0234502 A1* | 7/2020 | Anderlecht ............ G06T 11/00 |

FOREIGN PATENT DOCUMENTS

| | | |
|---|---|---|
| CA | 2887596 A1 | 7/2015 |
| CN | 102238275 B | 11/2011 |
| CN | 102447779 A | 5/2012 |
| CN | 103595911 A | 2/2014 |
| EP | 2051480 A1 | 4/2009 |
| EP | 2151797 A1 | 2/2010 |
| EP | 2732383 B1 | 4/2018 |
| EP | 2602729 B1 | 10/2018 |
| EP | 2589024 B1 | 8/2019 |
| GB | 2399928 A | 9/2004 |
| JP | 6082005 B2 | 2/2017 |
| KR | 19990073076 A | 10/1999 |
| WO | 1996024213 A1 | 10/1999 |
| WO | 1999063453 A1 | 10/1999 |
| WO | 2001029642 A1 | 10/1999 |
| WO | 2001050703 A2 | 10/1999 |
| WO | 2006118755 A2 | 11/2006 |
| WO | 2009043020 A2 | 4/2009 |
| WO | 2011080385 A1 | 7/2011 |
| WO | 2011119407 A1 | 9/2011 |
| WO | 2013008238 A1 | 1/2013 |
| WO | 2013045753 A1 | 4/2013 |
| WO | 2014115136 A1 | 7/2014 |

(56) References Cited

FOREIGN PATENT DOCUMENTS

| | | |
|---|---|---|
| WO | 2014194262 A2 | 12/2014 |
| WO | 2016065131 A1 | 4/2016 |

OTHER PUBLICATIONS

Adding a watermark to your photos, eBay, [Online] Retrieved from the Intenet URL:http://pages.ebay.com/help/sell/pictures.html , (accessed May 24, 2017), 4 pgs.

Tripathi, Rohit, "Watermark Images in PHP And Save File on Server", [Online]. Retrieved from the Internet: URL:http://code.rohitink.com/2012/12/28/watermark-images-in-php-and-save-file-on-served, (Dec. 28, 2012), 4 pgs.

BlogStomp, [Online]. Retrieved from the Internet: URL:http://stompsoftware.com/blogstomp , (accessed May 24, 2017), 12 pgs.

Cup Magic Starbucks Holiday Red Cups come to life with AR app, [Online]. Retrieved from the Internet: http://www.blastradius.com/work/cup-magic , (2016), 7 pgs.

Daily App: InstaPlace (iOS/Android): Give Pictures a Sense of Place, TechPP, [Online]. Retrieved from the Internet: URL;http://techpp.com/2013/02/15/instaplace-app-review , (2013), 13 pgs.

How Snaps Are Stored and Deleted, Snapchat, [Online]. Retrieved from the Internet: URL: https://web.archive.org/web/20130607042322/http://blog.snapchat.com/post/50060403002/how-snaps-are-stored-and-deleted, (May 9, 2013), 2 pgs.

Shein, Esther, "Ephemeral Data", Communications of the ACM vol. 56 | No. 9, (Sep. 2013), 20-22.

International Application Serial No. PCT/US2014/040346, International Search Report dated Mar. 23, 2015, 2 pgs.

International Application Serial No. PCT/US2014/040346, Written Opinion dated Mar. 23, 2015, 6 pgs.

International Application Serial No. PCT/US2015/037251, International Search Report dated Sep. 29, 2015, 7 pgs.

Introducing Snapchat Stories, [Online]. Retrieved from the Internet:https://www.youtube.com/watch?v=-ie5_aaHOhE , (Oct. 1, 2013), 92 pgs.

Visit Mobile Getting Started, IVISIT, (Dec. 4, 2013), 1-16.

Macys Believe-o-Magic, [Online]. Retrieved from the Internet: https://www.youtube.com/watch?v=5p7-y5eO6X4, Nov. 27, 2011), 102 pgs.

Macys Introduces Augmented Reality Experience in Stores across Country as Part of Its 2011 Believe" Campaign", [Online]. Retrieved from the Internet: http://www.businesswire.com/news/home/20111102006759/en/Macy%E2%80%99s-Introduces-Augmented-Reality-Experience-Stores-Country ., (Nov. 2, 2011), 6 pgs.

Starbucks Cup Magic for Valentines Day, {Online}. Retrieved from the Internet: https://www.youtube.com/watchv=8nvgOzjgl0w , (Feb. 6, 2012), 88 pgs.

Starbucks Cup Magic, {Onliine}. Retrieved from the Internet: https://www.youtube.com/watchv=RWwQXi9RG0w , (Nov. 8, 2011), 87 pgs.

Starbucks Holiday Red Cups Come to Life, Signaling the Return of the Merriest Season, [Online]. Retrieved from the Internet: http://www.businesswire.com/news/home/20111115005744/en/2479513/Starbucks-Holiday-Red-Cups-Life-Signaling-Return , (Nov. 15, 2011), 5 pgs.

U.S. Appl. No. 14/494,226, Examiner Interview Summary dated Oct. 27, 2016, 3 pgs.

U.S. Appl. No. 14/494,226, Final Office Action dated Mar. 7, 2017, 33 pgs.

U.S. Appl. No. 14/494,226, Non Final Office Action dated Sep. 12, 2016, 32 pgs.

U.S. Appl. No. 14/494,226, Response filed Dec. 12, 2016 to Non Final Office Action dated Sep. 12, 2016, 16 pgs.

U.S. Appl. No. 14/539,391, Notice of Allowance dated Mar. 5, 2015, 16 pgs.

U.S. Appl. No. 14/682,259, Notice of Allowance dated Jul. 27, 2015, 17 pgs.

InstaPlace Photo App Tell the Whole Story, [Online]. Retrieved from the Internet; https://www.youtube.com/watch?v=uF_gFkg1hBM , (Nov. 8, 2013), 113 pgs.

Carthy, Roi, "Dear All Photo Apps: Mobli Just Won Filters", [Online]. Retrieved from the Internet: URL https://techcrunch.com/2011/09/08/mobli-filters , (Sep. 8, 2011), 10 pgs.

Janthong, Isaranu, "Android App Review Thailand", [Online]. Retrieved from the Internet http://www.android-free-app-review.com/2013/01/instaplace-android-google-play-store html , (Jan. 23, 2013), 9 pgs.

Leyden, John, "This SMS will self-destruct in 40 seconds", [Online]. Retrieved from the Internet: URL: http://www.theregister.co.uk/2005/12/12/stealthtext/, (Dec. 12, 2005), 1 pg.

Macleod, Duncan, "Macys Believe-o-Magic App", [Online]. Retrieved from the Internet: URL:http://theinspirationroom.com/daily/2011/macys-believe-o-magic-app , (Nov. 14, 2011), 10 pgs.

Macleod, Duncan, "Starbucks Cup Magic—Lets Merry", [Online], Retrieved from the Internet: URL; http://theinspirationroom.com/daily/2011/starbucks-cup-magic , (Nov. 12, 2011), 8 pgs.

Melanson, Mike, "This text message will self destruct in 60 seconds", readwrite.com, [Online]. Retrieved from the Internet: http://readwrite.com/2011/02/11/this-text-message-will-self-destruct-in-60 seconds , (Feb. 18, 2015).

Notopoulos, Katie, "A Guide to the New Snapchat Filters and Big Fonts", [Online]. Retrieved from the Internet: https://www.buzzfeed.com/katienotopoulos/a-guide-to-the-new-snapchat-filters-and-big-fontsut-term=.bkQ9qVZWe#.nv58YXpkV , (Dec. 22, 2013), 13 pgs.

Panzarino, Matthew, "Snapchat Adds Filters, A Replay Function and for Whatever Reason, Time, Temperature and Speed Overlays", [Online]. Retrieved from the Internet: https://techcrunch.com/2013/12/20/snapchat-adds-filters-new-font-and-for-some-reason-time-temperature-and-speed-overlays/ , (Dec. 20, 2013), 12 pgs.

Sawers, Paul, "Snapchat for iOS Lets You Send Photos to Friends and Set How long Theyre Visible for", [Online]. Retrieved from the Internet: http:/ /thenextweb.com/apps/2012/05/07/Snapchat-for-ios-lets-you-send-photos-to-friends-and-set-how-long-theyre-visiblefor/#xCjrp , (May 7, 2012), 1-5.

Collins, Katie, "Leave digital gifts in physical locations with traces app", http://www.wired.co.uk/article/traces-messaging-app, Aug. 5, 2014, 11 pages.

Jardin, Xeni, "Pip, new minimalist messaging app, promises easy update to friends", https://boingboing.net/2014/12/04/pip-new-minimalist-messaging.- html, Dec. 4, 2014, 2 pages.

Knibbs, Kate, "Is this the first annonymous app that understands the power of secrets?", https://www.dailydot.com/debug/yik-yak-app/, Mar. 21, 2014, 4 pages.

Lawler, Ryan, "Whisper Confirms $36M in New Funding, Adds Related Posts, Categories, and Explore Feature to App", https://techcrunch.com/2014/05/19/whisper-v4, May 19, 2014, 2 pages.

Martellaro, John, "Spyglass for iOS: Powerful Navigational Instrument", https://www.macobserver.com/tmo/review/spyglass_for_ios_powerful_navigati- onal_instruction, Jun. 27, 2011, 5 pages.

* cited by examiner

SYSTEM FOR NOTIFICATION OF USER ACCESSIBILITY OF CURATED LOCATION-DEPENDENT CONTENT IN AN AUGMENTED ESTATE

CROSS-REFERENCE TO RELATED APPLICATIONS

The instant application claims priority under 35 U.S.C. § 120 as a continuation-in-part of U.S. patent application Ser. No. 16/167,256 filed Oct. 22, 2018. The instant application claims priority under 35 U.S.C. § 120 as a continuation-in-part of U.S. patent application Ser. No. 16/155,661 filed Oct. 9, 2018; said application further claims priority under 35 U.S.C. § 120 as a continuation of U.S. application Ser. No. 15/478,973 (now U.S. Pat. No. 10,223,738 issued on Mar. 5, 2019); which in turn claims priority under 35 U.S.C. § 120 as a continuation of Ser. No. 16/155,727 filed on Oct. 9, 2018; which in turn claims priority under 35 U.S.C. § 120 as a continuation-in-part of U.S. application Ser. No. 15/469,286 (now U.S. Pat. No. 10,402,650 issued on Sep. 3, 2019); which in turn claims priority under 35 U.S.C. § 120 as a continuation of U.S. application Ser. No. 15/231,241 (now U.S. Pat. No. 10,334,134 issued on Jun. 25, 2019); which in turn claims priority 35 U.S.C § 119 to U.S. Provisional Patent Application 62/352,433 filed Jun. 20, 2016.

The present application is also a continuation-in-part of U.S. patent application Ser. No. 16/167,277 filed on Oct. 22, 2018; which in turn claimed priority under 35 U.S.C. § 120 as a continuation-in-part of U.S. application Ser. No. 15/469,245 (now U.S. Pat. No. 10,108,859 issued on Oct. 23, 2018); which in turn claimed priority under 35 U.S.C. § 120 as a continuation-in-part of U.S. application Ser. No. 15/231,241 (now U.S. Pat. No. 10,334,134 issued on Jun. 25, 2019); which in turn claims priority under 35 U.S.C § 119 to U.S. Provisional Patent Application 62/352,433 filed Jun. 20, 2016.

U.S. patent application Ser. Nos. 15/231,241; 15/469,245; 15/469,286; 15/478,973; 16/155,661; 16/167,256; 16/167,277; 16/449,986; 16/155,661; and 62/352,433 are herein incorporated by reference in their entirety.

TECHNICAL FIELD

The present invention is generally related to apparatus and systems for sending messages and more particularly to a system and apparatus for constructing and sharing with or without frictionless access an augmented interactive landscape.

SUMMARY OF THE INVENTION

The present disclosure teaches a system consisting essentially of devices for storing, recording, and reading content tagged (associated) to a location or device which is relevant to a particular user or to an identified group of users. The devices may include an active or passive tag, an optically readable code referentially storing recorded content (or the like), and at least one recorder (e.g., "handy") for allowing augmentation of the environment with media files accessible and identified by a notification or the like, tagged to a particular location or object, and accessible by users with enrolled readers (hereinafter generally "smart device" or "handy") receiving the notification when proximate to the location or tagged object or device.

Individuals interact with their environment on a continual basis. Certain moments may occur where an interaction with a place, thing, person, article, thought, feeling, or the like may occur. Each moment, whether ignored or passed without notice, or contemplated, generally includes all the senses of a person, a time and date, a location, an orientation, and a set of things involved in the moment, e.g., a sound, a song, a video, some text, a conversation, a three-dimensional object, a place, a person, or group of people, a landscape, a view, or the like. Such moments produce thoughts and or feelings. Recording such moments for sharing and hermeneutics (context) for a particular set of circumstances is desirable. A moment may be and/or include a reminder, advertisement, audio file, video file, multimedia file, message, a request, and directions (or the like).

A moment file which is represented by an augmented reality element (augmented reality sensory input) or user proximity notification, recordable and readable by a handy having a processor in proximity to the locus of a recorded moment file configured to receive an augmented reality moment file. The content of the moment file is preferably a user selectable element or notification. The moment file, in addition to content and a position, preferably also includes recorder identification, a recorded time, an expiration, and media such as text, an image, a video, a sound recording, a game play instruction, a game play move, navigation instructions, geocache instructions, and/or a setup menu.

In one embodiment of the present invention a recording of a moment may be shared with a party that has moved near or to the location from which a particular moment (encounter) was recorded (placed). Likewise, a time, thing, person, object or position may recall a recorded moment to another. In operation, an enrolled handy or the like (smart device, iPhone, iPad, tablet, Android device, Surface, optical head mounted display or eyewear, or other portable electronic device) may be utilized to record and read/view/experience a moment. In a currently preferred embodiment frictionless access may be provided via a key exchange or other user selectable and enrollable frictionless access methodology for either real-time or batch access.

A person carrying an enrolled handy or the like while traveling, eating, walking 262, working, driving (passenger), traveling, and otherwise living may record the embodied experiences of a moment (or interaction) with a video, song, menu, image, video, conversation, story, interactive moment element, or the like, tagged to a particular location, orientation, and time. Interesting (suitable/desired) moment files may be located via both tangible and intangible aspects of a recorded moment (experienced/shared) by an in-situ user by location, tagged object, and the like. Additionally, the context of a recorded moment may be searchable by time, location, orientation, type, mood (humorous, informative, poignant, opinion, historical, idiohistoric, and others) and filtered by an in-situ user (or remote users in special embodiments of the present invention).

When necessary measurements by an inertial measurement unit (IMU) of an enrolled handy may be utilized to determine a location and orientation of the enrolled handy (a pose reporter). In this manner a moment may be recorded/read either with or without the presence of an externally transmitted positioning signal. The system capable of identifying a location and orientation of a portable user handy may map user moments to a virtual property ownership system where use of the system may be monetized.

In a presently preferred embodiment, the invention may work and employ virtual and augmented reality standards as they develop and are deployed such that objects/things and the like may be paired with a tagged location (message) and orientation of an enrolled handy.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The numerous objects and advantages of the present invention may be better understood by those skilled in the art by reference to the accompanying figures in which:

FIG. 11 is an environmental diagram of an embodiment of the present invention utilized in a museum or the like;

FIG. 12 is an environmental diagram of an embodiment of the present invention utilized in a retail store or the like;

FIG. 50 is an environmental diagram of an augmented reality system for camera-based social media;

DETAILED DESCRIPTION OF THE INVENTION

Figure 1A:
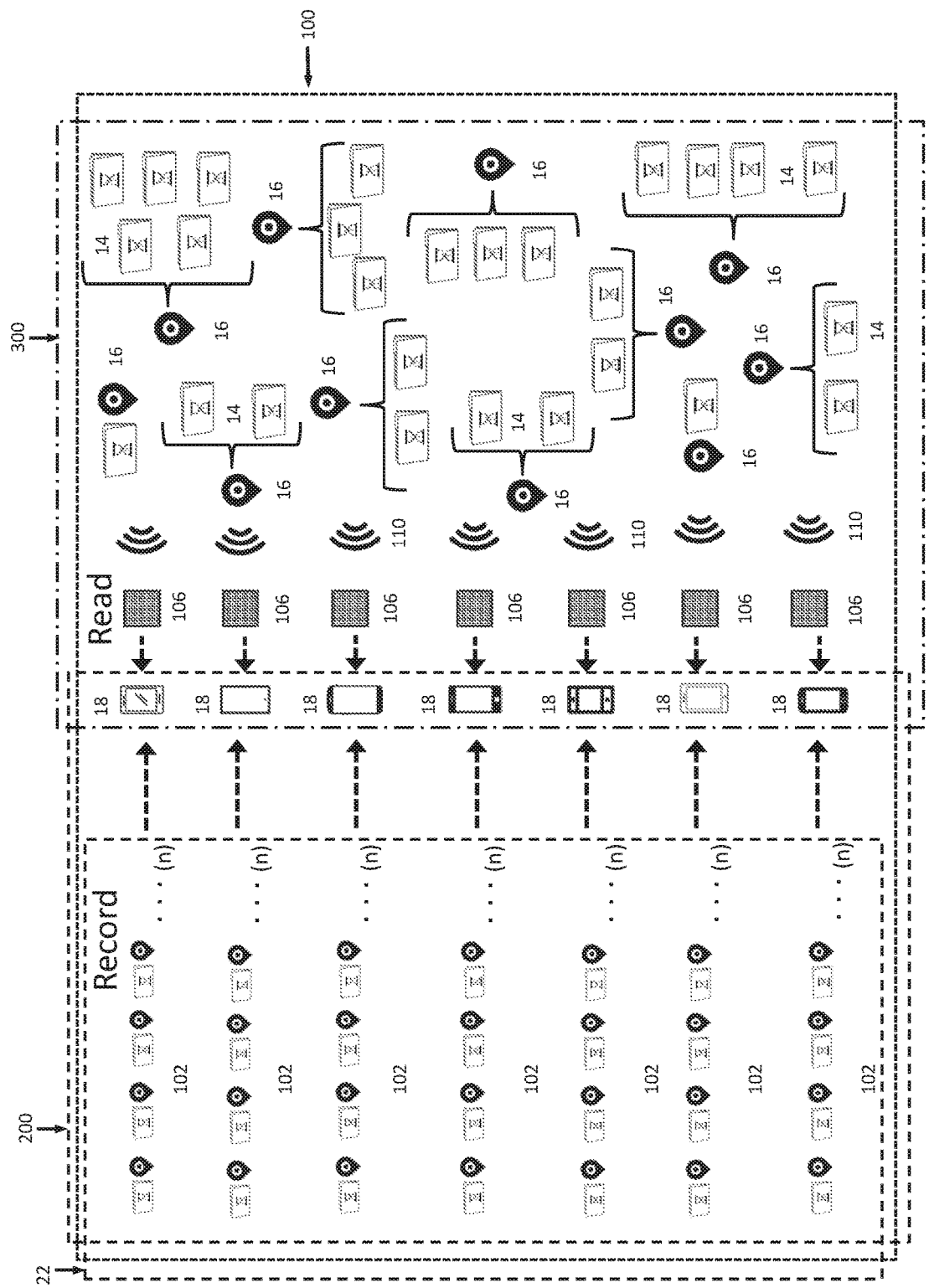
FIGS. 1A and 1B are a highly diagrammatic environmental view of the moment recorder and reader network of an embodiment of the present invention.
Figure 1B:
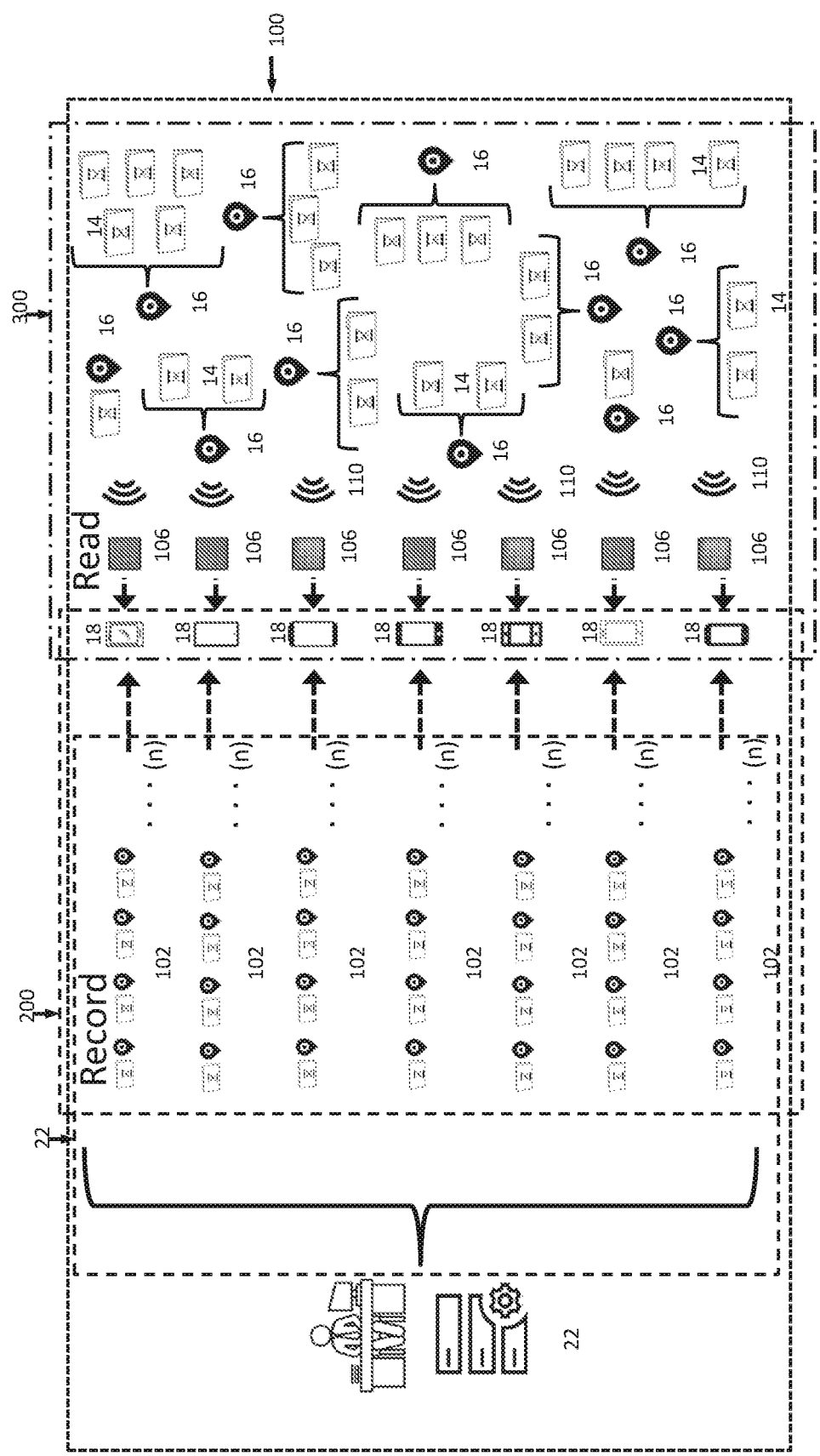

Reference will now be made in detail to exemplary embodiments of the disclosure, examples of which are illustrated in the accompanying drawings.

The instant disclosure describes an apparatus, method, and system for recording moments 10 via a moment system 100. The moment system 100 includes a moment recorder (or a plurality of moment 18s) 200 for recording AR element (AR hyperlink) 12 to a server 22 (or the like). Each AR element (AR hyperlink) 12 preferably includes moment (information/content) 10 (media 14, location 16, time 204, and an orientation 205 (and other metadata, and the like) of an enrolled smart device (handy) 18). An embodiment of the moment 10 may also include a locomotive source 208 and theme 210. AR element (AR hyperlink) 12 are represented by moment AR elements (hyperlinks) which may include emojis, avatars, and other AR elements. The combination of media 14, location (e.g., position, orientation, pose) 16, date and time 204, saved on a server 22, and represented by an emoji, character, avatar or other AR element 84, and hereinafter generally referred to and collectively as "moment AR element (AR hyperlink) 12".

Moment AR element (AR hyperlink) 12 are associated with a location 16 (e.g., object 122 or place 16), a time 204, and an orientation 205 of an enrolled smart device (handy) 18. Users 20 may tag objects 122 and places 16 to leave media 14 and the like for other users 20. The present invention allows users to filter, follow, share, inform, opine, and exchange ideas and moments 10 interesting to themselves and others. It is noted that moments 10 may be filterably selected in a variety of ways including being selected from at least one of a class, a category, and a theme of moments. In a currently preferred embodiment frictionless access may be provided via a key exchange, blockchain, (e.g., or a distributed ledger system) or other user selectable and enrollable frictionless access methodology for either real-time or batch access. Biometric information such as gestures (on a display or by altering the pose or orientation of the device in a sequence or the like), facial or body recognition, fingerprint, or voice recognition may be utilized to access features of the moment system 100.

I. FIGS. 1-17

Figure 11:
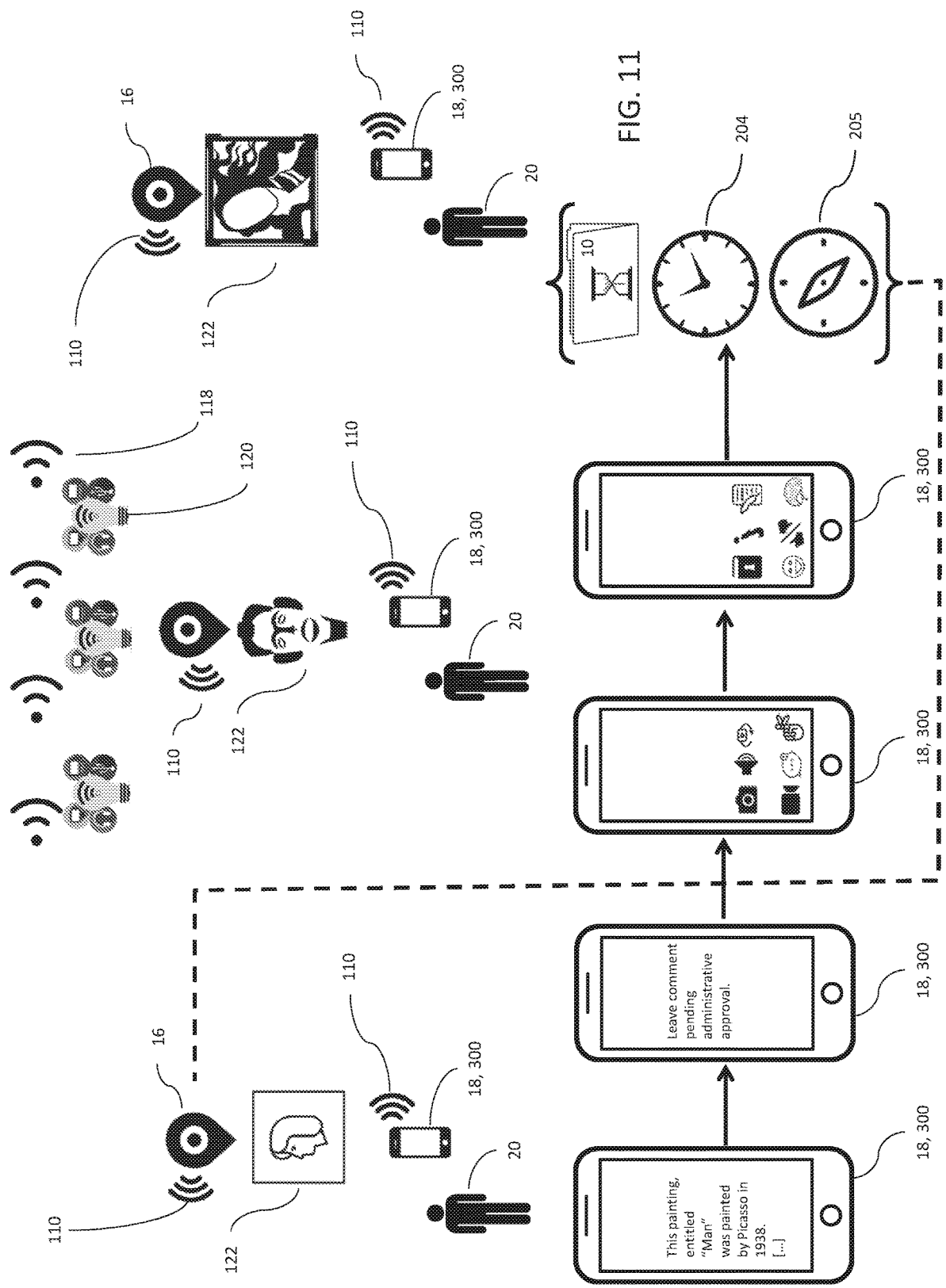

Turning first to FIGS. 1A and 11, a plurality of enrolled smart device (handy) 18 (or the like) may be networked 110 in an embodiment of the present invention for recording 200 and reading 300 moments 10 by subscribed users 20 using enrolled smart device (handy) 18 and desktop terminals operated by augmented property holders 1306. Moments 10 are recorded 200 in a file (on a server 22 or the like) tagged to a location 16 (object 122, place 16 or the like) and includes a time 204 (date, time of day), orientation 205 (a pitch, a yaw, and a roll) of an enrolled smart device (handy) 18 that records the moment 10, and identification information for the user recording the moment. Each moment 10 is created via an enrolled smart device (handy) 18 or the like by directing the enrolled smart device (handy) 18 to a place 16 (object 122, location 16) to record the coordinates of the location 16, the time 204, and orientation 205 of the enrolled smart device (handy) 18. A user 20 may then associate the moment 10 and the tagged location and orientation coordinate set with media 14. Moments 10 may additionally include tokens, games, instructions, memories, memorabilia, advertisements, and the like.

Each enrolled smart device (handy) 18 generally includes a camera, a speaker, a display, a position (position reporter) and orientation (pose reporter) identification system, a memory, a wireless connection to a server, a text input, a sound input, a global navigation satellite system (GNSS) receiver 114, and an inertial measurement unit (IMU). It is noted that the display allows a user 20 to display a field of view of the camera, display content, and display content context.

Each enrolled smart device (handy) 18 may include a user selectable icon for selectably reading and recording an augmented reality AR element (AR hyperlink) 12 positioned in an orientation 205 and location 16 as at least one of a tagged object 32 and a location 16 viewable within the display of the smart device (handy) 18 when the smart device (handy) 18 is oriented and located in the locus and orientation 205 of said augmented reality AR element (AR hyperlink) 12 (e.g., a user selectable area of accessibility 82). In one embodiment, the locus is a circle centered on a location 16 of a moment 10. For example, a user 20 may define the radius of a locus (82) circle centered on the location 16 of a moment 10.

Figure 2A:
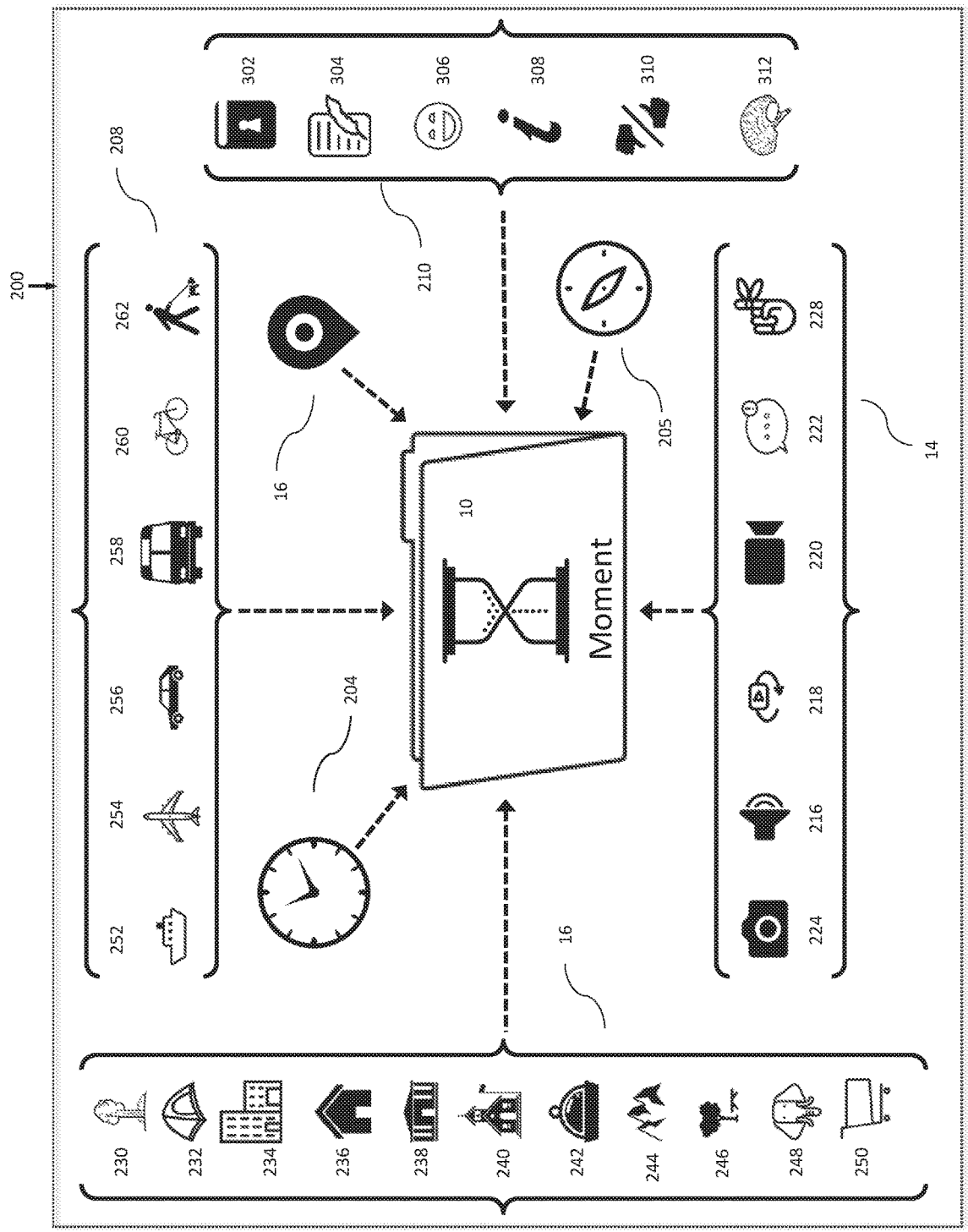
FIG. 2A is an environmental diagram illustrating an embodiment of a smart device (handy) moment reader and recorder of the present invention.
Figure 18:
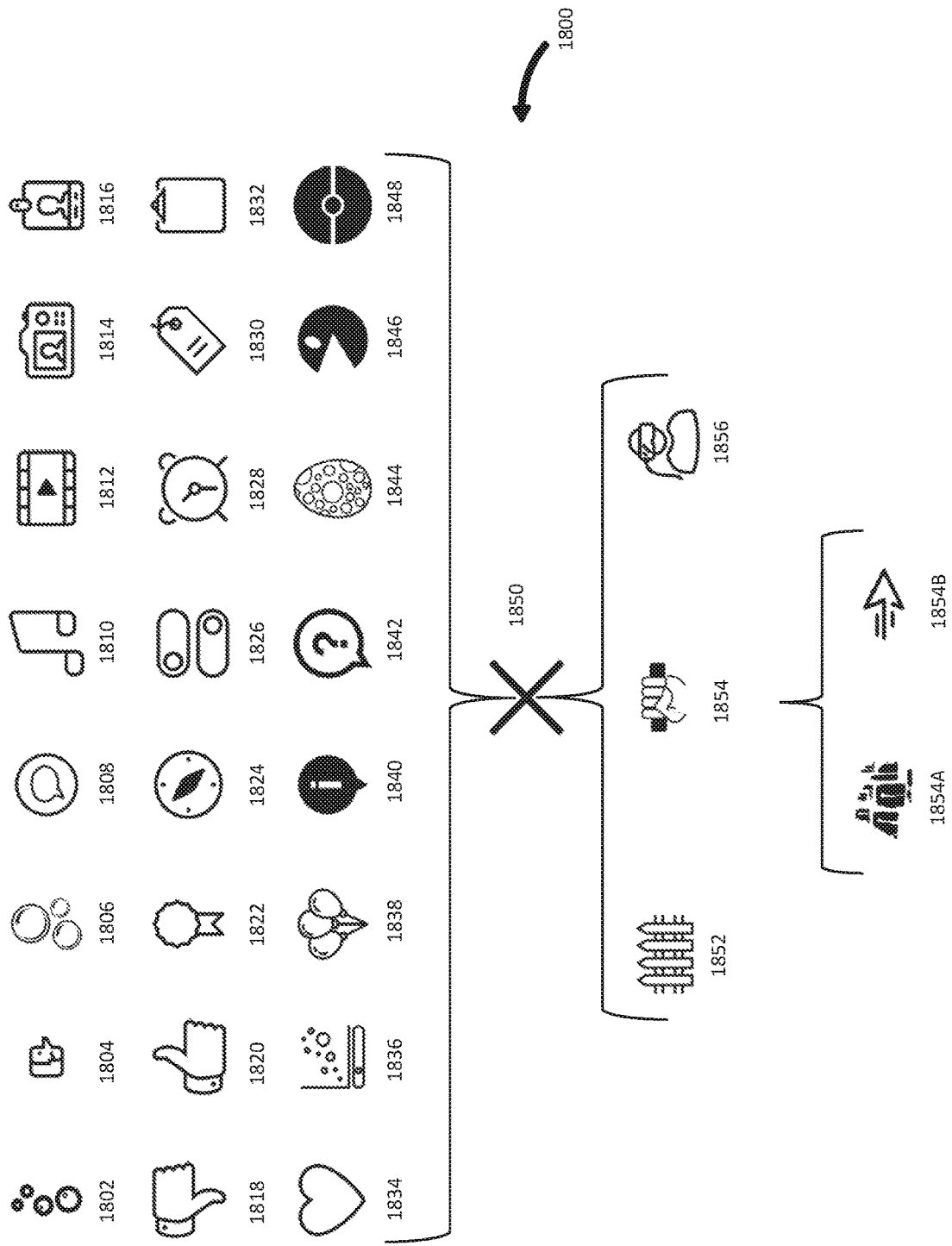
FIG. 18 is a highly diagrammatic illustration of a multi-dimensional moment file reader/recorder system capable of operation in both real, virtual, and augmented states where moment files may be categorized, accessed, and appended to real, augmented, and virtual objects.

FIG. 2A illustrates an embodiment of the system 100 of a moment recording system and apparatus 200 of the present invention. When activated, the moment recorder 200 (smart device 18) records a location 16, or a series of locations in seriatim, for a moment 10 (or a series of moments) in, for example, a geographic coordinate system geodetic datum (WGS 114 or the like). The moment recorder 200 also records the date and time 204 for each location 16, and the orientation 205 of the enrolled smart device (handy) 18 that recorded the moment 10 in an AR element (AR hyperlink) 12. Included in the AR element (AR hyperlink) 12 are additional classes of information 210 FIG. 2A (e.g., 214; 216, 218, 220, 222 & 224) for providing multiple-dimensional-information tagged and associated with and about a moment 10 (FIG. 18). For example, where the moment 10 was recorded while traversing a location in some means of transportation (also called locomotive source) 208 such as a ship 252, airplane 254, automobile 256, public transportation 258, bicycle 260, or while ambulating 262, the method of transport is preferably associated with the moment 10. Likewise, where the moment takes place in an area 16, e.g., a national park 230, on a road 604 or sidewalk (trail 602), a campground 232, building 234, house 236, museum 238, school 240, restaurant 242, scenic area 244, city park 246, zoo 248, store 250, or the like, such information will be recorded 200 as, e.g., a hyperlink 84 in the AR element (AR hyperlink) 12.

The locomotive source 208 may be determined by the position and orientation identification system based on direction and velocity measurements (position and pose reporter, e.g., an IMU 382 and GNSS 114 respectively). In some embodiments, the position and orientation 16 identification system (location-based services) 24 determines the locomotive source 208 based on location as well as direction and velocity measurements. A user 20 may alternatively record in the system a locomotive source 208.

The location of a moment may be determined by the system based on location (coordinate) measurements, a user may record in the system a location, or the system may utilize the position and orientation identification system to determine location.

In a preferred embodiment of the recorder 200, media 14 may also be associated (tagged) to a moment 10. For example, a picture 224, a sound or audio recording 216, a 360° video 218 or video 220, a text 222 or an image, a screen shot, a calendar entry, reminder 228, or the like. Also, preferably associated with the moment 10 is context 210, or mood, or the like. For example, an embodiment may also record as part of a moment 10 a diary entry 302, a history 304, a feeling or mood 306, information 308, an opinion 310, or poignant anecdotes 312 or the like.

In another embodiment, a moment 10 may include an expiration code, a game play instruction, a game play more, or a setup menu.

Figure 2B:
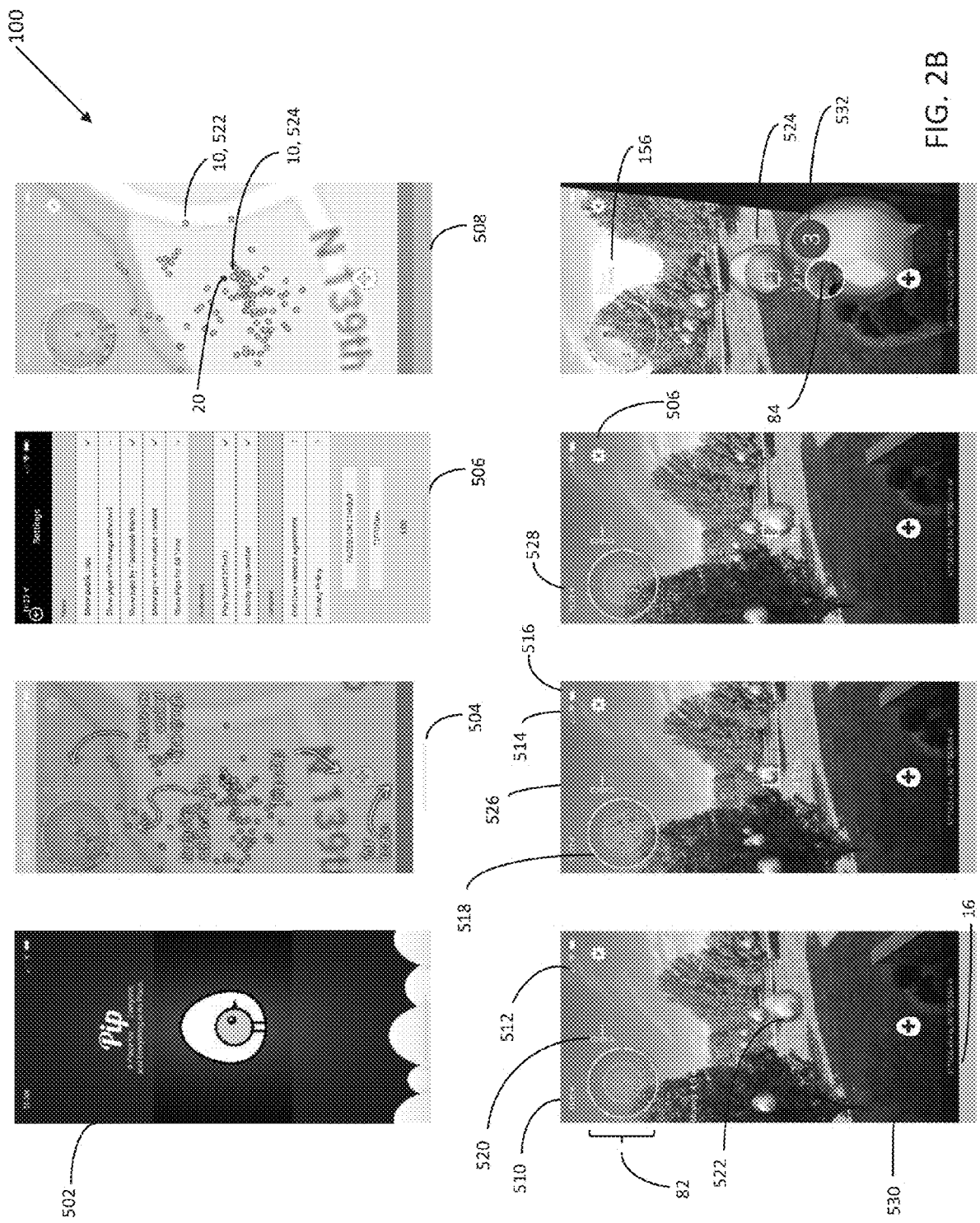
FIG. 2B is a series of user interface screenshots of an embodiment of the present invention.

Embodiments, an enrolled user 20 may, on a smart device (handy) 18, view moment AR elements (AR hyperlinks) 12 containing media 14 filtered 106 to be relevant to the user 20 or an augmented estate holder's 124 interest. Turning to FIG. 2B a series of displayed views of the smart device 18 are shown. An opening screen 502 provides a user 20 with confirmation that they are loading the system 100 on their smart device 18. A new user 20 may review a user manual 504 and alter user settings 506 via a menu. Displayed for user 20 consideration and system 100 utilization are the time 510, cellular signal strength 512, wireless strength 514, battery condition 516, location-based service 24 status, and location 16. A moment 10 radar is provided in a presently preferred embodiment 100 illustrating an area of accessibility 82 and the position of moments 10 within the area of accessibility. Non-gray (silver) AR elements represent accessible moments 10, 524 (within the area of accessibility 82). Gray (silver) AR elements represent moments 10, 522 outside the area of accessibility 82. These moments 10 (gray, silver) can be accessed by utilizing the sight 526 to target a moment 10 outside of the area of accessibility 82 for reading. Placing the sight 526 on an out of range moment 522 displays the distance from the user's 20 location 16 to the out of range moment 522. The user 20 can either walk towards the moment until it is in range 524, or target and read the out of range moment.

The signal strength 520 of the location-based services is displayed along with the current zone of uncertainty 156. Multiple moments in close proximity to each other are displayed as nested 532 with the number of moments nested in the group provided. In operation of an embodiment of the present invention a user 20 may utilize the create a moment button 530 to tag content (media 14) to their present location 16 (or somewhere else utilizing the map 508). A user 20 may set a relevancy filter 106 or the like and an AR element 84 to represent the moment (moment AR element (AR hyperlink) 12. Likewise, an augmented estate holder 124 may place content in the moment, e.g., offers, advertisements 98, or coupons 36.

Figure 3A:
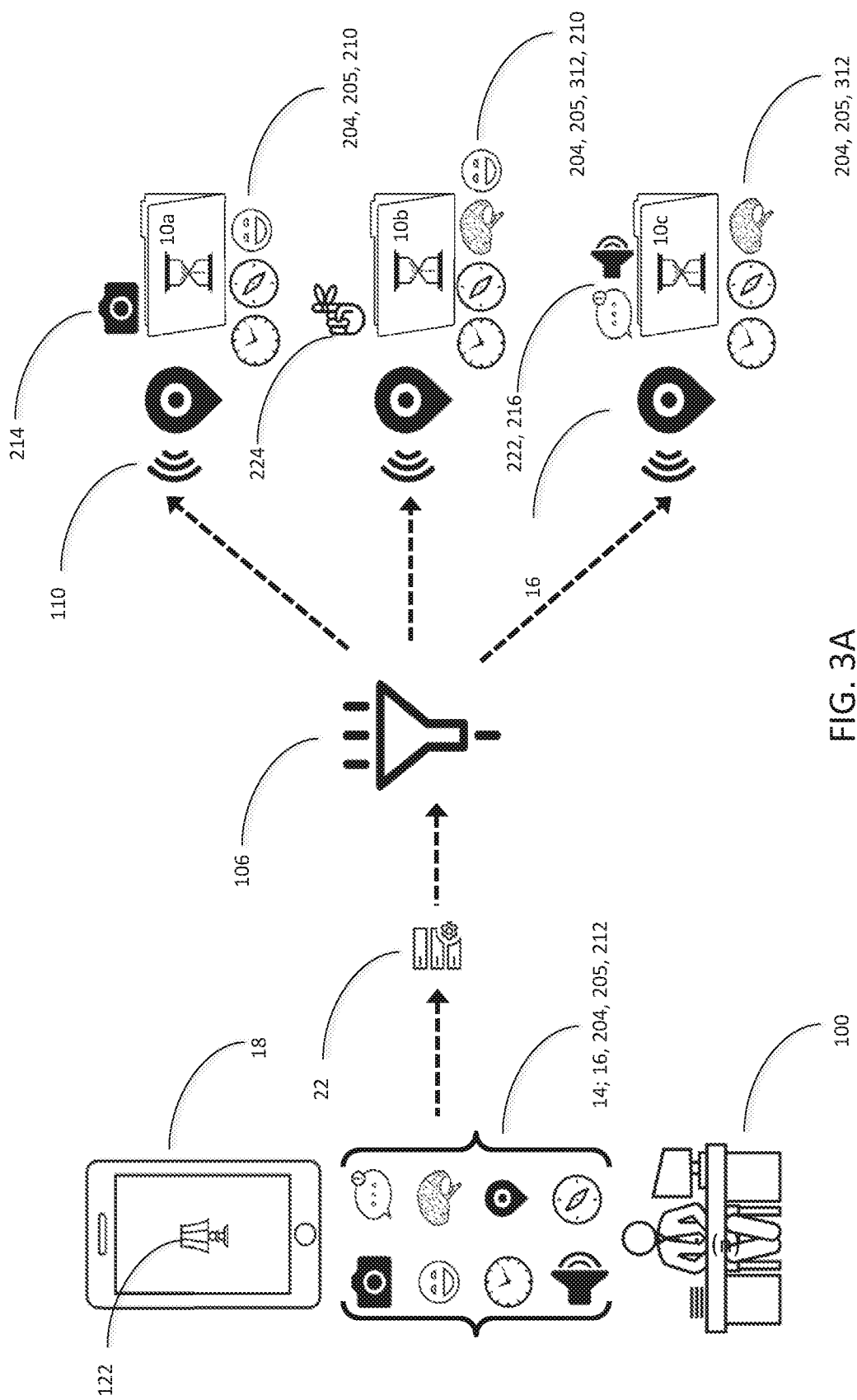
FIGS. 3A and 3B are environmental diagrams illustrating embodiments of various aspects of a preferred moment creation, selection, notification, filtration, and augmented property of the moment system of the present invention.

FIG. 3A illustrates a presently preferred method and apparatus for reading a tagged moment 10 (from a location 16 or the like). An enrolled smart device (handy) 18 (camera) may be directed to, near, or toward an object 122 (e.g., a table lamp). A user 20 may then use the moment system 100 to tag the object and add content (14; 16, 208, 210, 212) to be written with and associated with the object (and its location, time, and orientation of an enrolled handy) to an AR element (AR hyperlink) 12. The AR element (AR hyperlink) 12 is, in a presently preferred embodiment, written to a server 22, via a network connection 110 or the like (the file may be restricted to a particular user 20 or user group). The AR element (AR hyperlink) 12 may be stored and searched by an in-situ user (and in some embodiments also a remote user) location and at least one of a medium 14, a locomotive source 208, a location 16, an orientation 205 of an enrolled handy, and a theme 210. Another user 20 with an enrolled smart device (handy) 18 or the like may utilize a filter 106 or the like to restrict availability or reviewability of an AR element (AR hyperlink) 12 in accordance with user selectable traits or preferences. Thus, a user 20 might select to have available moments 10 by location 16, enrolled handy orientation 205, and/or context. For example, a particular mood 306 or feeling 312, a type of object 122, a location 16, enrolled handy orientation 205, and/or media type 14. As a user 20 encounters an object 32 the person may orient 205 their smart device (handy) 18 at an object (32, 122), at a location 16, at a set of coordinates to review available (readable) moments 10.

FIG. 3A, by way of example, illustrates three moment files 10*a*, 10*b*, and 10*c*. Moment 10*a* contains a photograph and describes a mood 306 (and time 204, and enrolled handy orientation 205). Moment 10*b* contains a reminder 224, a time 204, an enrolled handy orientation, a feeling 312, and a mood. Moment 10*c* contains a text 222 (description), a sound recording (song) 216, a time 204, an enrolled handy orientation 205, and a feeling 312. All of the example moments (10*a-c*) may be associated with a single object 122

(lamp) at a particular location (e.g., a hotel lobby or the like), with an enrolled smart device (handy) 18 oriented 205 in a similar direction, each created by different users 20, at different times 204, and readable 300 by one or more users 20.

A server 22 may contain an individual server, a universal server, a group server, and/or multiple servers providing connectivity to users 20 recording 200 and reading 300 via a network connection 110. The system 100 may provide users 20 access via a network connection 110 connected to a server 22 via a filter 106 (user selectable and controllable via, for e.g., an application driven menu or the like) associated with a reader 300 (enrolled smart device (handy) 18). Additionally, augmented property holders 124 may access the server 108 directly by a terminal 202 or the like.

Figure 3B:
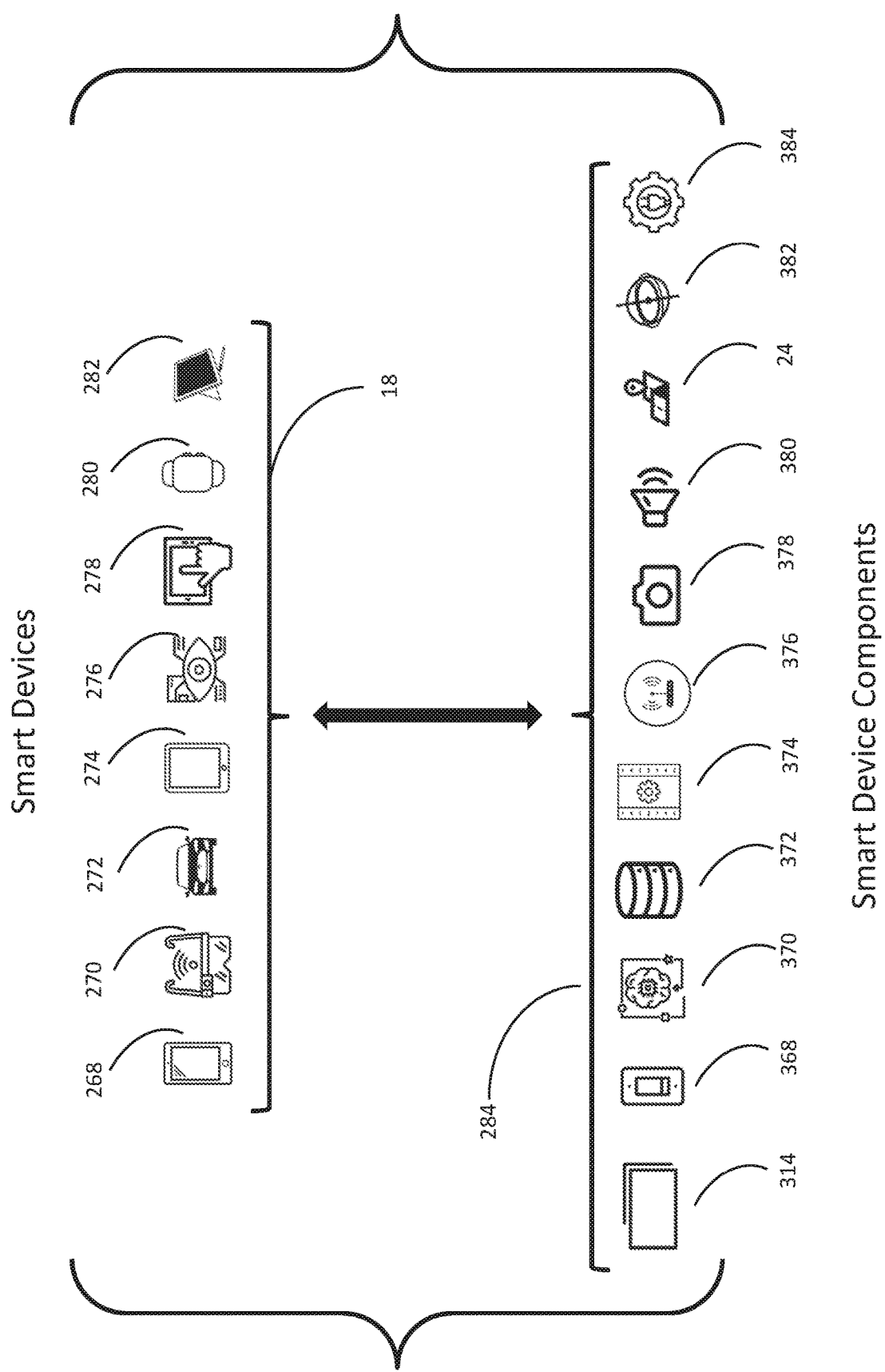
Figure 3C:
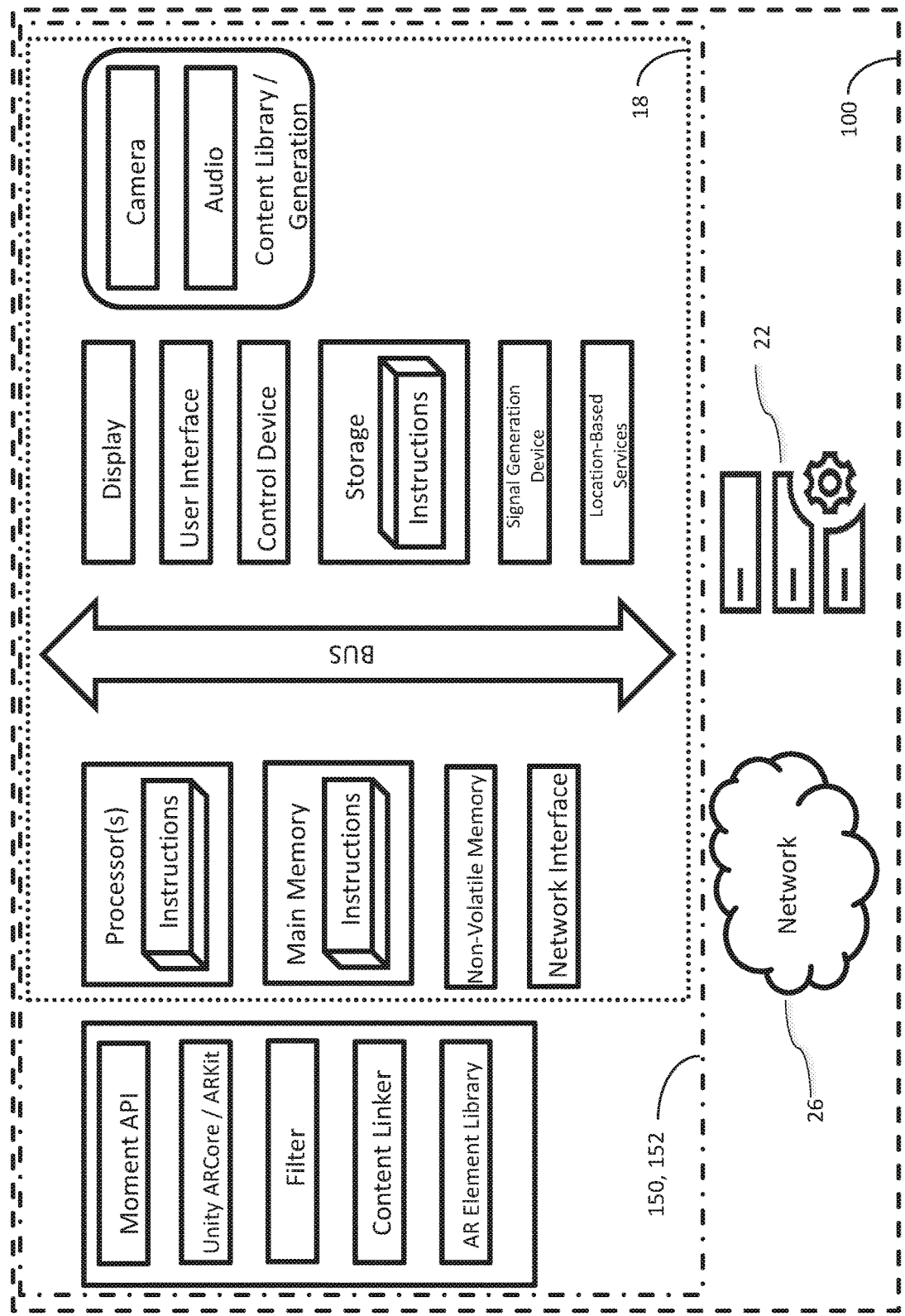
FIG. 3C is a highly diagrammatic network of an embodiment of the present invention.

Turning to FIG. 3B, a smart device (handy) 18 includes a smart phone 268, smart glasses 270, smart vehicle 272, smart tablet 274, smart lens 276, smart station (kiosk) 278, smart watch 280, portable computer 282, or the like. Each smart device (handy) 18 generally contains handy components 284. For example, a typical smart device (handy) 18 includes a display 314, generally an LCD or LED (OLED). In-Plane Switching Liquid Crystal Displays (IPS displays) or an Active Matrix Organic Light-Emitting Diode or AMO-LED display. Electrical power is provided by a battery and power management system 384, generally a Lithium-ion (Li-Ion). Processing is generally provided by a System-on-a-Chip (SoC) 370 and CPU (generally ARM architecture), a Graphics Processing Unit (GPU); a Memory Management Unit (MMU); L1 and L2 caches 372; a display processor & video processor, memory & storage modules 374, wireless connectivity (modem) 376, camera and image signal processor 378, audio system (DSP & DAC) and speakers 380, location-based service components 24, a touch screen display, an IMU 382, a PMIC a Power Management Integrated Circuit, and usually some soft and hard switches (user interface) 368.

Figure 4A:
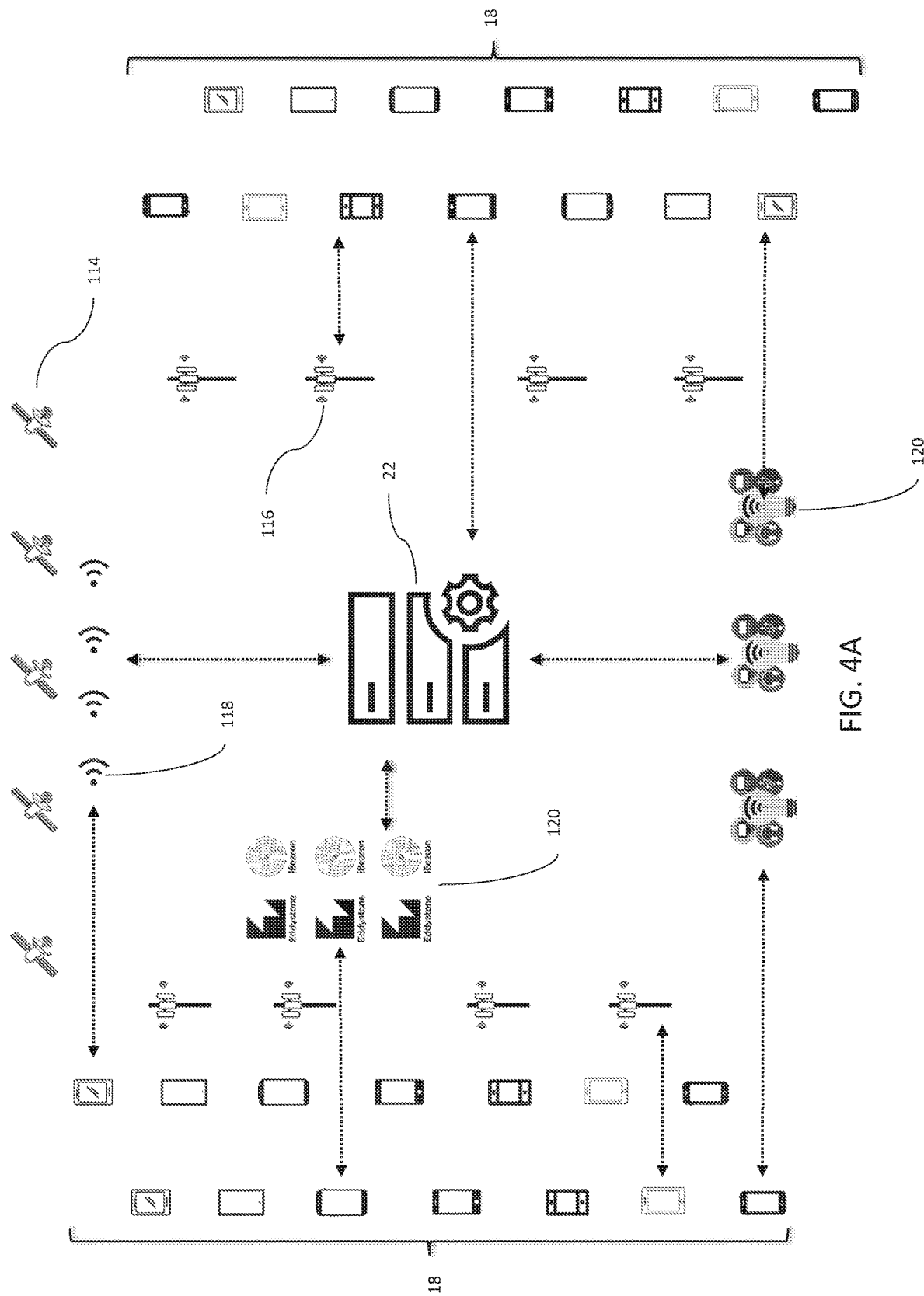
FIGS. 4A and 4B are highly schematic diagrams of a location determination module (positioning sensors) for AR hyperlink content reading and recording of an embodiment of the present invention.

FIG. 4A illustrates a presently preferred network connection 110 schema for allowing recorders 200 and readers 300 of the system 100 to operatively connect with the system to record 200 and read 300 AR element (AR hyperlink) 12. Preferably the system 100 may be utilized both in and out of doors. By way of illustration a plurality of smart device (handy) 18 may be connected to a server 22 via a cellular network 116 (when available) and have consistent and reliable location information 114 via a GNSS system or the like. When a cellular connection 116 is unavailable, Wi-Fi or Bluetooth 118 may be utilized to provide both connectivity 110 and user 20 location information 114 (triangulation, multilateration, or the like). LiFi 120 and other indoor location and connectivity systems may also be utilized (Eddystone, iBeacon, UWB) to provide robust system 100 connectivity 110 for both recording 200 and reading 300.

Figure 4B:
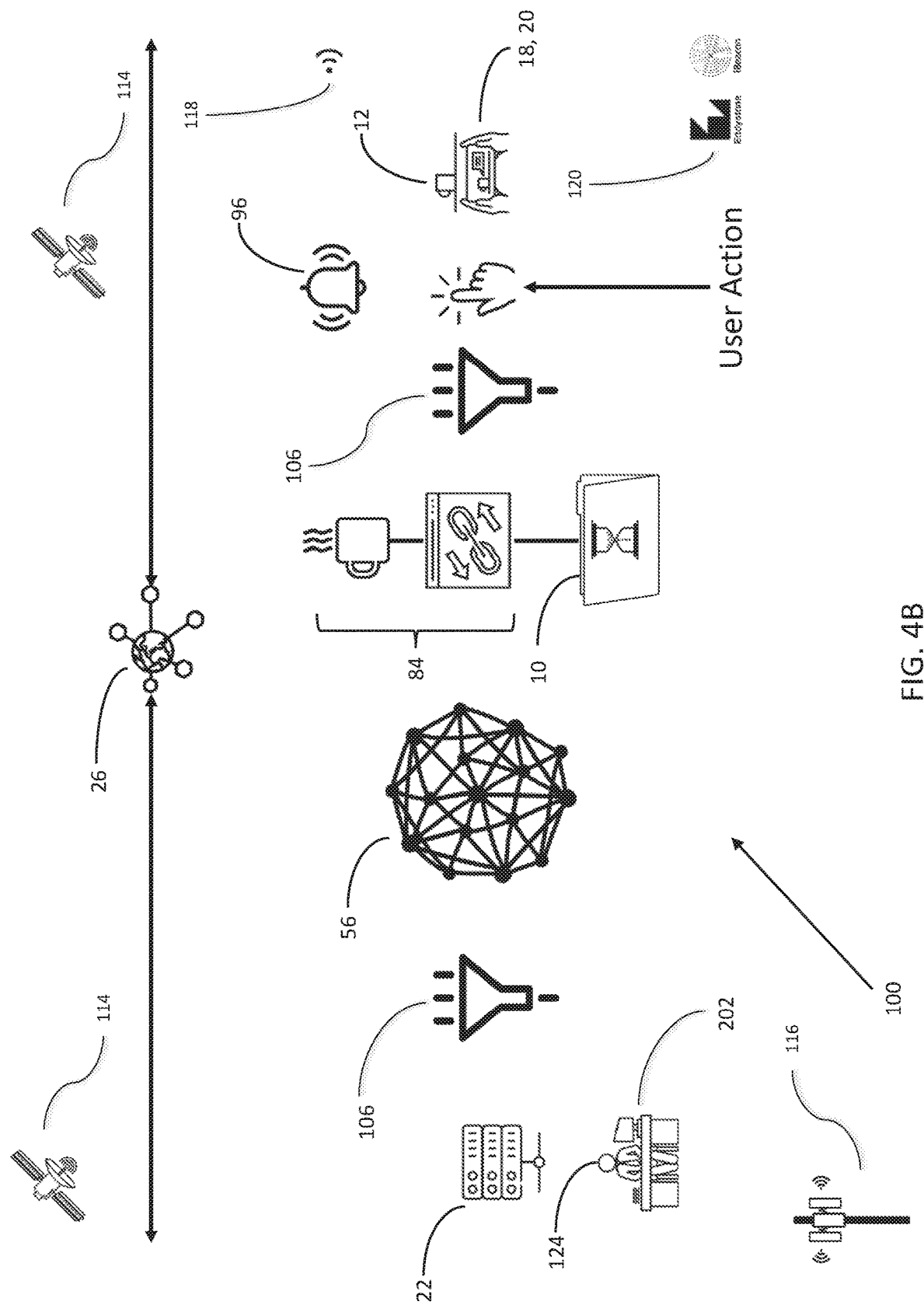

FIG. 4B diagrammatically illustrates an embodiment of the system and apparatus 100 (see, e.g., FIGS. 1A, 1B, 2, 3, and 4A) where a moment 10 hyperlinked to an object 32 tagged to a location 16 via an emoji/avatar AR hyperlink 84 may be viewed by a user 20 operating an enrolled smart device (handy) 18 on a network 26 connect to a server 22. The user 20 may receive notifications 96 of available relevant moments 10 via a filter (or filters 106, e.g., system 100, estate holder 124, and/or user 20 selected characteristics 210 or the like). The communication network 26 may include the INTERNET 56, cellular network 116, other wireless connectivity 118 to provide a user 20 connection with location-based services 24, and a server 22. Likewise, an augmented property holder 124 may access the system 100 via a terminal 202 or the like (smart device 18) to place content 14 in moments at locations 16.

Figure 5A:
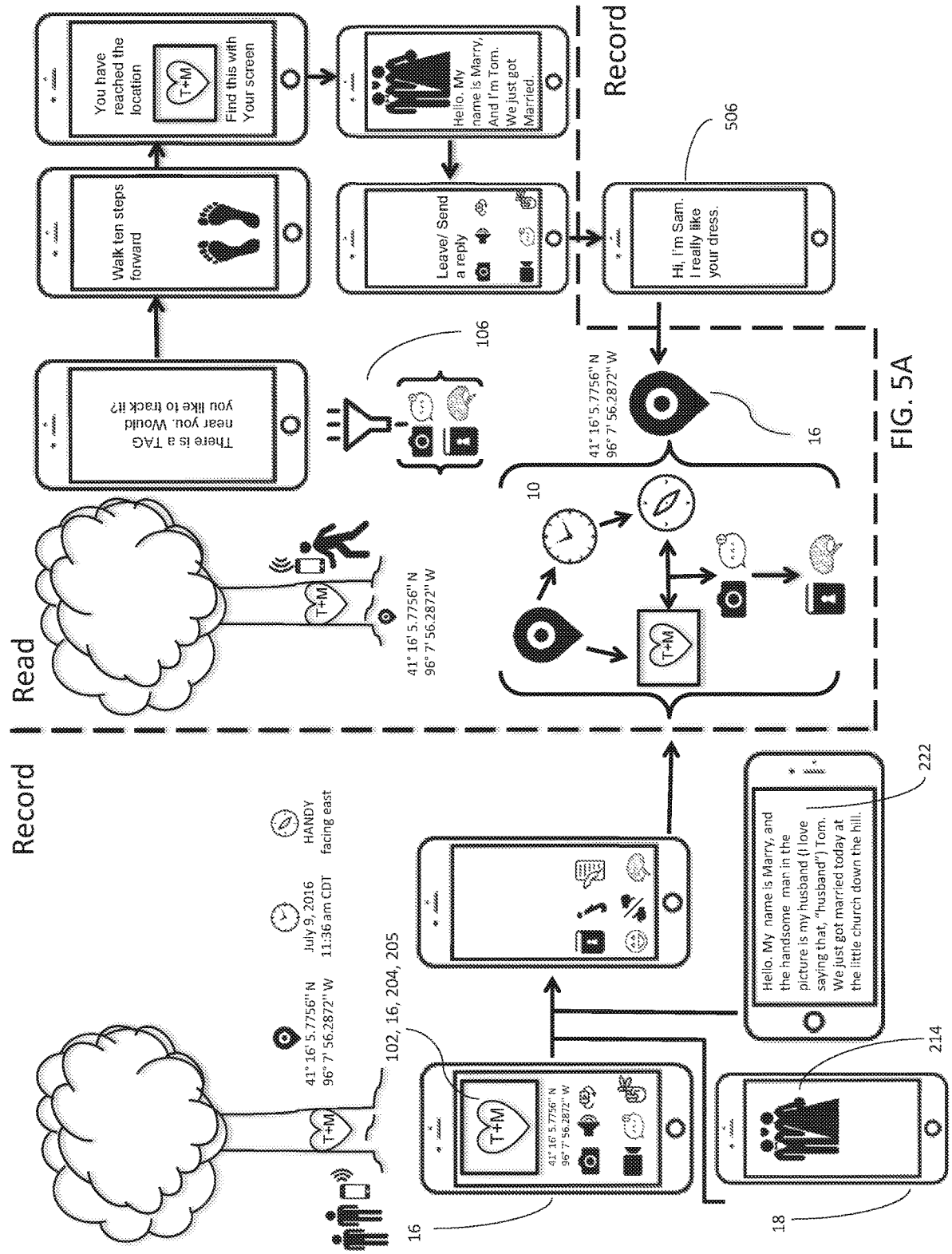
FIGS. 5A and 5B are environmental diagrams of an embodiment of an example of a moment location tagging aspect of an embodiment of the present invention.
Figure 5B:
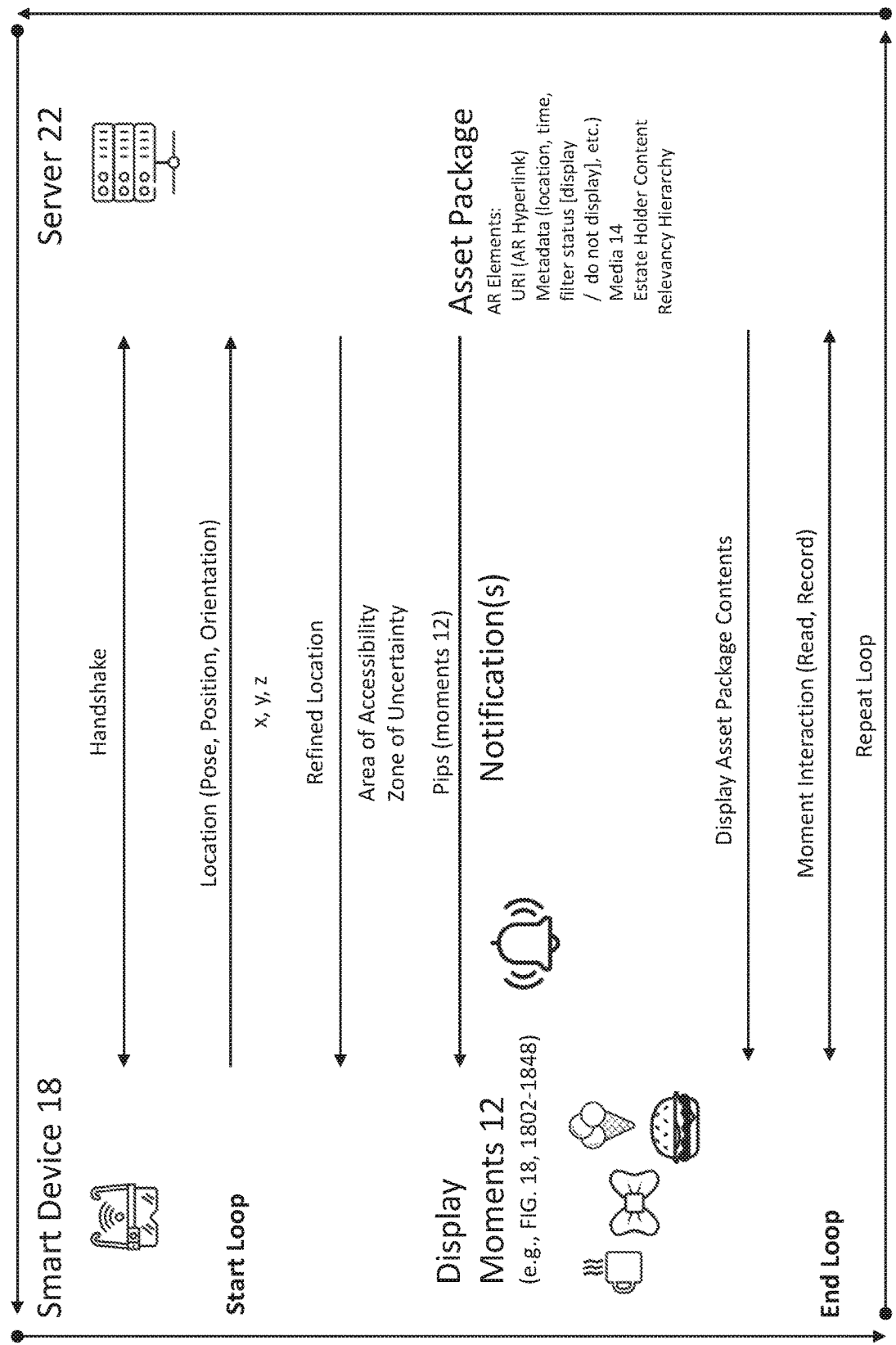

FIGS. 5A and 5B illustrate a presently preferred means of utilizing an embodiment of the present invention. Users 20 may record 200 a heart and initials virtually or actually carved into a tree. The object (carving) may then be associated with their initials (and other media) virtually into a tree. Users 20 may decide to capture the moment using aspects of the moment system 100. Using smart device (handy) 18, a user 20 may tag a particular location (longitude and latitude) of the tree, a reference object (i.e., heart carving), orientation 205 of an enrolled handy recording the moment, and a time 204 of the tag. Users may then select to leave a picture 224 and a text 222 in the AR element (AR hyperlink) 12 attached with the paired location-object (tree-heart). Selecting a message type may also be provided, e.g., a feeling 312 and/or diary 302. After the passing of time another user 20 in the vicinity of the tagged location (tree) with appropriate filter settings (appropriately selected filter preferences or viewing authorization) may be alerted of a nearby moment 10. The moment 10 may be investigated or ignored. If the moment 10 is to be read, shared, an embodiment may tell a user 20 how many of their steps (and in what direction) the recorded moment 10 resides. Upon following a set of instructions and properly orienting 205 an enrolled smart device (handy) 18 toward a tagged object a moment 10 may be read 300. This and subsequent users 20 may comment on the original and subsequent moment with a new AR element (AR hyperlink) 12+ (FIG. 6) or with additional moment file 10 content in the existing moment AR element (AR hyperlink) 12. A different media may be utilized, and a reply may be sent to the original recording enrolled smart device (handy) 18. It is noted that an enrolled smart device (handy) 18 must be proximate the location 16 of a recorded moment 10 and oriented 205 toward the location 16 of the recorded moment 10 in order to read 300 the AR element (AR hyperlink) 12.

Figure 6:
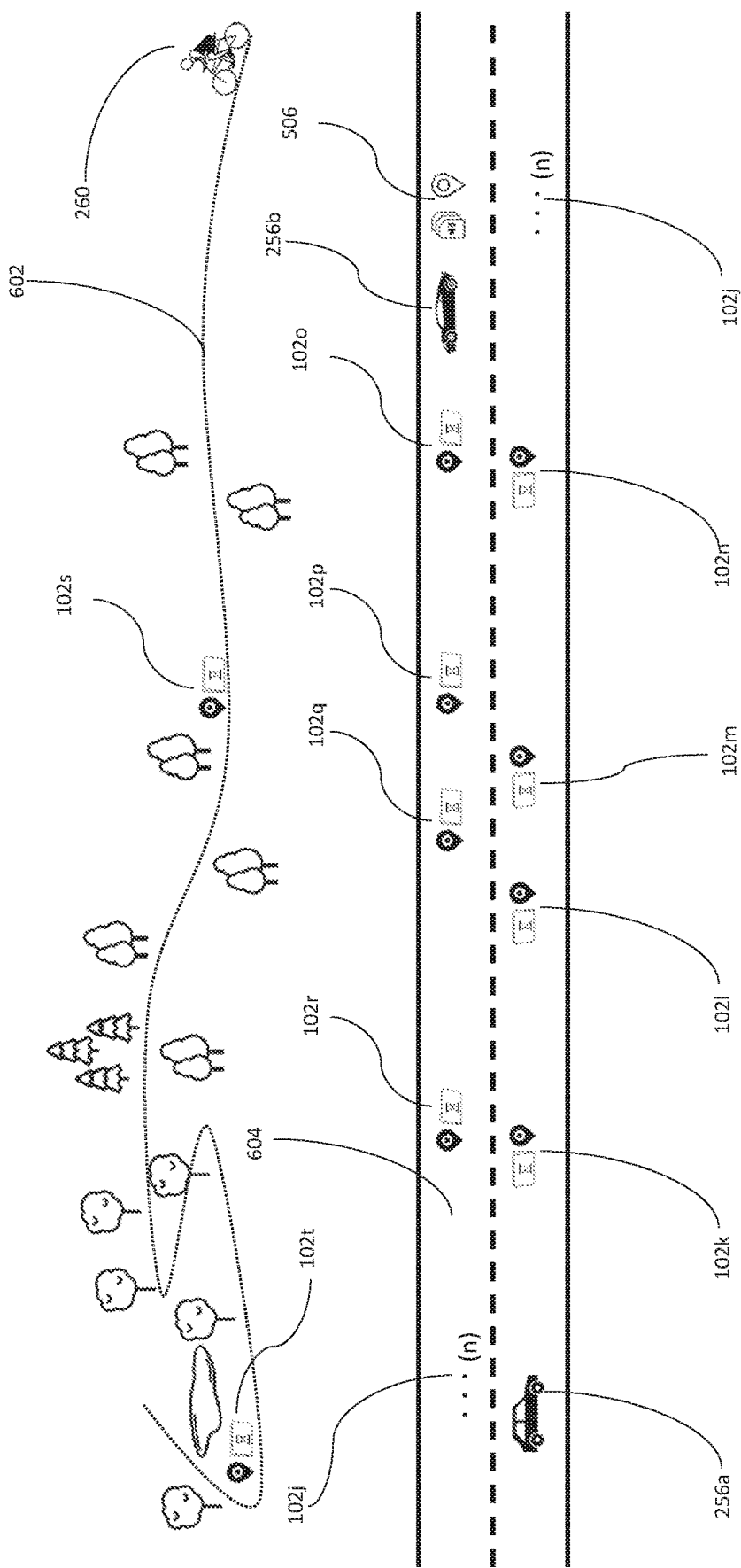
FIG. 6 is an environmental diagram illustrating an embodiment of a locomotion-based embodiment of an aspect of the present invention.

FIG. 6 illustrates an embodiment of the system 100 for utilization while moving 208. In operation a user 20 may leave a string of moments 102k-102t along a travel way 602, 604. It is noted that a user 20 may leave a string of any number of moments 12j. A user 20 in a vehicle (or walking 262) may both record and read 150 AR element (AR hyperlink) 12 along the path. For example, a plurality of photographs 214 (album covers) and songs 216 might be left as a playlist for reading (watching/listening) by a user 20 traveling (in a vehicle 256, bicycle 260 or the like). Member users 20 and the like may subscribe to a single or various recorders for listening and viewing the travels and travel interests of a person (recorder) they follow via their filter 106 (blogger/disk jockey). Likewise, a plurality of photographs 214 or video snippets may be left showing scenic areas along a route during different seasons or conditions. Additionally, a recorder may record commentary or opinions as in a travelogue or the like. Member users following a particular author (travel writer/blogger) may obtain a more complete and fulfilling travel experience. Furthermore, children and the like may experience the commentary of past travel (e.g., a travelogue) recorded moments 10 of a parent (family member or friend) along a particular route. Moment archeologist of the system 100 may track, write histories, study, promote policies, predict future interest, and the like.

Figure 7:
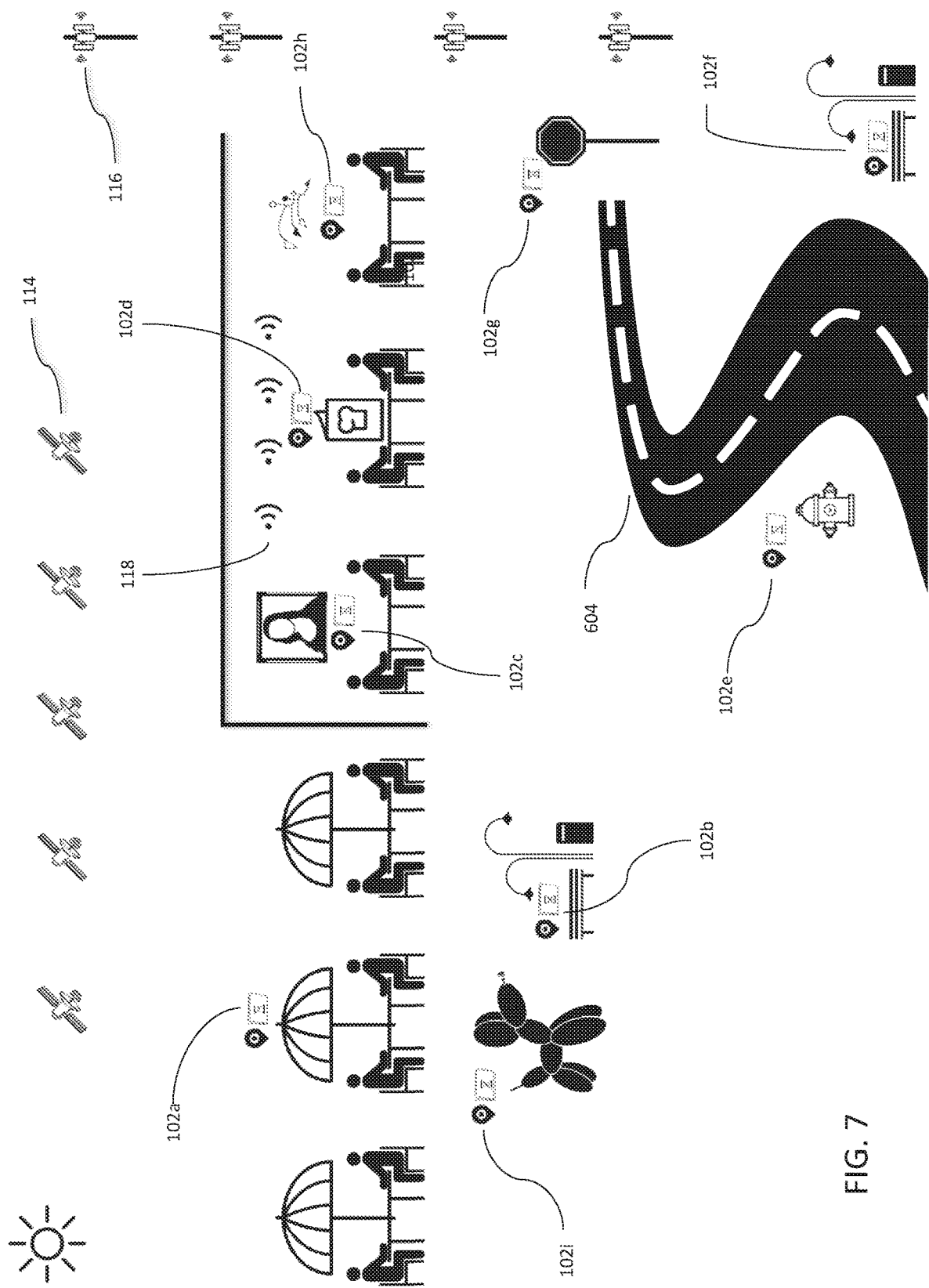
FIG. 7 is an environmental diagram of various aspects of an exterior and interior utilization of an embodiment of the present invention.

Turning now to FIG. 7, an AR element (AR hyperlink) 12a may be recorded at an outdoor table at a restaurant or café memorializing a moment via a particular medium or collection of media such that another user 20 may experience or enjoy a particular aspect saved 200 by another user 20. In an indoor table a user 20 might read 150 (or record 152) a moment 10 regarding an object such as a painting 12c. The user's 12 enrolled smart device (handy) 18 (or the like) may provide location 16, orientation 205 and connectivity via a wireless network 118. Additionally, a user 20 may opine 310 regarding a menu item 12d or menu, or meal, or the like. Information 308 regarding a particular locus in quo may also be shared via an embodiment of the system 100 of the present invention. Some locations including interesting objects, such as a sculpture, thing, or the like 12h, may warrant a comment or moment 10 of interest to other users 20. Outdoor venues may also include objects to be tagged with a moment 10 such as an outdoor sculpture 12i, bench 12b, hydrant 12e, bus stop 12f, sign 12g, or the like. Location data may be derived via a GNSS network 114 or wireless network 118, or the like.

Figure 8:
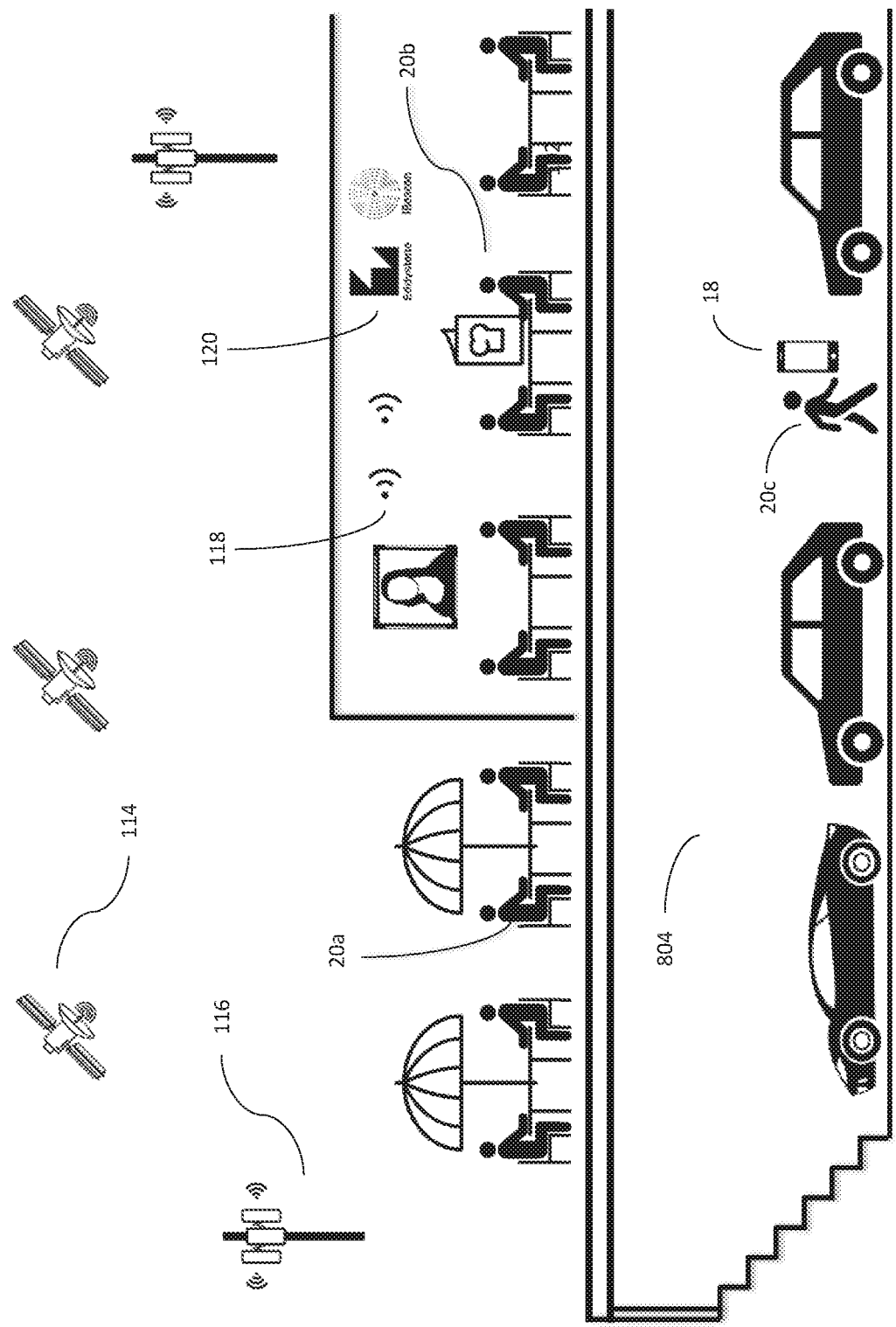
FIG. 8 is an environmental diagram of various aspects of obtaining location information of an embodiment of the present invention.

FIG. 8 illustrates, by example, the utilization of an embodiment of the moment system 100 in various places where different methods of obtaining location information 114 may be employed. Location information 114 may be obtained from a cellular network 116 via a GNSS system, a Wi-Fi or Bluetooth 118 connection, a LiFi 120 connection, or an enrolled smart device (handy) 18 position and orientation identification system (position and pose reporter, e.g., an IMU or the like and GNSS [or other terrestrial or space-based system] respectively). For example, a user 20a located in an outdoor venue may obtain from a cellular network 116 location information 114 via a GNSS system or the like. By way of another example, a user 20b located in a building may obtain location information 114 from a Wi-Fi or Bluetooth 118 connection or a LiFi 120 connection. It is noted that a user 20b may not have a cellular network 116 signal within a building or the signal may be diminished, and a Wi-Fi or Bluetooth connection is the only communication method of obtaining location information 114.

It is noted that in various situations not all methods of obtaining location information 114 will be available to a user 20. In some situations, the strength of an externally transmitted positioning signal may be diminished, intermittent or absent in a particular location where a user 20 is located with an enrolled smart device (handy) 18. For example, a global navigation satellite system (GNSS) 114 such as the global positioning system (GPS) may provide a diminished signal to an enrolled smart device (handy) 18 of a user 20 located in an underground parking garage 804 and thereby prevent the enrolled smart device (handy) 18 from receiving location information 114. In situations where location information 114 cannot be obtained by an enrolled smart device (handy) 18 via an externally transmitted positioning signal or internal spatial position and orientation identification system operating on an enrolled smart device (handy) 18 may provide location information 114. For example, in the absence of an externally transmitted signal for positioning an enrolled smart device (handy) 18 may determine its location 16 and orientation 205 utilizing one or more measurements of the instruments contained in an IMU of the enrolled smart device (handy) 18 and a point of origin. It is further noted that in some situations the only method of obtaining location information 114 may be by way of a position and orientation identification system operating on an enrolled smart device (handy) 18 (position and pose reporter, e.g., an IMU, beacon (e.g., UWB or the like) and GNSS respectively).

Figure 9:
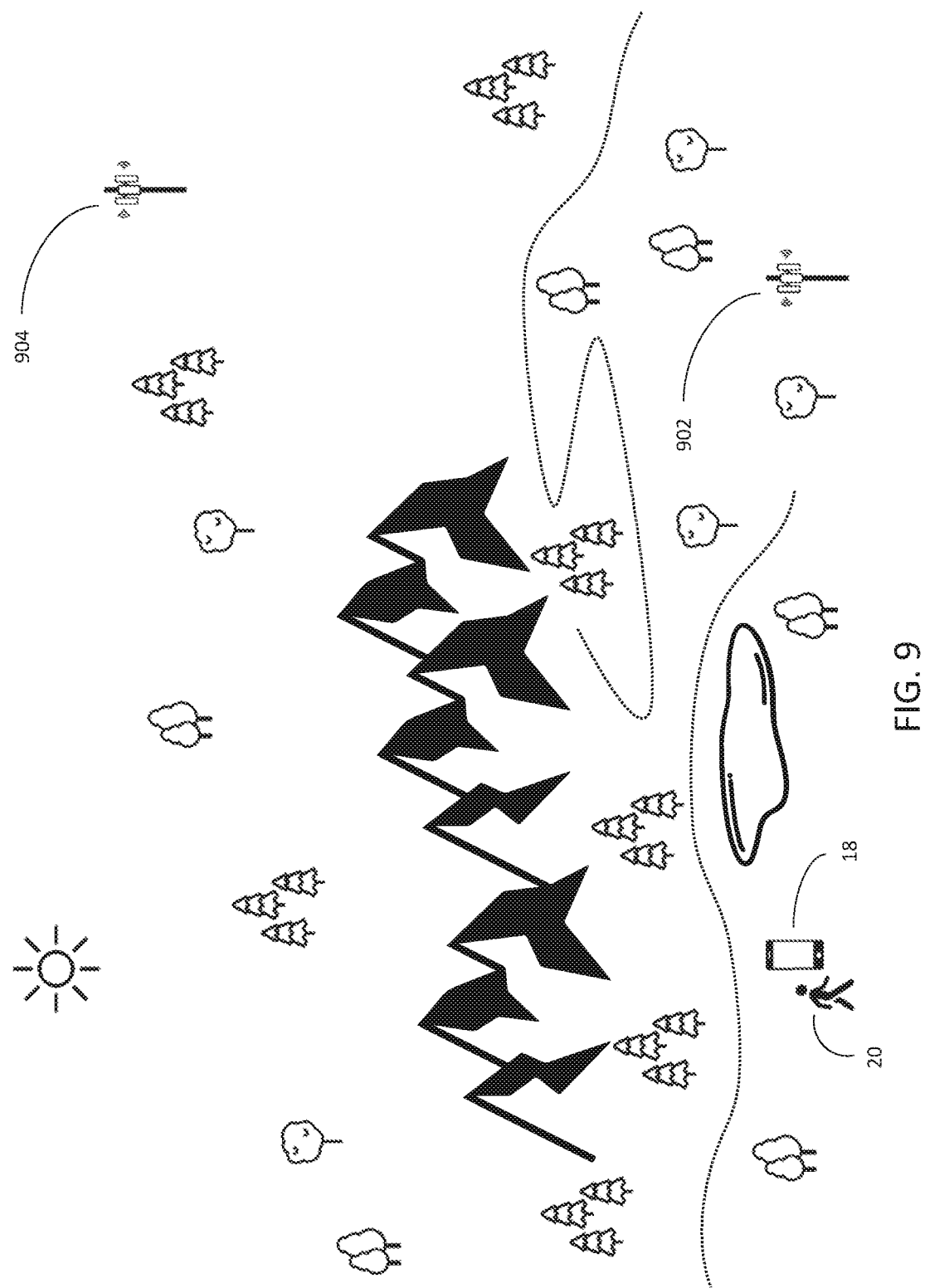
FIG. 9 is an environmental diagram of various aspects of determining location of an embodiment of the present invention.

FIG. 9 illustrates, by example, the utilization of an embodiment of the moment system 100 where a position and orientation identification system operating on an enrolled smart device (handy) 18 is used to determine location. For example, an enrolled smart device (handy) 18 operated by a user 20 in a remote location may be unable to perform multilateration (or trilateration) of radio signals from two towers if only one tower 902 is in proximity of the enrolled smart device (handy) 18 or if the radio signals received from two cellular network towers 902, 904 are too weak.

By way of another example, when traveling in a subway an externally transmitted positioning signal may be intermittent and connection may be made and lost a number of times during the course of travel.

In situations where an externally transmitted positioning signal is diminished, intermittent, or absent the system may utilize instruments integrated into the enrolled smart device (handy) 18 to determine location. For example, the system may calculate the location of the user utilizing measurements from a magnetometer, an accelerometer, a gyro sensor, or a gyroscope. An orientation of an enrolled smart device (handy) 18 may be determined by a magnetometer. A direction of movement by a user 20 may be determined by an accelerometer. A change in a direction of movement of a user 20 may be determined by a gyro sensor or gyroscope. Based on a particular situation a magnetometer, an accelerometer and a gyro sensor or gyroscope may function independently or collaboratively to determine a location and orientation of a user 20 that is experiencing a disruption in or absence of an externally transmitted positioning signal. The position and orientation identification system may determine a location that includes a longitude, a latitude and an elevation; as well as an orientation of the enrolled smart device (handy) 18 that includes a pitch, a yaw, and a roll.

In the absence of an externally transmitted signal for positioning an enrolled smart device (handy) 18 may determine its location 16 and orientation 205 utilizing one or more measurements of the instruments contained in an IMU of the enrolled smart device (handy) 18 and at least one of a point of origin, a destination or a waypoint along a journey. For example, in the absence of an externally transmitted signal for positioning an enrolled smart device (handy) 18 may determine a course traveled and orientation 205 (pose reporter) utilizing one or more measurements of the instruments contained in an IMU of the enrolled smart device (handy) 18 once travel is complete and a destination is recorded by a user 20. At times an externally transmitted signal for positioning may be present when travel begins and therefore the point of origin is known by the system. In other situations, a user 20 records a point of origin in the system before travel begins. In these situations, the system will track the location and orientation of the enrolled smart device (handy) 18 during travel by recording the change in location and orientation of the enrolled smart device (handy) 18 during the course of travel.

When an intermittent externally transmitted positioning signal is present an enrolled smart device (handy) 18 may utilize one or more measurements of the instruments contained in an IMU of the enrolled smart device (handy) 18 to determine a location 16 (position reporter) and an orientation 205 (pose reporter) of the enrolled smart device (handy) 18 utilizing the last known location of the enrolled smart device (handy) 18 as a point of origin. For example, in situations where an intermittent externally transmitted position signal exists the position and orientation identification system may treat each loss of signal as an absence of an externally transmitted position signal and begin tracking location 16 and orientation 205 of the enrolled smart device (handy) 18 until the externally transmitted positioning signal is acquired again and a location 16 and an orientation 205 of the enrolled smart device (handy) 18 may be verified by location information 114.

In some circumstances a user 20 may record in the system a locomotive source, a point of origin, or a destination. In a situation where an externally transmitted positioning signal is diminished, intermittent or lost the system may determine the progress of a journey and thereby a location of a user 20 until the externally transmitted positioning signal is again received if a point of origin and destination have been recorded in the system. In this way moments may be recorded while a user 20 travels and has a disruption in an externally transmitted positioning signal. Additionally, by determining the location of a user 20 while the user is traveling a moment 10 may be viewed when the user becomes proximate to and oriented toward the location of a recorded moment 10.

Figure 10:
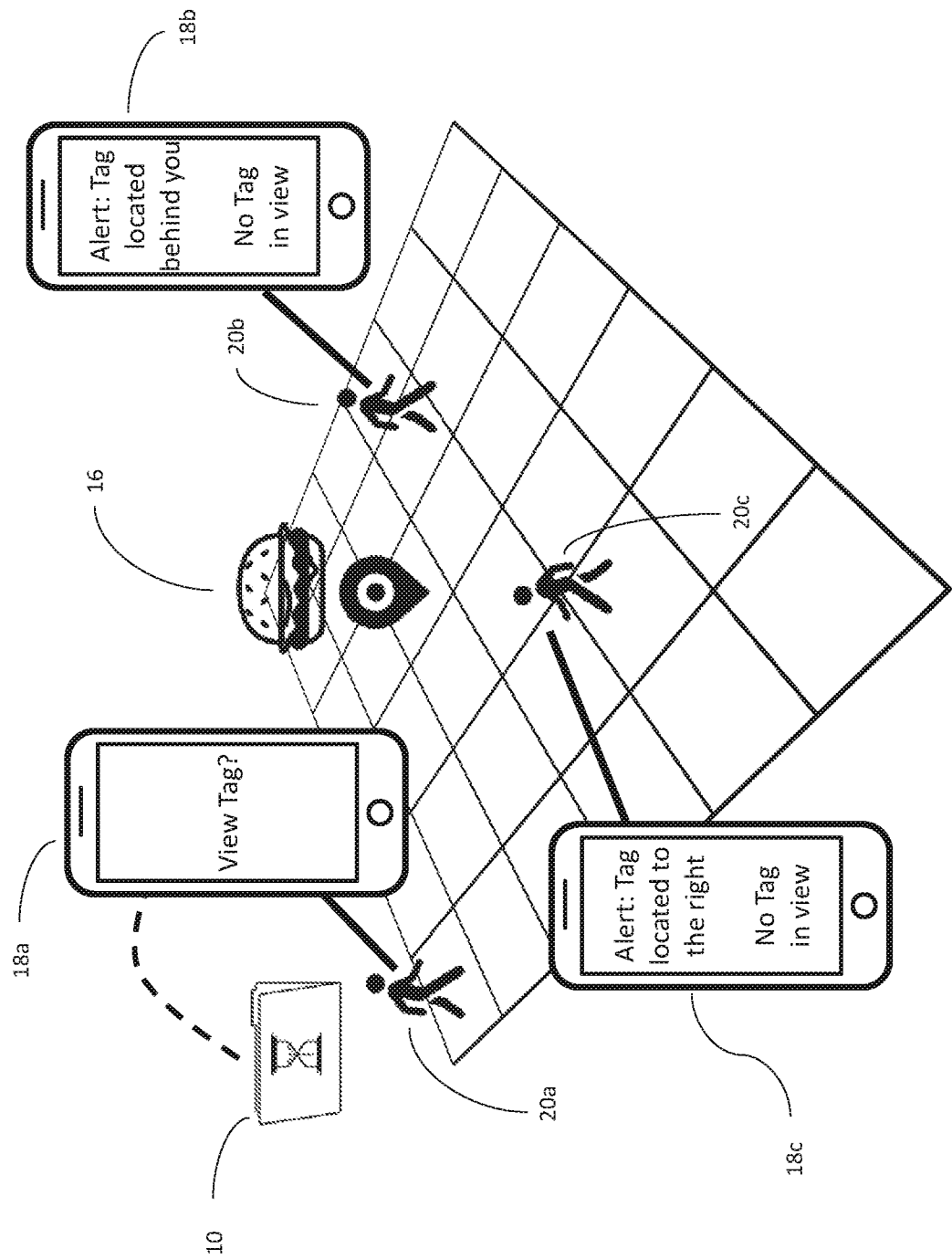
FIG. 10 is an environmental diagram illustrating the utilization of location and orientation to identify and locate a moment of an embodiment of the present invention.

FIG. 10 illustrates, by example, an embodiment of the system 100 utilizing location and orientation of an enrolled smart device (handy) 18 to identify and locate viewable moments 10. For example, a moment 10 tagged to a location 16 may be viewable if an enrolled smart device (handy) 18 is both proximate and oriented 205 toward a tagged location. For instance, a user 20a proximate and facing a location 16 tagged with a moment 10 may be alerted by an enrolled smart device (handy) 18a of the existence of a viewable moment 10. It is noted that the user 20a is alerted of the existence of a moment 10 that has been tagged to a location 16 because the user 20 has an enrolled smart device (handy) 18a proximate the location 16. It is further noted that a tagged moment 10 is viewable only once an enrolled smart device (handy) 18a is both proximate and oriented 205 toward the location 16 of the tagged moment 10. A user 20b that is proximate a tagged location 16 and has an enrolled smart device (handy) 18b oriented 205 away from a location 16 may be alerted of a tagged moment 10 nearby. A user 20b may choose to follow instructions to locate the moment 10 or ignore the alert. Once an enrolled smart device (handy) 18b is oriented 205 toward the location 16 the moment 10 is viewable and may be read 150. Likewise, a user 20c that is passing by and proximate a tagged location 16 may be alerted by an enrolled smart device (handy) 18c of a nearby tagged moment 10. A user 20c may choose to follow instructions to locate the moment 10 or ignore the alert. Once the enrolled smart device (handy) 18c is proximate and oriented 205 toward the location 16 the tagged moment 10 is viewable and may be read 150.

FIG. 11 illustrates, by example, the utilization of an embodiment of the moment system 100 in a museum. Users 20 may leave tagged moments 10 associated with art objects 122 containing editorial, opinion, and informational media or the like. WIKIPEDIA® like articles, encyclopedia entries, and the like may be appended to or be part of a moment 10. Likewise, content created by the system 100 may blend moment 10 content to form AR element (AR hyperlink) 12 abstracts of a particular location or thing of interest. Additionally, a professional, such as a curator may leave moments 10 near objects 122. These professional comments (moments 10) may be commented on by other users 20 and shared within a small group or the like. In a preferred embodiment an administrator may first approve or reject moments 10 left within a geo-fenced area (around an object, within a facility) or the like. In this fashion, an authority may control the type of moment's readable/recordable (150, 152). Likewise, paid moments 10 may be left on or about a facility tied to a particular activity 208 or object 122. Other monetization schema may also be employed, e.g., a subscription to the recordings of a particular recorder 20. A filter for filtering all commercial moments 10 may also be available for a subscription requiring a set number of recorded moments 10 over a particular period of time (or a small pecuniary fee). Subscription revenue (in at least one embodiment) may be wholly or partially distributed to an appropriate holder 28, 1306 in the form of reduced fees or the like. Highly desirable moment content 10 may be associated with a brief, a paid announcement, or the like.

Figure 12:
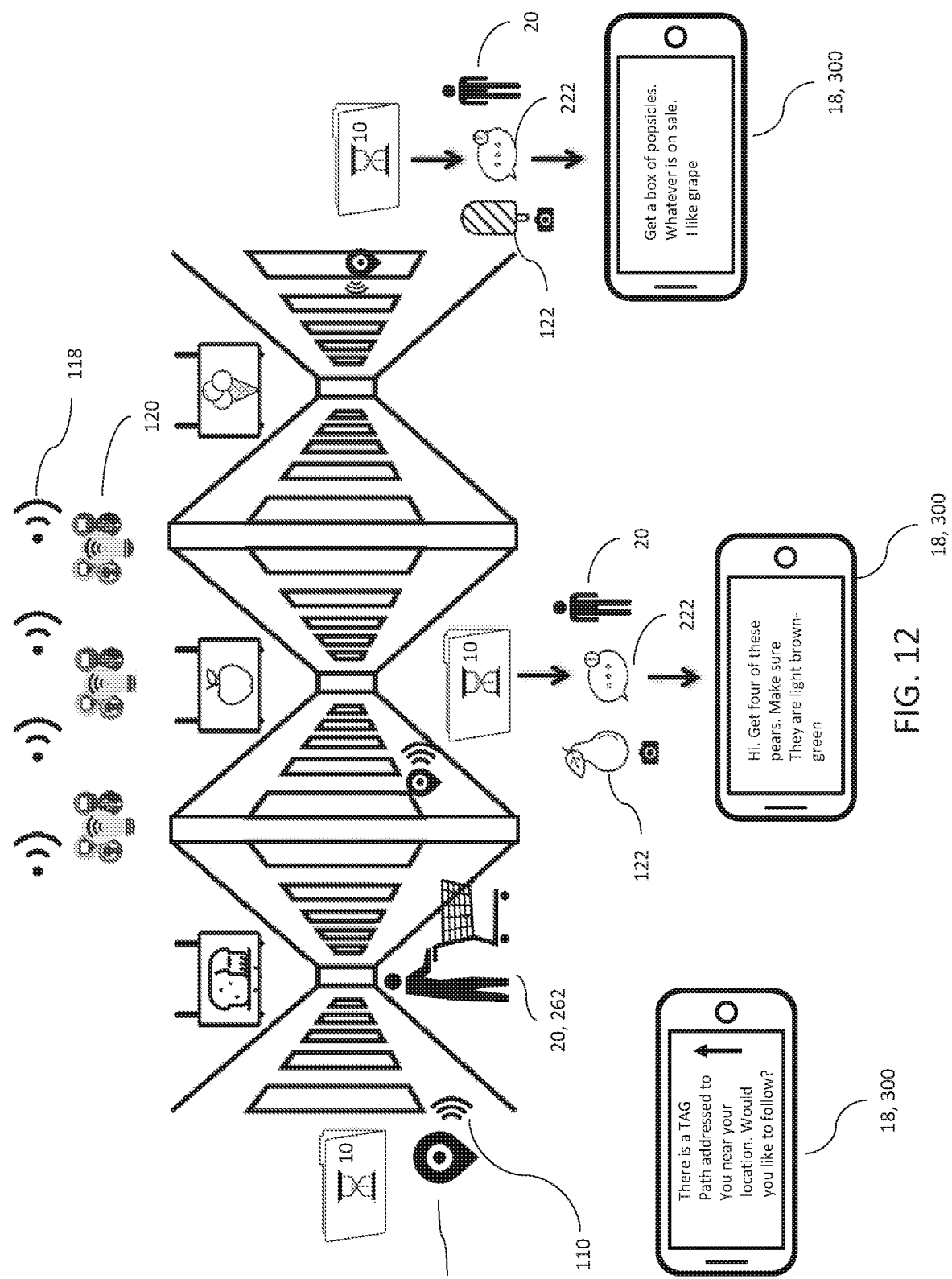

FIG. 12 illustrates an embodiment 100 of the invention in a retail environment. A user 20 might leave a plurality or moments 10 near and associated with grocery items and the like. A user desiring to make a particular recipe or the like might follow a plurality of moments 10 within a grocery store or the like to purchase the correct or desired items. A virtual shopping list 34 may be created containing other suggested items necessary to fabricate a particular dish 38 or the like. A significant other might leave shopping instructions 1202 for their partner. Likewise, coupons 36 and discount related information might be interactively obtained by users 20 through AR element (AR hyperlink) 12 of an embodiment of the invention 100. This provides vendors, product placement managers, marketing/advertising professionals, manufacturers, and storeowners to require proximity both in space and/or time to obtain a desirable moment 10. For example, at 8:00 AM a store might be otherwise in need of shoppers on any given day. In order to drive traffic into a store (venue) a scavenger hunt (breadcrumbs, spoor) contest or the like might be utilized to provide discounts or prize type interests for shoppers.

Figure 13:
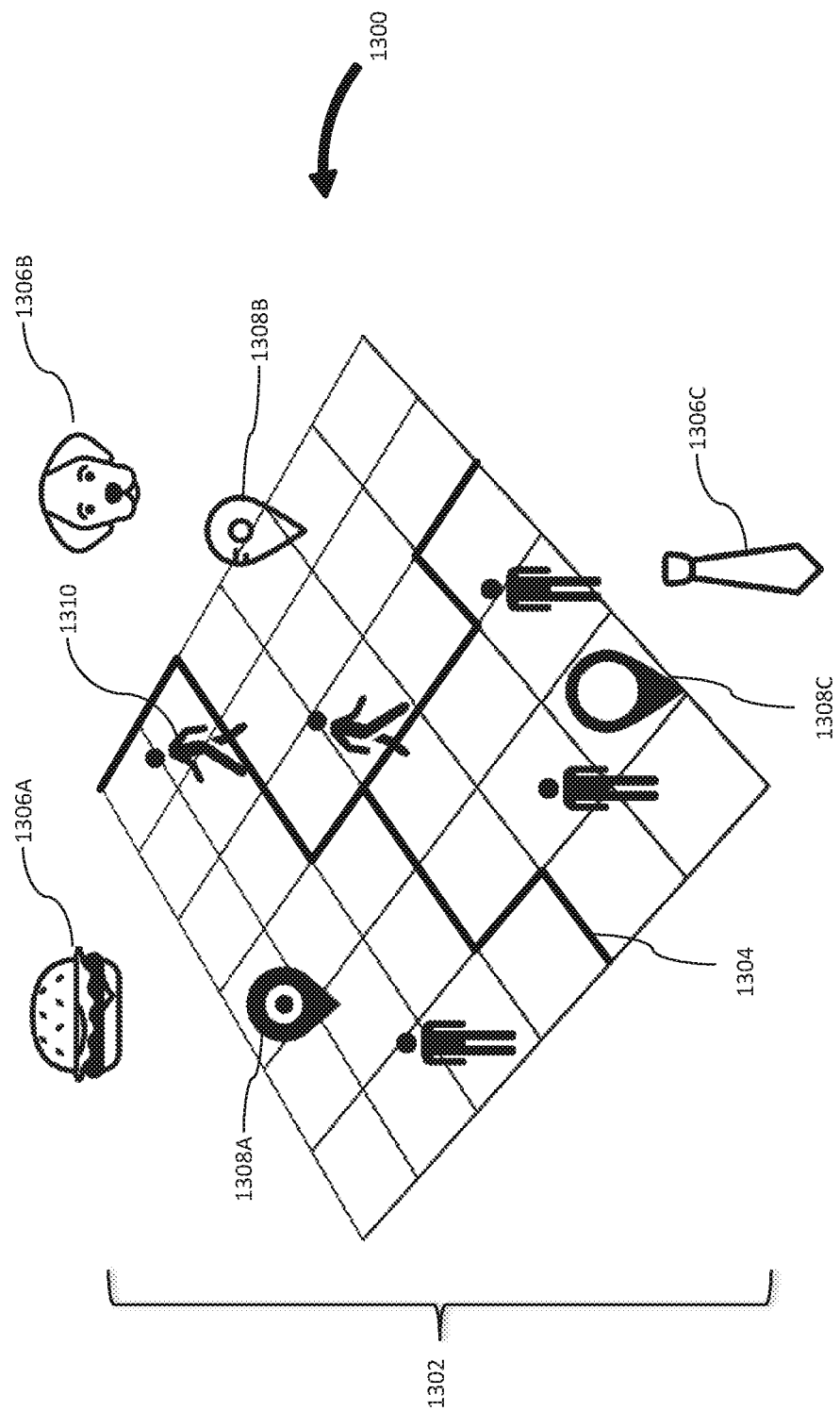
FIG. 13 is a highly schematic representation of an augmented property ownership (control) system for providing a rule of law based augmented property environment.

FIG. 13 illustrates an augmented property map 138 based upon real property boundaries or virtual boundaries 144 in accordance with at least one embodiment of the moment system 100. Users 20 may identify, price, bid on, purchase, negotiate, trade, rent/lease, borrow, and the like a parcel of augmented property 132. Additionally, an owner/holder 1306 of a parcel of augmented property 132 may restrict use and or prevent trespassing users 20 and their associated moment files 10. Moments 10 may only, for example, be left, accessed/enjoyed, and/or seen (visualized by a particular user 20) as provided by the system 100 (in at least one embodiment 100).

In one embodiment users 20 gaining access to a particular location 16 by being physically present in the location may receive some haptic response (ping) originating from the system 100 to a user's 20 enrolled smart device (handy) 18, or from a holder 124, 1306 interested in separately interacting with a particular user 20 reading/recording 150/152 an AR element (AR hyperlink) 12 file. A virtual property ownership system 124 may include an augmented (virtual) map 138 augmenting real or contrived boundaries 144 such that an owner 1306 of augmented property may monetize system 100, users 20, moment file 10 recording/reading 150/152. Augmented property holder 1306 (i.e., 1306A, 1306B, 1306C) identification may be designated with a holder 1306 moment file 1308 which must be accessed/played or the like in order for a user 20 to record or read 150 a moment file 10. In one embodiment, a user moving 1310 across a boundary 144 into another holders' 1306 augmented property may be (or may not be) required to access the crossed into holders augmented property moment identification moment file 1308. A user's 20 time within an augmented estate, and/or number of previously viewed user holder-based content moment files 1308, may modify the content of a holders' moment file 1308 so as to present either full, abbreviated, or no moment file content to said user. In another embodiment, a moment file 10 within an augmented property may be monetized. For example, a pecuniary fee may be required to record 152 or read 150 an AR element (AR hyperlink) 12 with the system 100 within an augmented property 132.

Figure 14:
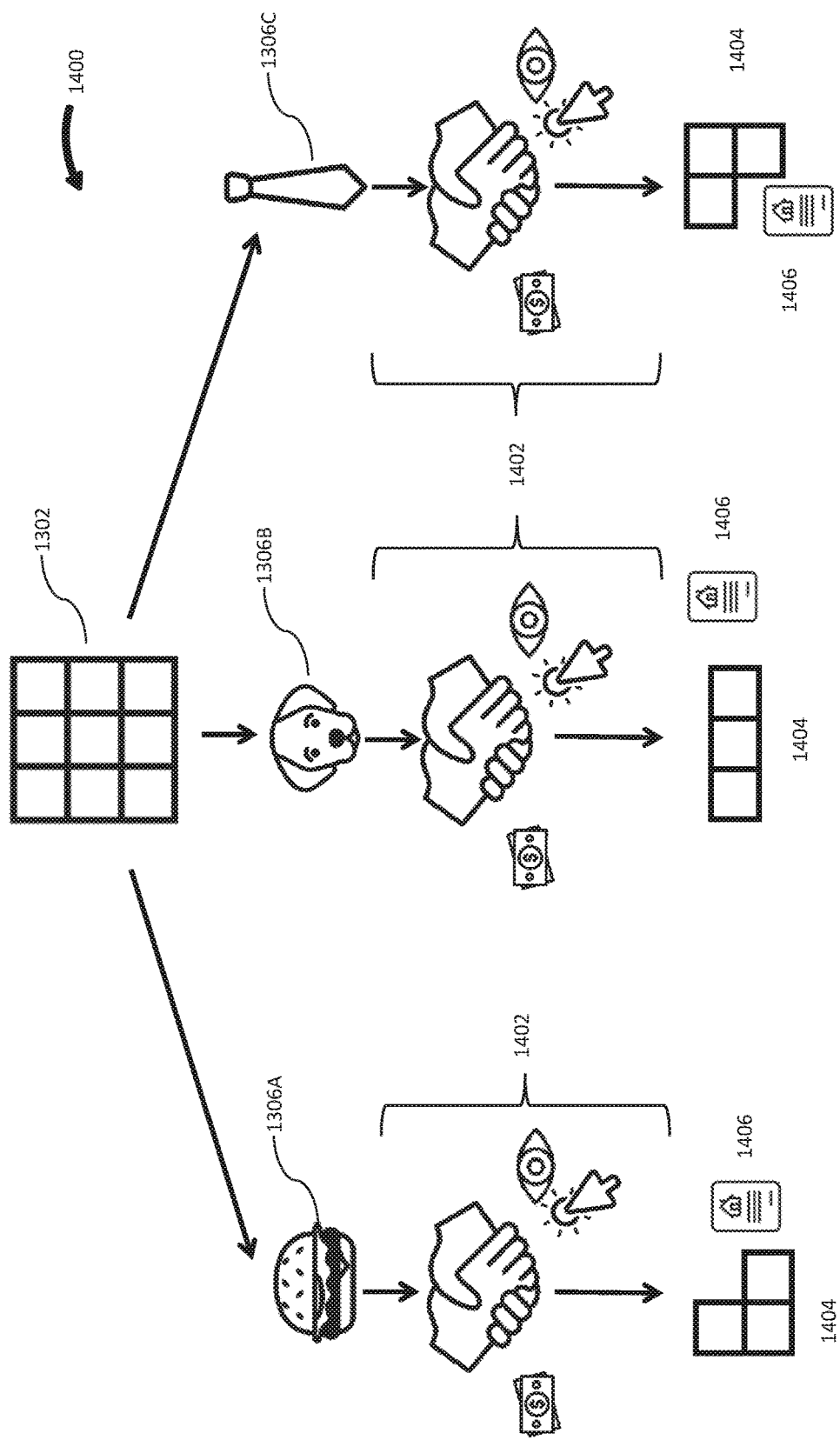
FIG. 14 is an augmented property purchasing flow diagram illustrating means for hypothecating, deeding, owning, obtaining, and divesting augmented property according to a rule of law-based system.

FIG. 14 illustrates a currently preferred process for transferring augmented property in accordance with the system 100 of the present invention. The purchasing process 1400 includes an augmented property 132 divisible temporally, by user population, by clicks, acreage (square meter), onerousness of holder moment 1308 content, by value and frequency of chits or coupons provided to users, coupon downloads, user traffic, and user feedback. Holder 1306 control over augmented property may be limited to actual real property ownership, fee simple, fee tail, temporal estate, lease, or license. An agreement 132 may be utilized to describe terms and conditions incumbent on a purchasing holder's utilization of the augmented property 132. Augmented property deeds 134 may be freely or restrictedly hypothecated or traded in accordance with the agreement 136.

Figure 15:
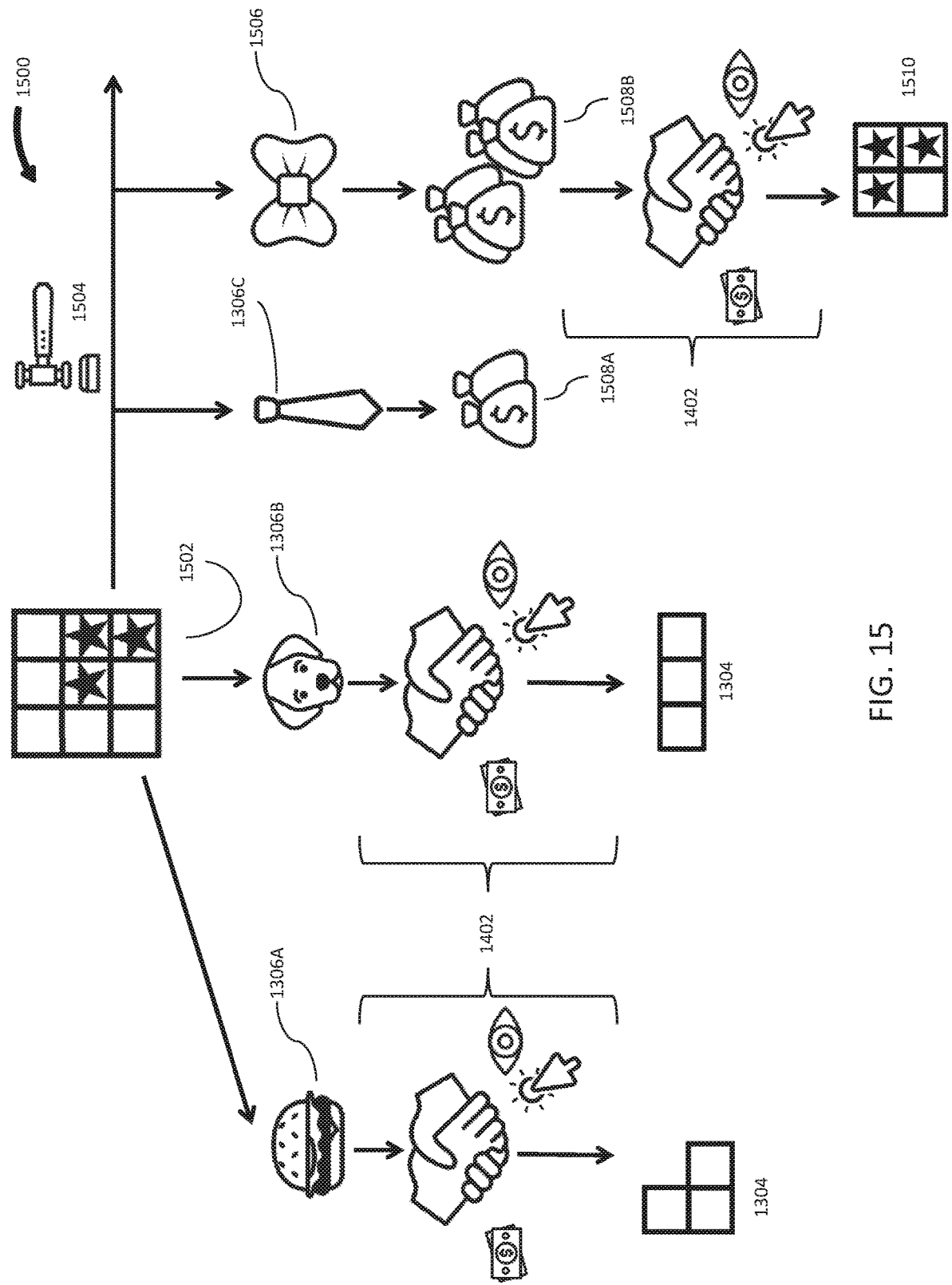
FIG. 15 is an augmented property auction flow diagram illustrating a means of monetizing an embodiment of the present disclosure.

Turning now to FIG. 15, an auctioning system 126 for prized augmented property 132+ or a plot of augmented purchased property 132 in an auction 126 facilitated by the system 100 in accordance with auction standards (minimum bid, absolute, and reserve or the like). Competing bidders 142 may combine interests, divide interests, and otherwise negotiate terms in accordance with the system 100 (auction system 126 rules 136). Rules 136 may be set forth in a system AR element (AR hyperlink) 12 accessible to interested parties to the property 132. Disputes may be decided via an arbitration, a rating system, or the like. Funds 128 may be distributed partially or fully to users providing AR element (AR hyperlink) 12 content based upon user recorded moment 10 ratings, views or the like. The funds 128 may also be distributed by the system 100 to users who access/read 150 AR element (AR hyperlink) 12 located in augmented property 132 in the form of coupons 36 or chits. These coupons 36 or chits may be underwritten back to the holder 124 by the system 100 in the form of reduced lease, rent, click, or property holder maintenance fees (or the like) payments to the system 100. In preferred embodiments enrolled users/devices/readers may enable frictionless access via automatic payments and the like utilizing biometric information and the like. Also, in preferred embodiments a reader 150 may store moments in memory or in a shopping cart for bulk purchase at a kiosk or terminal.

Figure 16:
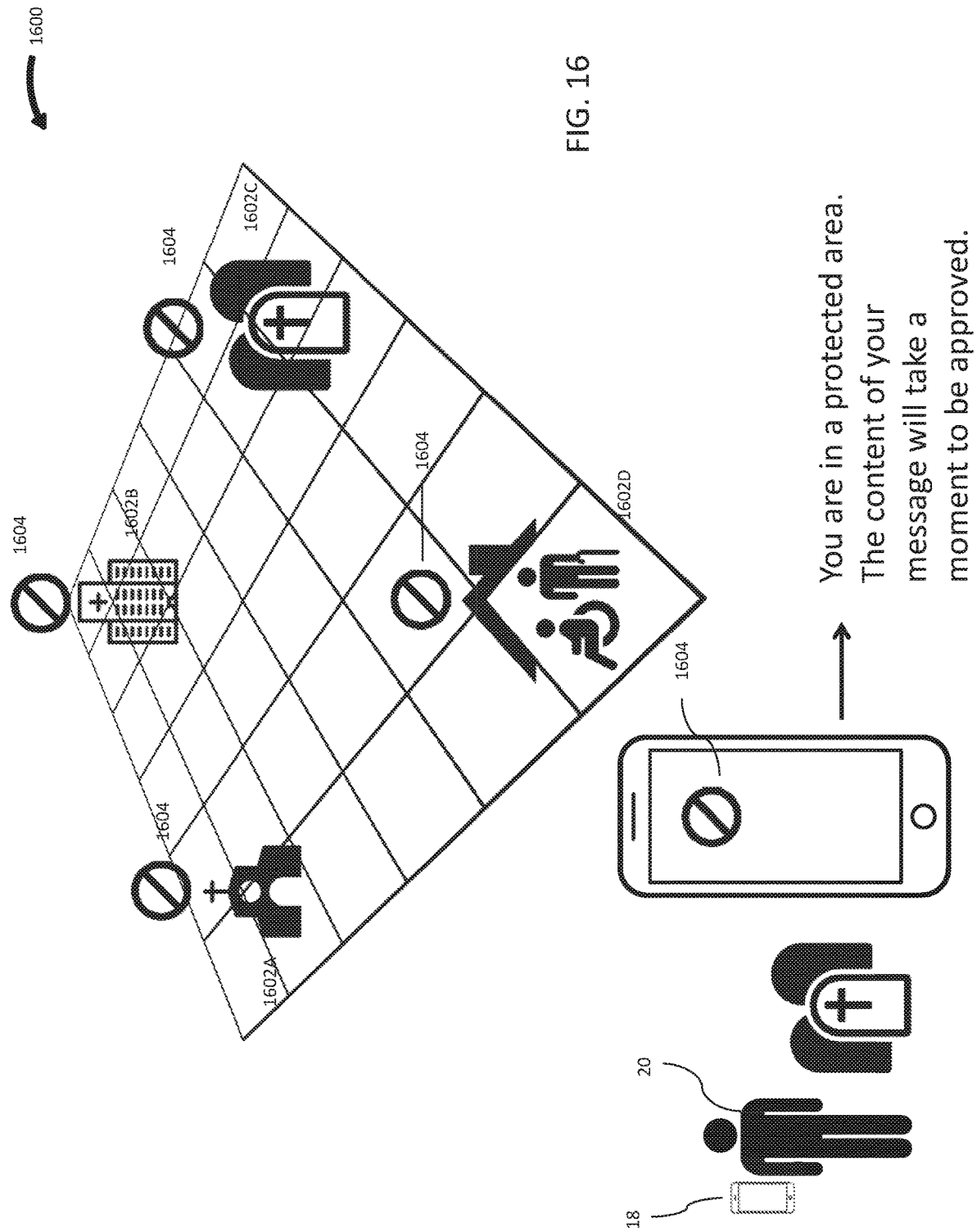
FIG. 16 is an environmental diagram of an augmented estate geo-fencing system of an embodiment of the present disclosure.

FIG. 16 illustrates a feature of an embodiment of the present invention restricting 1604 AR element (AR hyperlink) 12 content recording or reading (viewing) within an augmented geo-fenced area 1602 (churches 1602a, temples 1602b, cemetery 1602c, nursing homes 1602d, schools, and the like). Holders 1306 may also purchase and then prevent all AR element (AR hyperlink) 12 recording/reading 200/300 within the boundaries 144 of their augmented property. Real property holders may seek condemnation (eviction) from the system 100 of an augmented property holder's 1306 interest, which is within the boundaries of the real property holder's estate.

Figure 17:
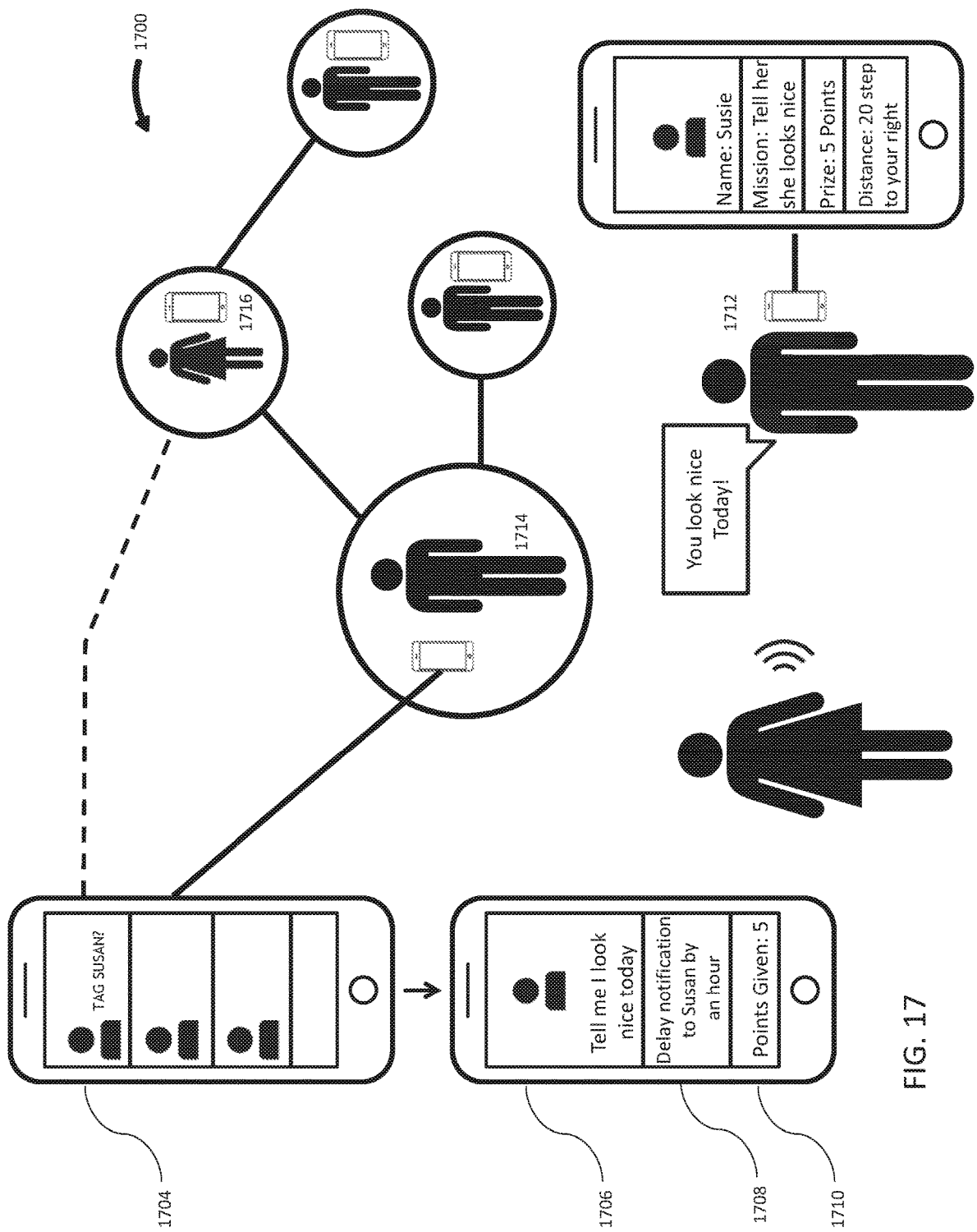
FIG. 17 is an environmental diagram illustrating an embodiment of the present disclosure capable of tagging moment files to a personal object (handy or the like) periodically moving with a user.

Turning next to FIG. 17, the system 100 may be utilized in a method 1700 to allow users 20 to tag other users 20 with AR element (AR hyperlink) 12 content. The system may allow users to restrict AR element (AR hyperlink) 12 content recording on the smart device (handy) 18 location of another user (or the like) by group, content type, or the like. For example, a certain set of restrictions may allow a user in a group to tag 30 another user 1716 in the group. Additionally, another user 1714 in the group may view the moment 1706 tagged on a user in the group. A moment 1706 tag may also be viewable only after a delay 1708 from the time the tag was placed and provide a reward 1710 to a user 1712 that views and follows the instructions of the moment 1706. Generally, it is an object of the present invention to allow system 100 users 20 to control (restrict) AR element (AR hyperlink) 12 posted about them, around them, on their property, by a particular user, group of users, and to otherwise restrict their participation with the system 100 and its users. Such restrictions may be free to users by moment file category, other user identity, moment file content, or the like (hate speech, speech designed to hurt a user or non-user, bullying, unwanted interactions, stalking, and the like are preferably controlled via the system 100 filter 106. Other acceptable but undesirable AR element (AR hyperlink) 12 content may be restricted by (1) user participation level (higher utilization, measured, e.g., by moment file quality and content), or (2) by subscription. Users 20 may also control and designate members within their group, when and where they wish to be reminded of an available AR element (AR hyperlink) 12 (do not notify [ping] while driving, at night, at work, in the theater, or the like). Users 20 may limit the radius (area of accessibility 82) of their interest to certain types of locations, users, geography, and the like.

II. FIGS. 18-20

Turning now to FIG. 18, a user interface for a multidimensional platform of the invention 100 (or the like) is illustrated. User interface icons 1800 may be displayed on a device such as a smart device (handy) 18 (herein various smart device (handy) 18 throughout the appended figures also signify fixed vehicle displays or heads-up-display (HUD) or the like), capable of operation in the system 100 as at least one or both of a moment recorder 152 and/or a moment reader 150 (150 & 152 numerically reference smart devices 18 operating the system of the moment system 100).

Sample user interface icons 1800 for display are preferably representative of AR element (AR hyperlink) 12 content 14 or subject. Users 20 may selectively sort, arrange, and categorize moments 12 in the system 100 (FIG. 2) they have read 150 or recorded 152. Additionally, the system 100 may provide sorting and categorization (e.g., FIG. 2 or the like) according to desired system 100 outcomes. For example, increasing usability, user participation and interest, according to a particular property holder's 1306 interest, or in accordance with some useful social goal (e.g., awareness of laws, dangers, and restrictions or the like). FIG. 18 illustrates an example sample set of moment icons 1800 for an embodiment of the present invention. For example, temporary moments 1802 may be available to be read 150 (displayed and accessible) for a particular singular period of time or for a brief period of time on a reoccurring or randomly reoccurring basis according to a user 20, system 100, or holder 1306 goal. Additionally, moments 10 may signify an opportunity to chat 1804 with another user 20, the system, or a holder 1306. Moments 10 may also be grouped into families' or by category as signified by a single moment 10 user interface icon 1806. Such groupings may be established according to a particular user's 20 interests, by age, game playing field (serial or intersection game board tile/space) in an augmented reality user 20, holder 1306, or system 100 designed and/or administered game. For example, a requirement that a user 20 follow a particular path, solving or achieving certain physical, mental, advertiser, or social tasks in order to achieve a particular goal. In another embodiment a key/password 1808 accessible moment 10 category may require an accomplishment or the like to obtain access to a moment 10. In such an embodiment or the like, sound 1810 moments 10 may be identified and characterized as containing a voice message, musical recording, or the like. Video or movie-based moments 1812 (see also 218, 220 FIG. 2A) and photograph-based moments 1814 (see 224, FIG. 2A) may also include a special interface icon 1800 moment file 10 designation. Users 20 may also design and utilize customized icons to designate their moment 10 content (an avatar 84 or the like). Such customized icons may be available according to specified system 100 rules and or parameters.

FIG. 18 also illustrates other categories of sample moment 10 content which may or may not be available to all users 20. For example, a user 20 may be tagged with a moment 10 icon 1800 representing a personal message 1816 relevant to other users 20 or the like. In an operating embodiment of such a system 100, a user's smart device (handy) 18 (vehicle or the like) might include an icon signifying some aspect or reputational value of such a user 20. Such a tagged user 20 might be tagged with a moniker or representation either positive or negative (1818, 1820). Perhaps a particular user is a poor driver or doesn't obey traffic laws and or etiquette. In such a case they may be visible via a reader 150 of the system 100 wearing (designated by) a particularly designed icon 1800 representing a negative characteristic, e.g., litterer, speeder, thrasher or flamer, and the like; or a positive characteristic, e.g., expert, arbitrator, banker, employee, friend, redeemer, repairperson, troubleshooter, or the like. In one embodiment such a tagged user 20 could remove the tag only after demonstrating to the system 100 ameliorating conduct or the like (e.g., consistently obeying traffic rules, system 100 verified walking 262 an area full of litter and then depositing the litter at a known refuse container or location). Likewise, positive monikers (tags) might be earned via ratings, moment recordings, training, and/or other system 100 designations or assignments. User location data may be required by the system 100 in order for a user to participate. Network-based, GNSS-based, handset-based, SIM-based, Wi-Fi based, Vehicle to Vehicle (V2V), Automatic Vehicle Location (AVL), or other and/or hybrid based handy (vehicle) 18 location tools may be employed.

As previously described in the description of FIG. 2A, opinions 310 may include a negative content 1818 moment file 10, and/or a positive content 1820 moment file 10. Users 20 of the system 100 may also achieve an award 1822 moment file 10 generated by another user 20, a property holder 1306, or the system in a location a user is known to frequent which awards the user 20 with a designation or chit or the like.

In other embodiments of the system 100 (FIG. 18) a user 20 may leave directions 1824 or allow a user to turn system 100 features ON/OFF by accessing (reading 150) a system menu 40 AR element (AR hyperlink) 12 system 100 file. A user's reputation 1830 (biography or the like) may be designated via an icon 1830 worn about a user 20 in the augmented reality of the system 100. Some moments 10 may be time sensitive 1828 or recorded as a reminder of an appointment, road work, weather hazard or the like. Notes and/or instructions 1832 moment files 10 may be categorized and represented by a special icon 1800. Likewise, a user 20 can leave a love note 1834 moment file 10 for a particular user at a special place (accessible at any time or at certain times). Dashboard moment files 1836 may be dispersed geographically providing users 20 with information about new features, changes, statistics, offers, and the like. Likewise, dashboard moments 1836 may provide a moment locator (moment radar) or clues relevant to a particular user/moment, class of user/moment, or the user/moment population.

So as to provide an enhanced social experience for users at least one embodiment may include drifting moments 10 designated by an icon 1838. Such moments may change location by time, user activity, holder 1306 requirements, or according to a pseudo-random operation of the system 100. In other embodiments, users may leave information or instructions designated with a special moment icon 1840. Such information may include the legacy of a historic building, or an acknowledgement of the location where a world record was set. In other embodiments, users 20 may leave moment files 10 asking questions of an unknown but more knowledgeable user, or a known user, or a user with special characteristics. Such question moments 10 may be designated with a special moment icon 1842 ("Did anyone witness _____ on _____?"). Also available in a preferred embodiment of the system 100 are "Easter egg" moments 10 (treasures) designated by an icon 1844 which provide user interest available from a property holder 1306, another user 20, or the system 100 (specifically tailored for a particular user or the like). Other embodiments may include game or puzzle moments 10 designated by an icon 1846 where reading 150 such a moment may entitle a user to puzzle or game play (relevant to the geography, place or the like) where success earns chits or the like.

Cross-platform access may be provided by special moment content 1848 allowing integration with users of other platforms or groups providing entertainment, tools, skills, or items valuable for trade in the system 100 or another platform.

As designated by an X 1850 representing a thing or object of real property 1852, personal property 1854 (stationary or a fixture 1854A or movable or portable 1854B), and virtual property 1856, the system 100 may augment any of these forms of property with a user recordable/readable moment file 10.

Figure 19:
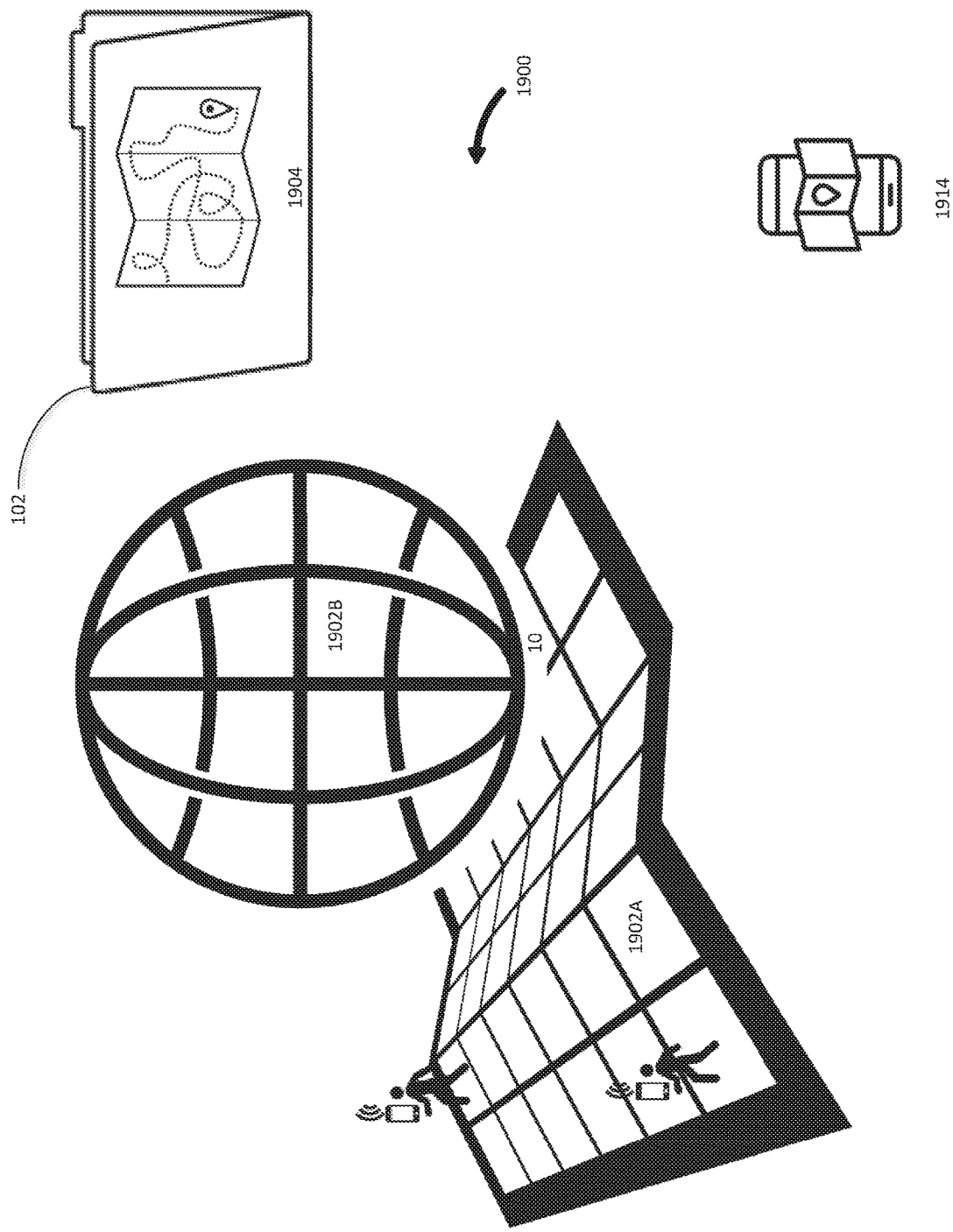
FIG. 19 is an environmental diagram illustrating a moment file-based game for play on an unbounded or bounded augmented playing area based upon at least the real world and its real estate, the chattels distributed thereon, and a virtual space with or without defined boundaries.

Turning now to FIG. 19, a game player (user 20), a property holder 1306, the system 100, or the like may design a game 1900 with static rules, or rules which change according to time of day, day of week, player accomplishment, detours, player misdirection, or the like. A player 20 may be required to access a series of moments 10 placed randomly or intelligently across a bounded 1902A or unbounded 1902B real (or real and virtual or real and augmented) area in a particular order with or without solving a physical, mental, or social problem characterized by recording a moment 10 or the like at a particular location within a given time period or at a particular step. A user 20 may use a game play smart device (handy) 18, or the like to participate in reading/recording (150/152) AR element (AR hyperlink) 12 in accordance with game rules/instructions 1904 represented by a game play instruction icon 1904 AR element (AR hyperlink) 12.

III. FIG. 20-38 (Additional Modes and Embodiments)

FIG. 20

User Participation Reward Program

Figure 20:
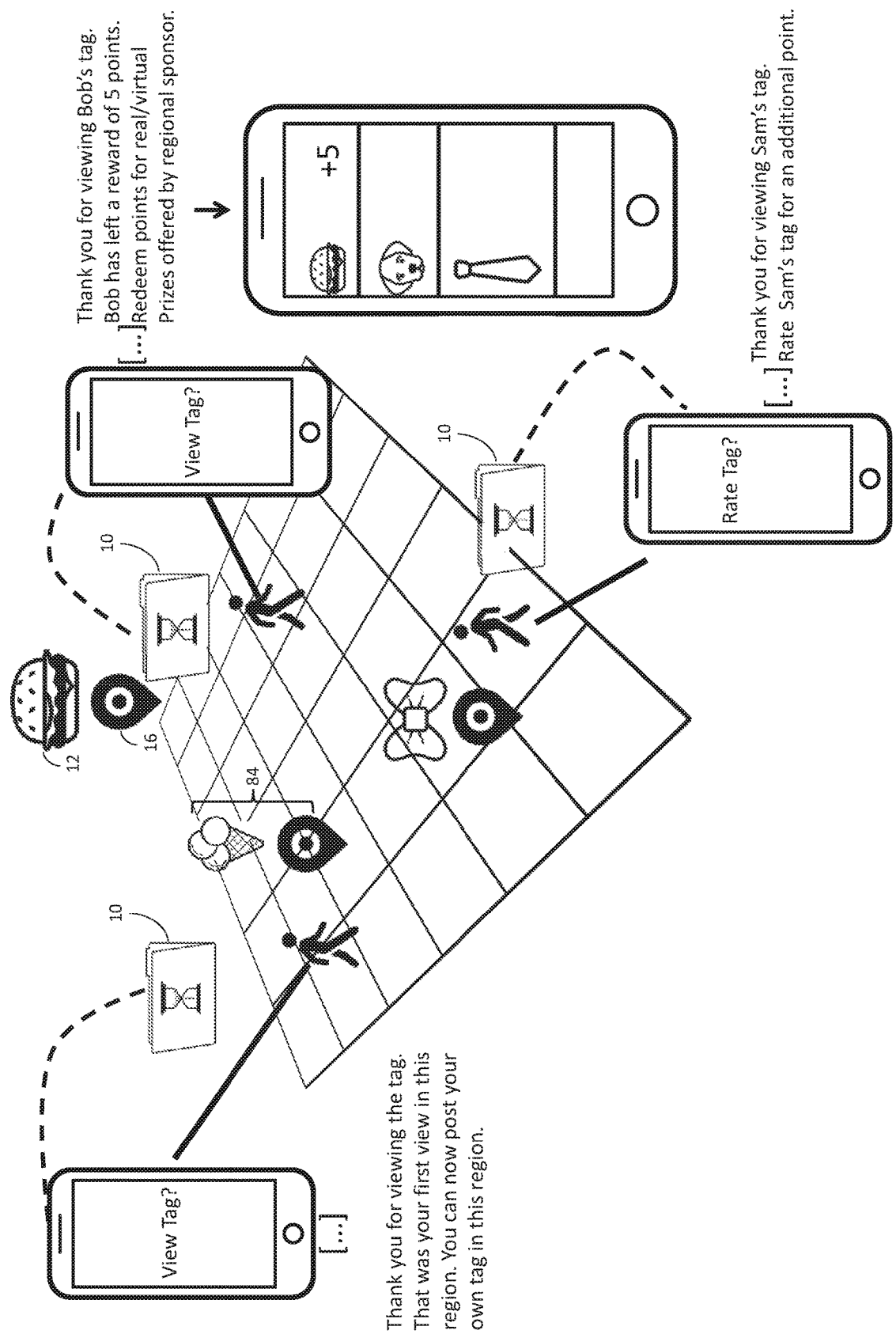
FIG. 20 is an environmental diagram of an awards system based upon a user characteristic such as participation as an embodiment of the present disclosure.

FIG. 20 illustrates a method of the system 100 for rewarding users 20 by how the user community rates a user's recorded moment 10 content. In operation a preferred embodiment of the invention 100, an enrolled user 20 utilizing a smart device (handy) 18 may receive redeemable awards 130 as an incentive for producing and tagging 30 moments 10 providing relevant, timely, interesting media 14 to locations 16. Such awards 130 may take the form of increased access, usability, preferred locations to tag moments 10, choice of avatars, extended emoji 84 sets, content 92, coupons 36, funds 128, and prizes 196.

FIGS. 21A & 21B

Tagged Mobile Object Moments

Figure 21A:
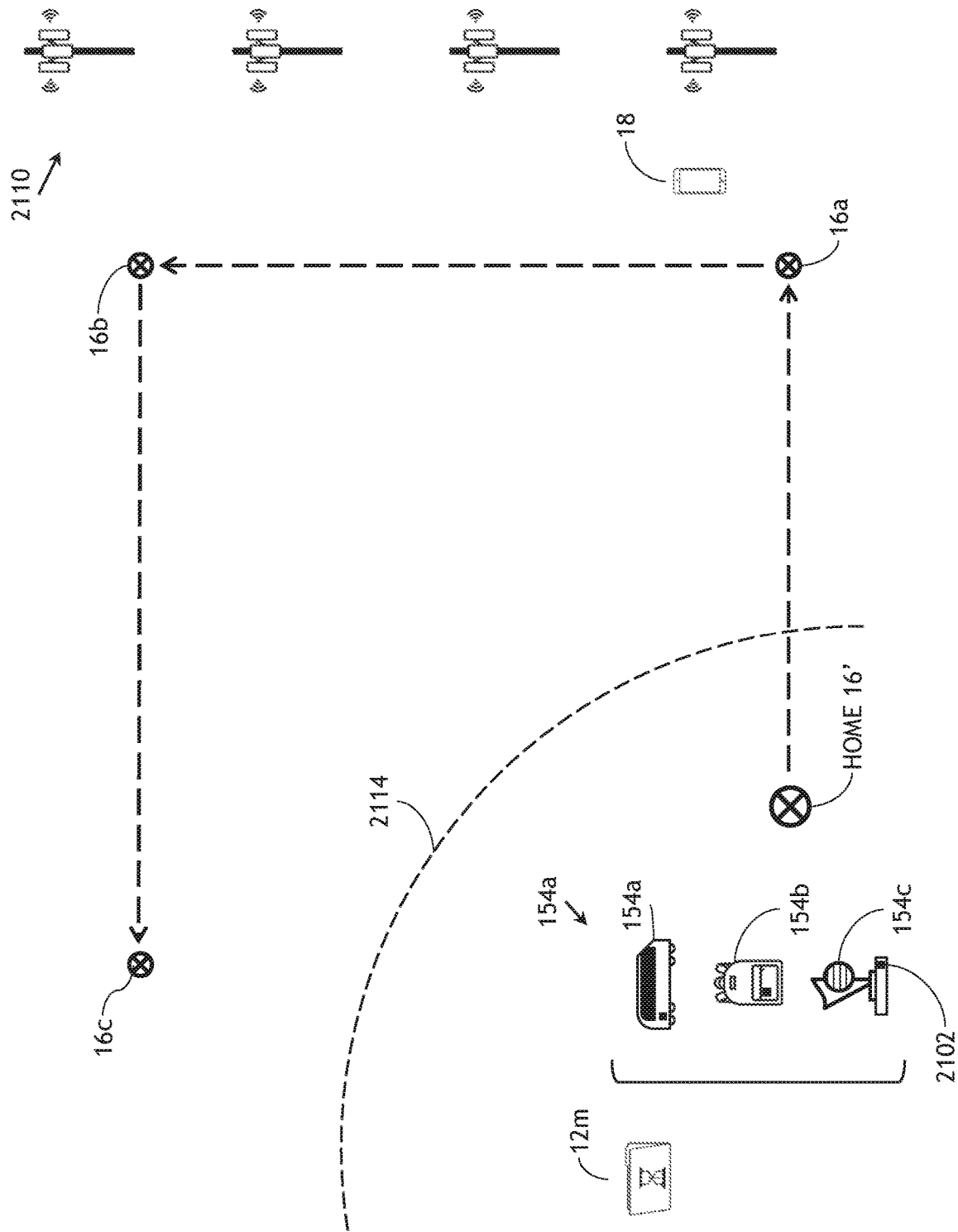
FIG. 21A is an environmental diagram of a mobile moment file according to an embodiment of the present disclosure.

FIG. 21A illustrates a mobile moment AR element (AR hyperlink) 12 of the system 100. The AR element (AR hyperlink) 12m may be implemented similarly to the AR element (AR hyperlink) 12, 12a-k, except that the AR element (AR hyperlink) 12 may be associated with a mobile target 154, e.g., a vehicle 154a, a personal accessory such as a backpack 154b to be worn or carried while traveling, or a mobile object such as a sculpture 154c that may be transported between, and exhibited at, a sequence of locations over time. For example, a beacon 78 may be attached to the mobile target 154 and one or more moment AR element 12m generated (e.g., including content and/or information relevant to the vehicle 154a (e.g., its route, identifier, operator), the backpack 154b or its wearer (e.g., personal information or content created by the wearer), or the sculpture 154c (e.g., information about the sculpture and its creator/s, previous exhibits, etc.) based on the current location of the beacon/tag 30. As the mobile target 154 moves, or is transported, to new locations 16a, 16b, 16c, in turn, the moment pose (e.g., a position or location associated with the mobile AR element (AR hyperlink) 12m and one or more desired orientations via which the mobile moment file may be accessed by a reading smart device (handy) 18) may be updated to reflect the current location of the mobile target.

For example, the beacon 78 may include a barcode for readably retrieving and recording content, an active or passive RFId tag, RF-enabled or like transceivers in communication with one or more networks or location services 2110 (e.g., cellular or GNSS networks, Bluetooth or other wireless networks, or location and tracking services and protocols (e.g., Tile, XYO, ADS-B)). The beacon/tag 30 may update the location and/or orientation of the mobile target 154 at predetermined time intervals, or whenever new location information is available via networks/location services 2110. For example, the mobile target 154 may be associated with a defined "home" location 16', e.g., the vehicle 154a may have a home station or a starting point for its designated route, the wearer of the backpack 154b may program his/her mobile telephone to recognize his/her residence as "home", the sculpture 154c may reside at a particular museum or gallery where it may be exhibited from time-to-time, or loaned out to other venues for exhibition.

A home location 16' may be associated with a location (locus) 16 corresponding to an environment within which the home location may be found. For example, the location (locus) 16 may be defined as a radius around the home location 16'. Any reading smart device (handy) 18 coming within the location (locus) 16 when the mobile target 154 is at the home location 16' may receive partial content associated with the mobile AR element (AR hyperlink) 12m, e.g., guidance or directions for adjusting the reading handy to a pose (position/orientation) corresponding to the home location, or from where the mobile AR element (AR hyperlink) 12m may be accessed in full, or challenges that must be solved (or conditions that must be met) before the mobile AR element (AR hyperlink) 12m may be accessed. The beacon/tag 30 may update the current location of the mobile target 154 whenever received location data indicates that the mobile target 154 is outside the location (locus) 16. Additionally, or alternatively, the beacon/tag 30 may be preprogrammed with a sequence of successive locations 16a, 16b, 16c where the mobile target 154 is expected to be at predetermined future times. The beacon/tag 78, 4422 may thus automatically update the moment pose associated with the mobile AR element (AR hyperlink) 12m at predetermined time intervals.

In various preferred embodiments and implementation of the invention both handy absolute and relative positioning sensors may be utilized. Comparison of position results may be utilized to generate one or more of a refined position and a refined orientation by resolving at least one position ambiguity associated with one or more of the initial position and the initial orientation to an achievable confidence level. The handy 18 may include at least one of a vehicle, smart device, tablet, wearable device, head worn display (HWD), or other like portable electronic device.

A smart device (handy) 18 processor may generate (or record) a moment file preferably including moment position data (including at least a moment position, a moment orientation and a moment time) and recorder attributes corresponding to the enrolled handy recording the moment file or the moment file itself. Recorder attributes may include a recorder ID (uniquely identifying the recording handy or the recording individual) and recorder filters (e.g., filters or constraints introduced into the moment file by the recorder which determine the readers, or groups of readers, to which the moment file may be visible or accessible). Recorder filters may include a recorder permission, a moment age (or duration), a moment creation time, a moment medium, a moment subject or interest, and a moment theme. A recorded moment file may include elements of filterable content, e.g., an image or image stream, a video clip, a sound recording, a text file, a mood, a place, or an activity. A moment file may include augmented reality icons 84 representative of one or more of the first moment file (or, e.g., its component content elements or its recorder). In a preferred implementation a system of the present disclosure will include a server for retrieving at least one augmented reality icon of a previously recorded moment file "placed" in its designated location, e.g., by being uploaded by the recorder to the server for potential access by other reading smart devices. For example, a reading handy 18 may access a moment file based on the proximity of the smart device's current location to a location 16 associated with the moment file (depending on recorder-introduced or reader-introduced filters). If available positioning signals are diminished or intermittently transmitted, or ambiguities exist between positioning sensors of a handy, the handy processor may resolve these ambiguities to a given confidence level (and thereby determine proximity to a moment file) by, e.g., weighting a position source (absolute or relative) most likely to provide the greatest accuracy given the location of the last position reported. Accordingly, the enrolled handy 18 may retrieve from the server 22 (or other like cloud-based resource where generated augmented reality content is stored) an augmented reality icon 84 corresponding to a moment file 10 to be read during such periods of diminished, intermittent, or absent externally transmitted positioning signals.

Recorder filters and reader filters 106, respectively, may assist the user of a handy 18 in filtering moment files 10 according to a variety of characteristics, e.g., a reader permission; a moment age, creation time, medium, subject or interest, and theme. A recorder of a moment file may incorporate recorder filters 106 into the moment file 10 to restrict access to the moment file, while a reader may establish customizable reader filters specific to a handy to narrow the potential variety of accessible moment files according to reader interests. Readers may utilize a preferred enrolled handy to locate, retrieve, and view (via a display of the handy) moment files 10 by interacting with the augmented reality icon or icons associated with the moment file. For example, proximity considerations, recorder filters, and reader filters may determine whether a given icon is displayed to a reader; the reader may then access other content elements of the file by interacting with (e.g., clicking) the icon.

Absolute and relative position sources of a handy 18 (smart device) may include, for example, a GNSS positioning system (GPS, GLONASS, Galileo, Beidou), a Wi-Fi positioning system (WPS or WiPS/WFPS), a vehicle positioning system (VPS), a vehicle-to-vehicle positioning system (v2v), an inertial measurement unit (IMU) reporting at least one of relative position, orientation, velocity, and heading (pose reporting); a Received Signal Strength Indicator (RSSI) system; and/or a computer vision system configured for one or more of motion detection and area mapping. Preferably enrolled handy IMUs include a magnetometer, an accelerometer, a gyro sensor, and a gyroscope (pose reporter). Position data associated with a moment file 10 may include a point in space, a point of origin, a waypoint, or a destination (e.g., if the moment file 10 is recorded aboard, or intended to be read aboard, a moving vehicle). Such handy sensors may determine velocity as a change in position over time, e.g., to determine a locomotive source. For example, the locomotive source may be determined by an approximation of velocity and location (or a user reported locomotive source). Moment files may also include duration and a termination time; for example, the recorder may incorporate a duration time into the moment file, after which the moment file ceases to exist or is no longer accessible.

Figure 21B:
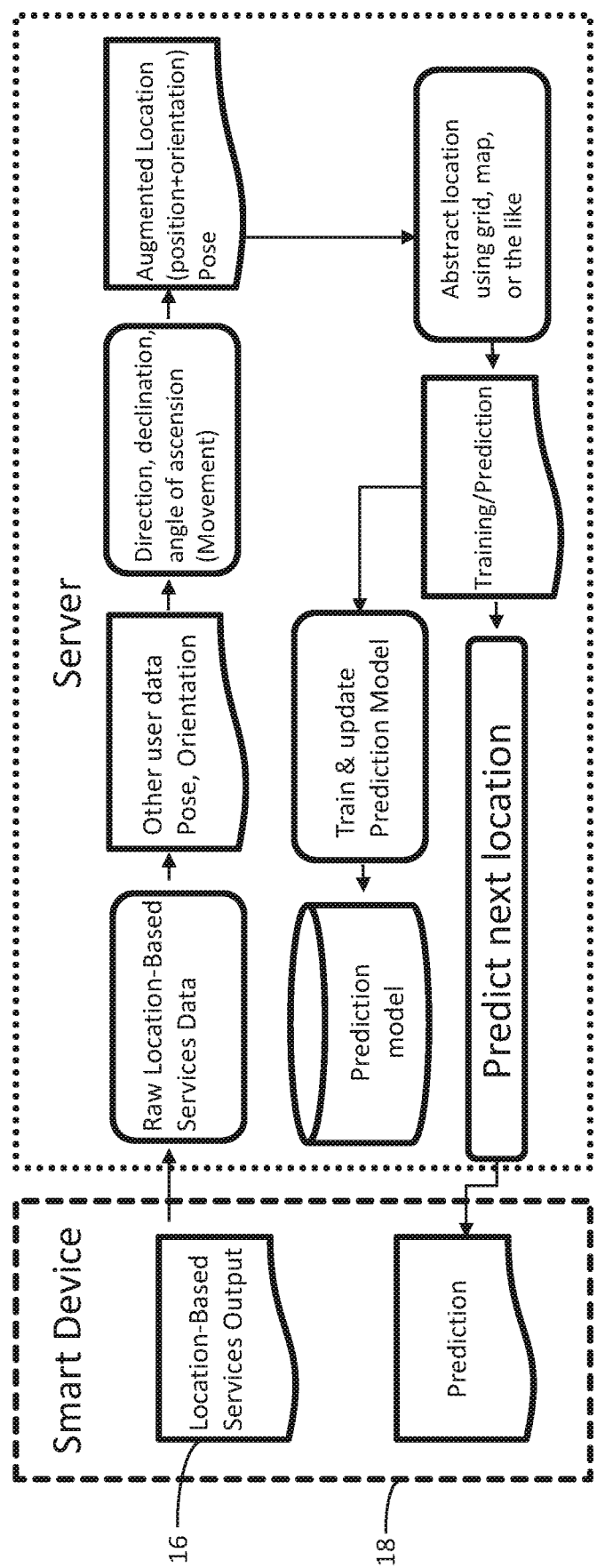
FIG. 21B is a flow diagram illustrating the use, e.g., an absolute and relative position data to predict a current or expected position (see also, e.g.

Turning now to FIG. 21B, a method of determining a current position or an expected position from sparse information is described in accordance with various embodiments of the moment system 100. See, e.g., Ahmad, S., et al., A Stochastic Approach Towards Travel Route Optimization and Recommendation Based on Users Constraints Using Markov Chain, Jul. 24, 2019, Digital Object Identifier 10.1109/ACCESS.2019.2926675, IEEE Access (incorporated herein in its entirety).

Figure 22A:
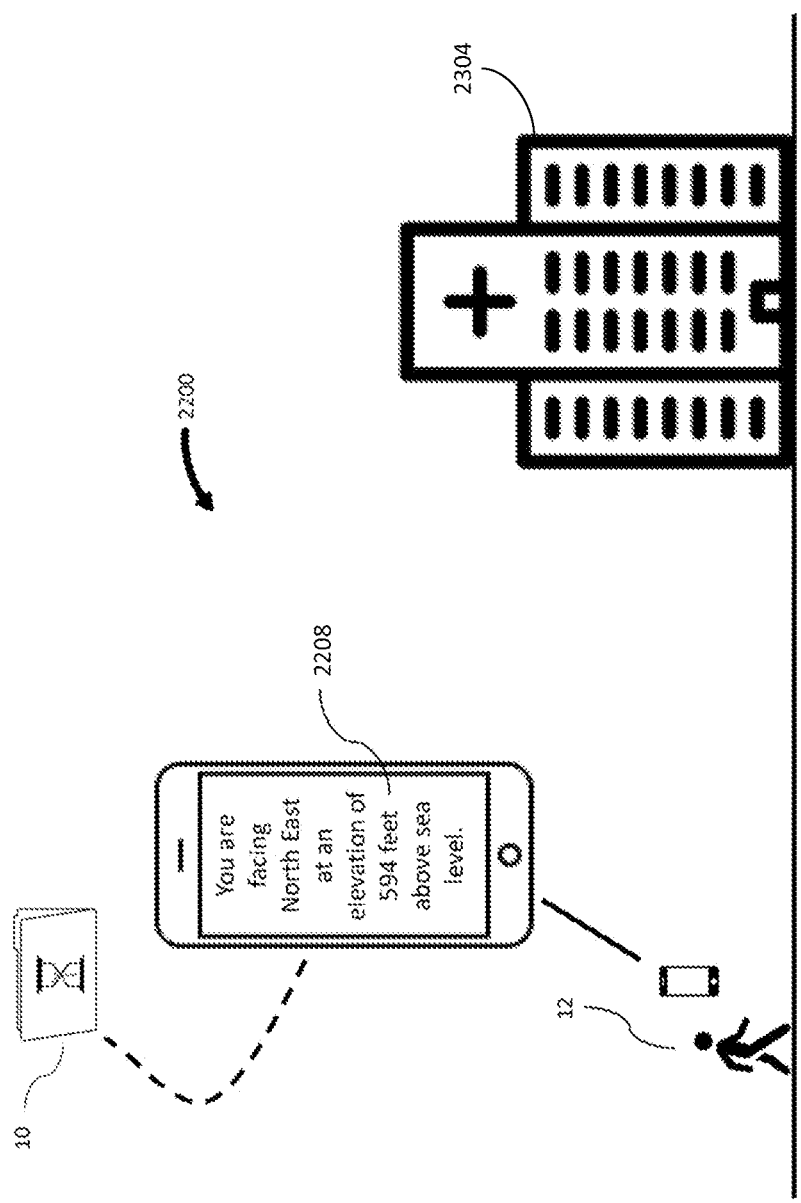
FIG. 22A is an environmental diagram of a mobile moment file indicating orientation and elevation of a handy according to embodiments of the present disclosure.
Figure 22B:
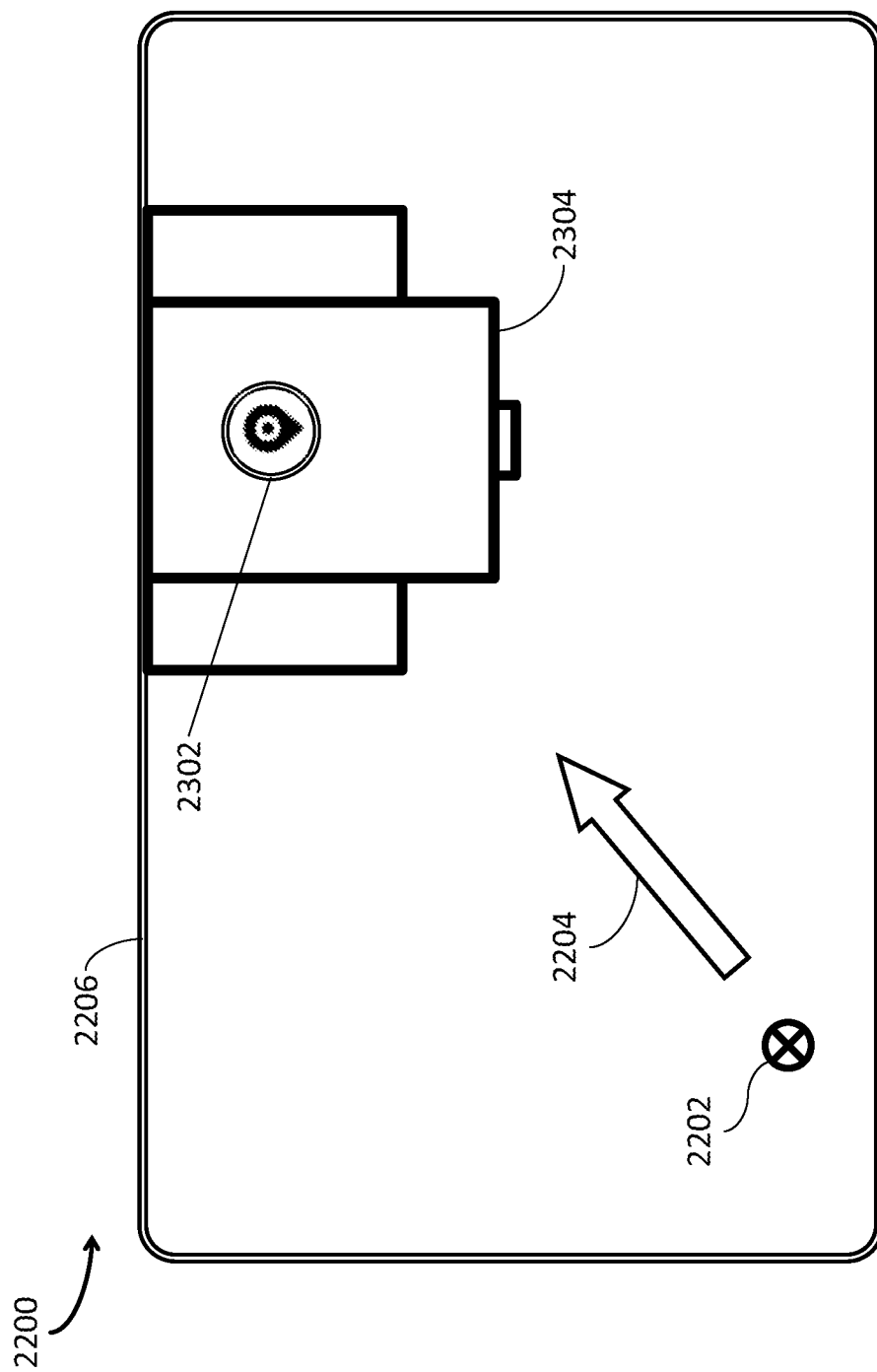
FIG. 22B is a mapping view of the mobile moment file and handy of FIG. 22A.
Figure 22C:
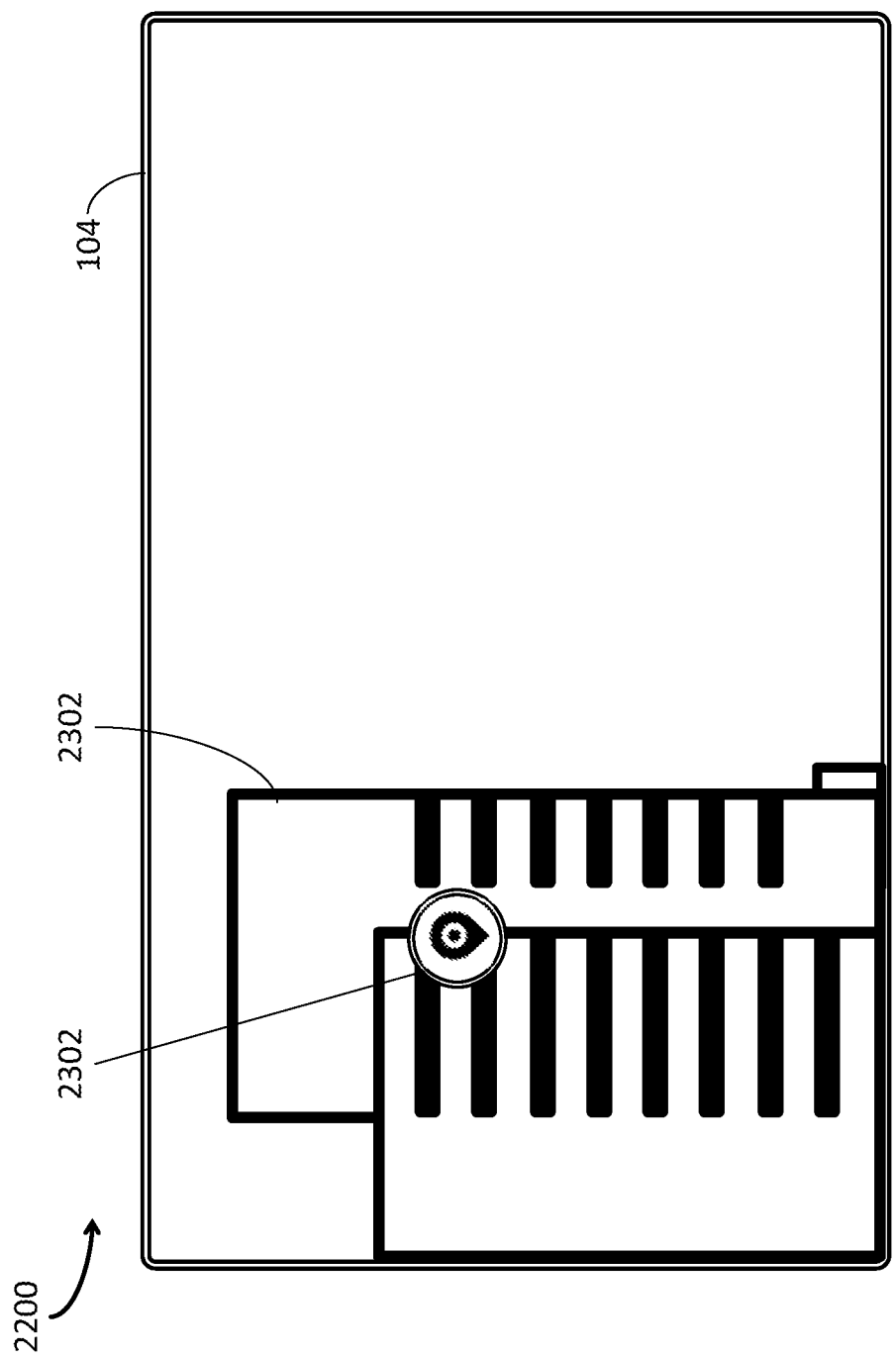
FIG. 22C is a display view of the handy of FIG. 22A.
Figure 23:
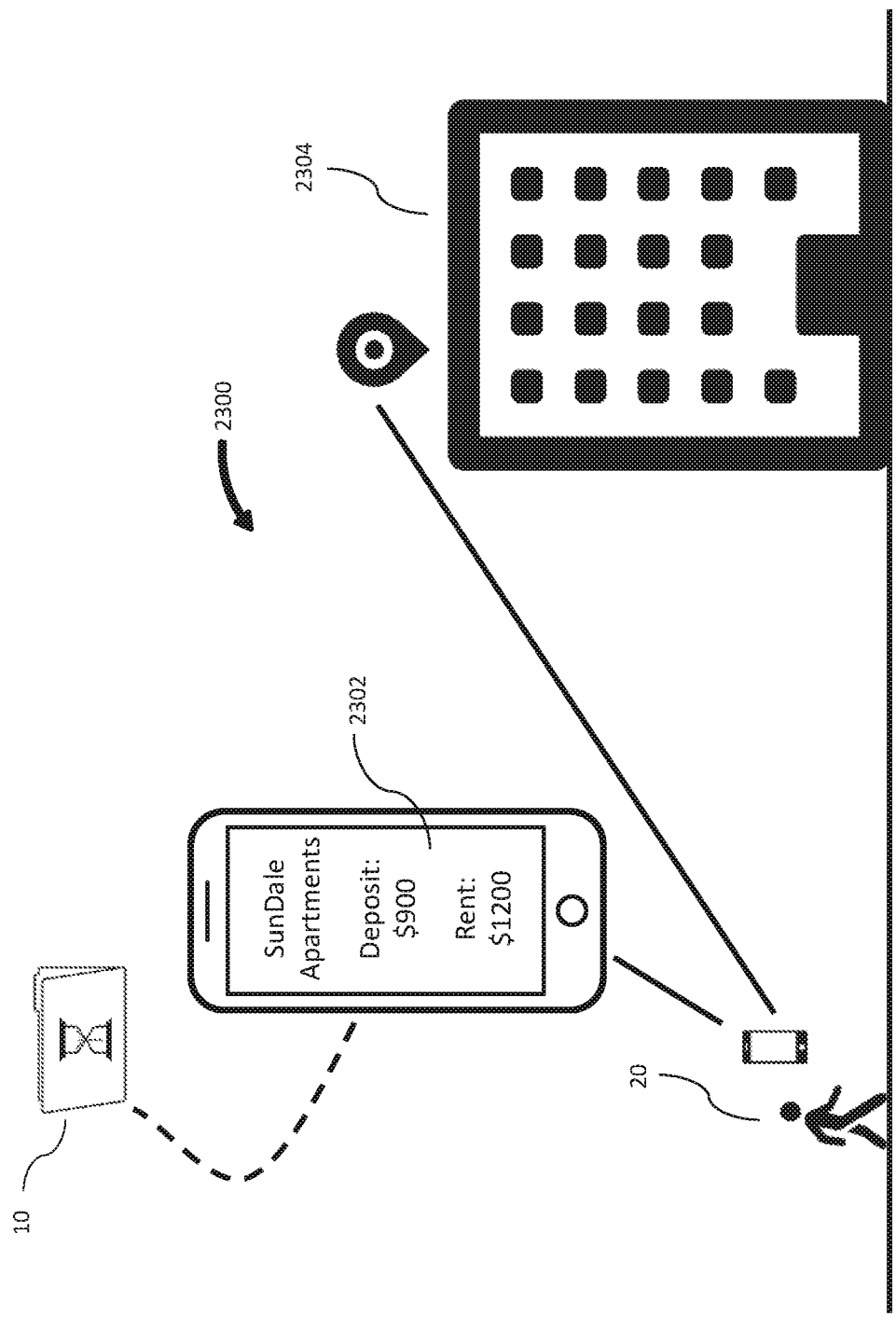
FIG. 23 is an environmental diagram of a mobile moment file illustrating anchored augmented graphic moments according to an embodiment of the present disclosure.
Figure 24:
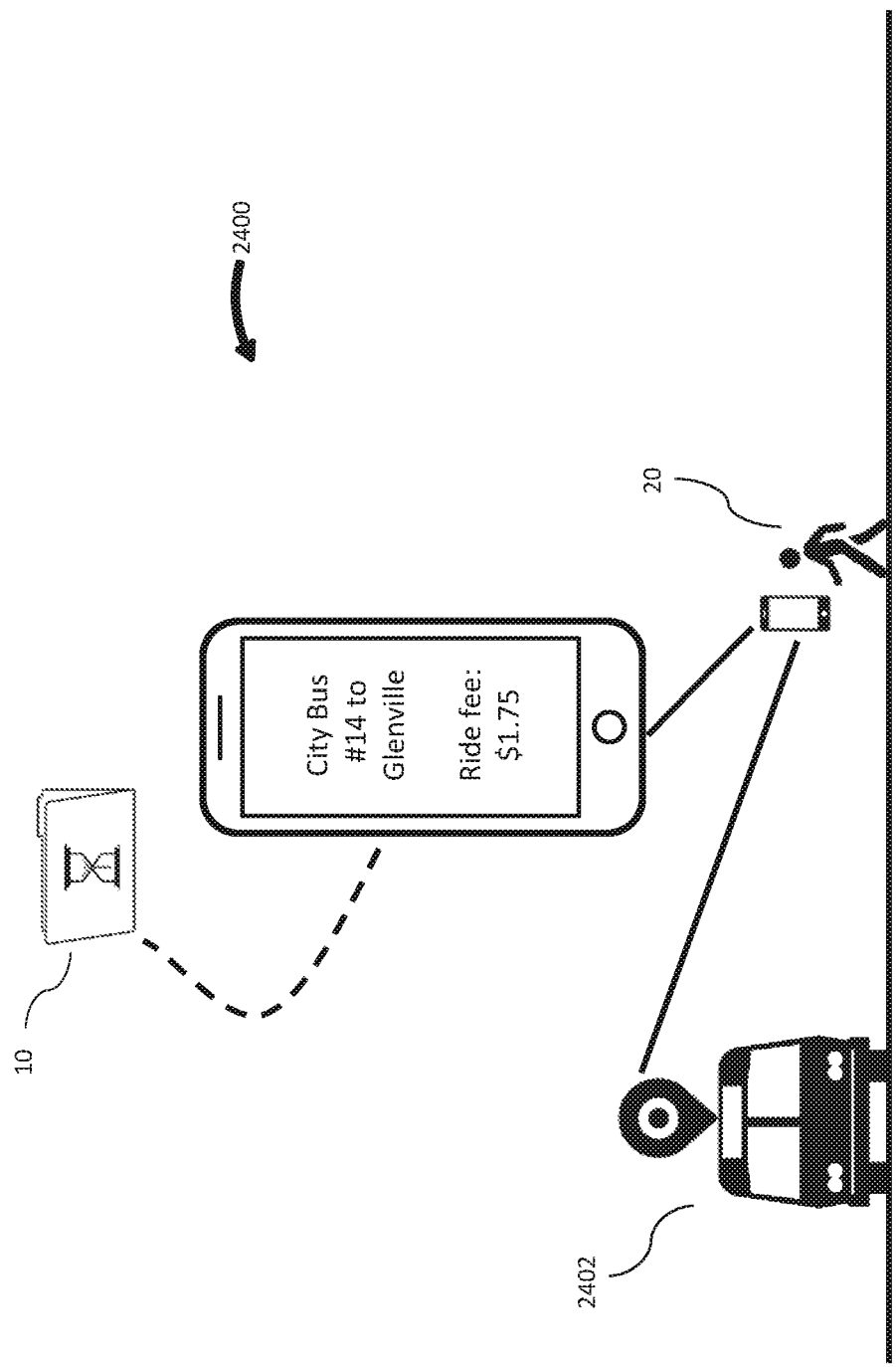
FIG. 24 is an environmental diagram of an informative mobile moment file anchored to an object according to an embodiment of the present disclosure.
Figure 43:
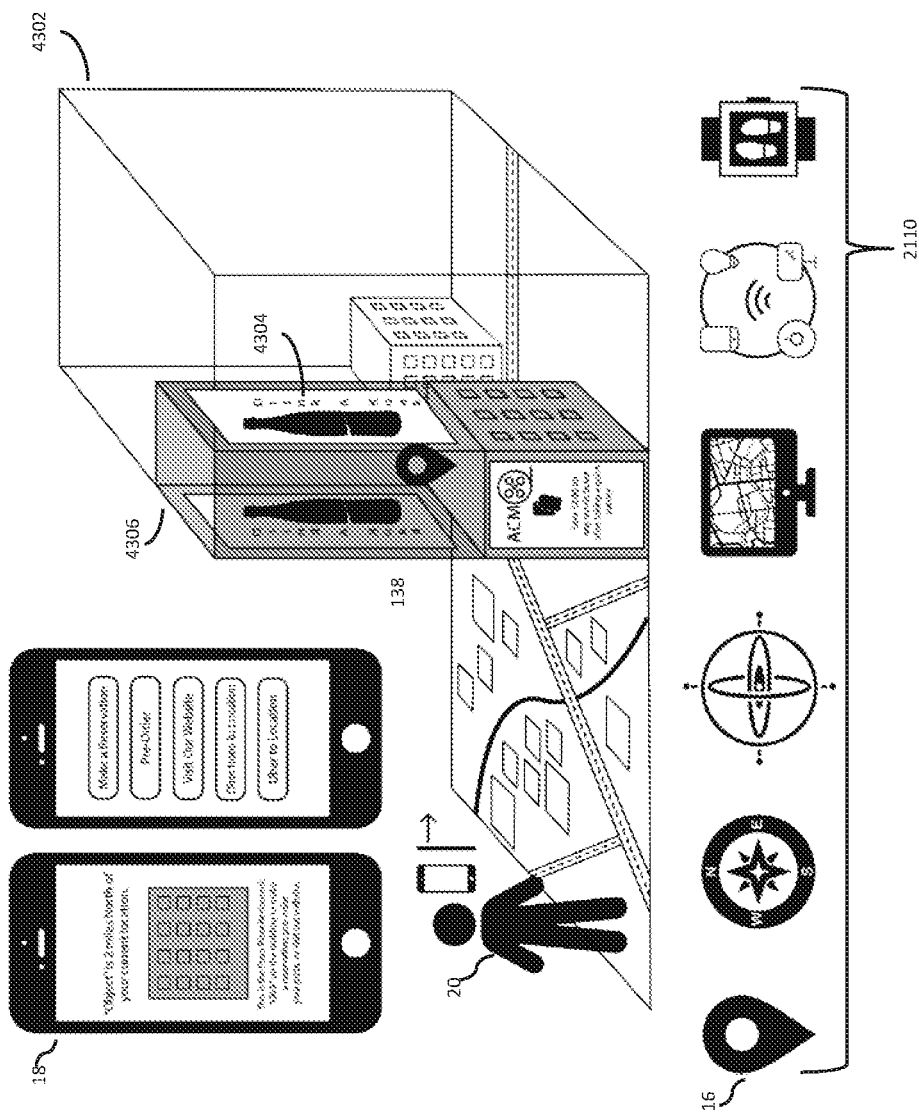
FIG. 43 is an environmental diagram of an additional embodiment of the device providing enrolled users with the ability to select (scan) three dimensional spaces for relevant selectable moments from predefined or enrolled user defined selectable augmented areas informed by surveyed known locations for assisting enrolled users in accessing relevant content.

FIG. 22-24 (See Also, e.g., FIG. 43)

Object Identification and Detail

Turning now to FIGS. 22A through 22C, in one embodiment, an augmented selection apparatus is shown in moment use case 2200 and herein described. For example, "Augmented selection", in accordance with the present invention, leverages: (1) user tag/device absolute position 2202; (2) tag/device direction and orientation relative position 2204 (including in some embodiments eye tracking means); and (3) a map 2206 or other reference either in two or more dimensions. For instance, in an operation viewing mode, from a complex field from a high-up office overlooking a cityscape a user's device 104 (via location-based services (e.g., satellite and ground based location-based service, GNSS, Electronically Steerable Arrays, IoT, XYO, access points, and any other location-based service operably associated with a user device [handy or the like]) may establish and refine an absolute position 2202. In another embodiment, a compass built in to a handy 104 is utilized to determine a physical location. For example, a handy may identify what direction it is facing (2204; what is in screen view (2206)) and what height from sea level it is (to determine elevation or where the handy is in "y" terms) 2208. By way of another example, images may be leveraged to determine location. For instance, images may assist in determining a location where existing satellite images, detailed graphic 3D rendered maps (google) and the like, your "current location" (2202) relative to the existing map (2206), and the phone direction (2204), relative to the existing map identifies 2 points, where you are, and what you are looking at. In another embodiment, a view of the real world is considered a layer over all existing mapping 2206. It is noted herein that the view of the real world and existing mapping 2206 are within reason very similar. In another embodiment, a view of the real world layer through a screen of a Handy 104 also shows a view of the mapping layer 2206 underneath. In another embodiment, a selected building 2304 in the screen view 2212 of a handy 104 is identified in the underneath mapping layer based on where you are and where you are looking.

In one embodiment, referring also to FIG. 23 as moment use case 2300, moments are anchored augmented graphics (e.g. displays, advertisements, public service announcements, AMBER alerts, severe weather advisories) 2302 fixed to known structures 2304. For example, selecting a building located across a street displays facts. For instance, selecting a building displays information (e.g., is there space for rent, how much is rent, how much is a deposit). By way of another instance, selecting a pizza restaurant in view may allow you to make a reservation. In another embodiment, two or more moments are combined into a single moment. For example, multiple moments associated with a single building may display as a single moment with a characteristic (e.g., color, shape, size, attached number) identifying that multiple moments are amalgamated in this single moment icon. For instance, a building with an associated moment icon having a number 12 may indicate that this building, identified from existing mapping 2206 and imaging (street view), has 12 moments attached to the building. In another embodiment, amalgamation of two or more moments is performed based on at least one of a category, a class or an interest of the two or more moments. In another embodiment, an amalgamated moment expands to display all moments associated with the amalgamated moment once selected.

AR element (AR hyperlink) 12 tagging 30 to objects 32 to a user's 20 enrolled smart device (handy) 18 relevant to a particular user or a set or subset of users. In one embodiment, as shown in FIG. 24 in the moment system 100 of the present invention for tagging relevant moments to moving objects 2400. Such informative moments 10 for a system and apparatus for tagging objects 2400 containing information (media 14) updated by one or more registered users 20 or by one or more augmented estate owners 1306. For example, an AR element (AR hyperlink) 12 may be associated with an object 32 (e.g., car, plane, bus, motorcycle, skateboard, or other device for transportation 256) for transportation 2402. For instance, an AR element (AR hyperlink) 12 associated with a plane may display information about the current flight (e.g., flight number, flight time, departure time, arrival time). By way of another instance, a moment associated with a bus may display information about the current bus route (e.g., bus number, departure time, arrival time, fare to board, travel time).

In one embodiment, users leave moments 10 containing questions, riddles or challenges and awards users who engage and solve the questions, riddles or challenges.

In operation of embodiments of the invention 100 as described herein and as related to FIGS. 22-24, moveable non-stationary objects 32 may be tagged 30 with a tag 4422 (FIG. 44), e.g., having a linear barcode 4424, 2-D code 4426, or passive or active RFId 4428, or the like, may be utilized to provide look up information such that a server 22 may appropriately display the moment AR element (AR hyperlink) 12 associated with the object 32.

FIG. 25

Location Based Instant Messaging

Figure 25:
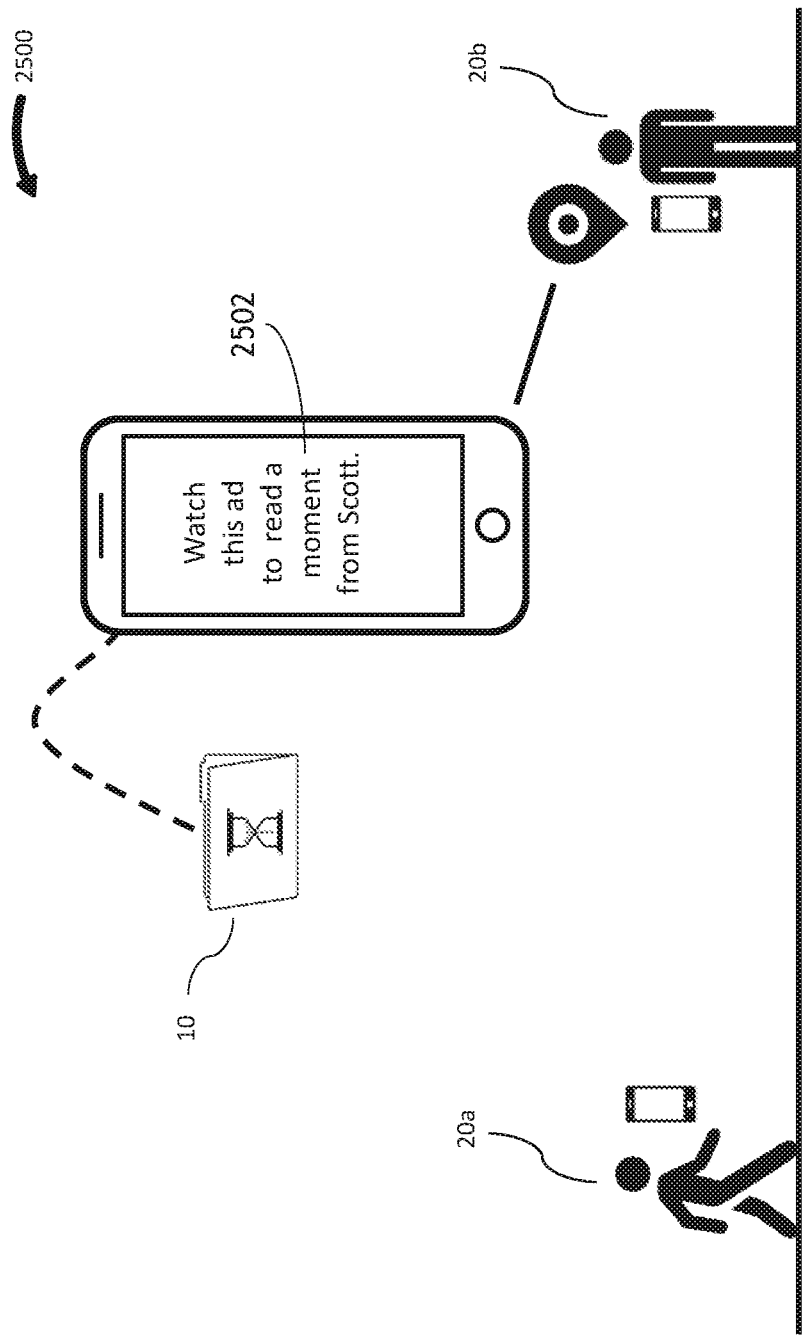
FIG. 25 is an environmental diagram of a mobile moment file shared with another user according to an embodiment of the present disclosure.

Sending an AR element (AR hyperlink) 12 to a particular user 20 at that user's known or expected location 16. In one embodiment, as shown in FIG. 25 of the moment system 100, an AR element (AR hyperlink) 12 may be sent from a first user's location 16 enrolled smart device (handy) 18 to a second user's location 16 enrolled smart device (handy) 18 (2500) such that the first user must be located within an area of accessibility 82 in order to read the AR element (AR hyperlink) 12. In operation, a user 20a sends a moment to another user 20b that appears at the location of the user 20b that is to receive the moment. For example, a user 20a may send a moment to another user 20b to notify the other user 20b with a message 2502. For instance, a user 20a may send a moment to another user 20b to notify them with a statement such as "Your friend Scott sent you a moment, find it." or "Watch this ad to read a moment from Scott." By way of another instance, moments sent to other users may contain moments of stories (e.g., a social media post).

FIGS. 26-27

Augmented Reality Moment-Based Advertising

Figure 26:
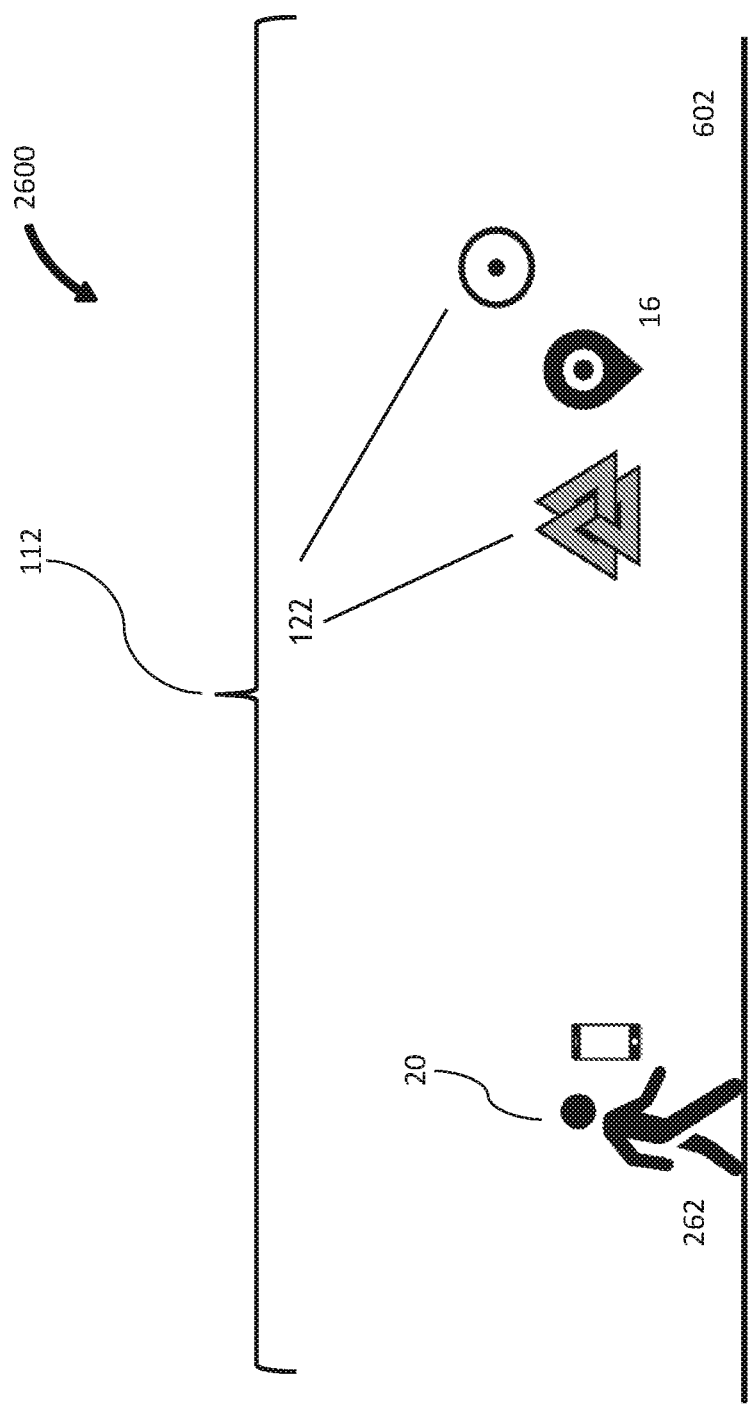
FIG. 26 is an environmental diagram of a mobile moment file surrounded by augmented brand icons according to an embodiment of the present disclosure.

Relevant to user 20 advertising containing moments 10 (preferably represented by AR elements represented by augmented brand logos 2602) placed in a user's environment 112. In one embodiment, as shown in FIG. 26 as moment use case 2600 (AR moment-based advertising), an AR element (AR hyperlink) 12 contains advertisements 98 represented by augmented brand icons 122 (AR elements). For example, AR element (AR hyperlink) 12 advertisements 98 may appear in view as a user 20 walking 262 along a trail (sidewalk) 602 is looking for an AR element (AR hyperlink) 12 to read and/or while a user is reading an AR element (AR hyperlink) 12. For instance, advertisement 98 containing moments may appear in view from websites (e.g., websites posted advertisements 98 to users 20 and may contain coupons 36, points or other redeemable content). In another embodiment, users receive a reward (e.g., a nominal amount of money, one or more coupons 36, or any other incentivizing good or service) to allow advertisers to float advertisements 98 near, around, or about other moments 10 or a current user location 16. In operation an augmented property holder 124 may allow or prevent the placement of such moments based on an auction system 126 or payment 128.

Figure 27:
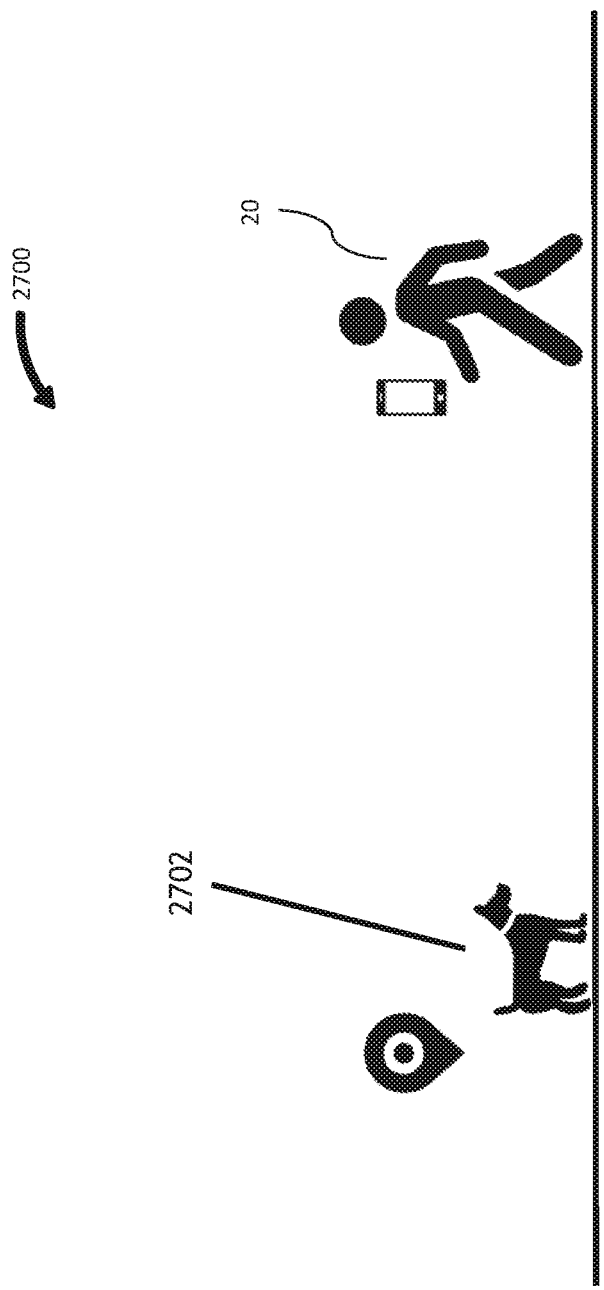
FIG. 27 is an environmental diagram of a mobile moment file including an augmented pet according to an embodiment of the present disclosure.

In one embodiment, as shown in FIG. 27 as moment use case 2700, a user 20 has one or more augmented pets 2702 appear in view around moments. In another embodiment, a user has one or more plants (e.g., house plant, landscaped area, harvestable crop, flower garden, or other type of plant husbandry or the like) tended by a user where the moments appear. For example, one or more plants may be rendered near a moment 10.

In one embodiment, a user 20 has one or more creatures (e.g., animals, fantasy animals, fictional characters, or other moving entity) that appear around moments 10 (AR element 12). In another embodiment, a user 20 has one or more vehicles (e.g., car, motorcycle, plane, rocket, or other form or transportation) that appear around moments. In another embodiment, a user has one or more environment (e.g., forest, dessert, moon, jungle, post-apocalyptic earth, farm, beach, mountain, or other conceivable physical surrounding) appear around moments 10. In another embodiment, fantasy, science fiction, or realistic real-time augmentations may appear around moments. In another embodiment, rendered images 84 (AR elements) can follow a user's 20 location.

FIG. 28

Figure 28:
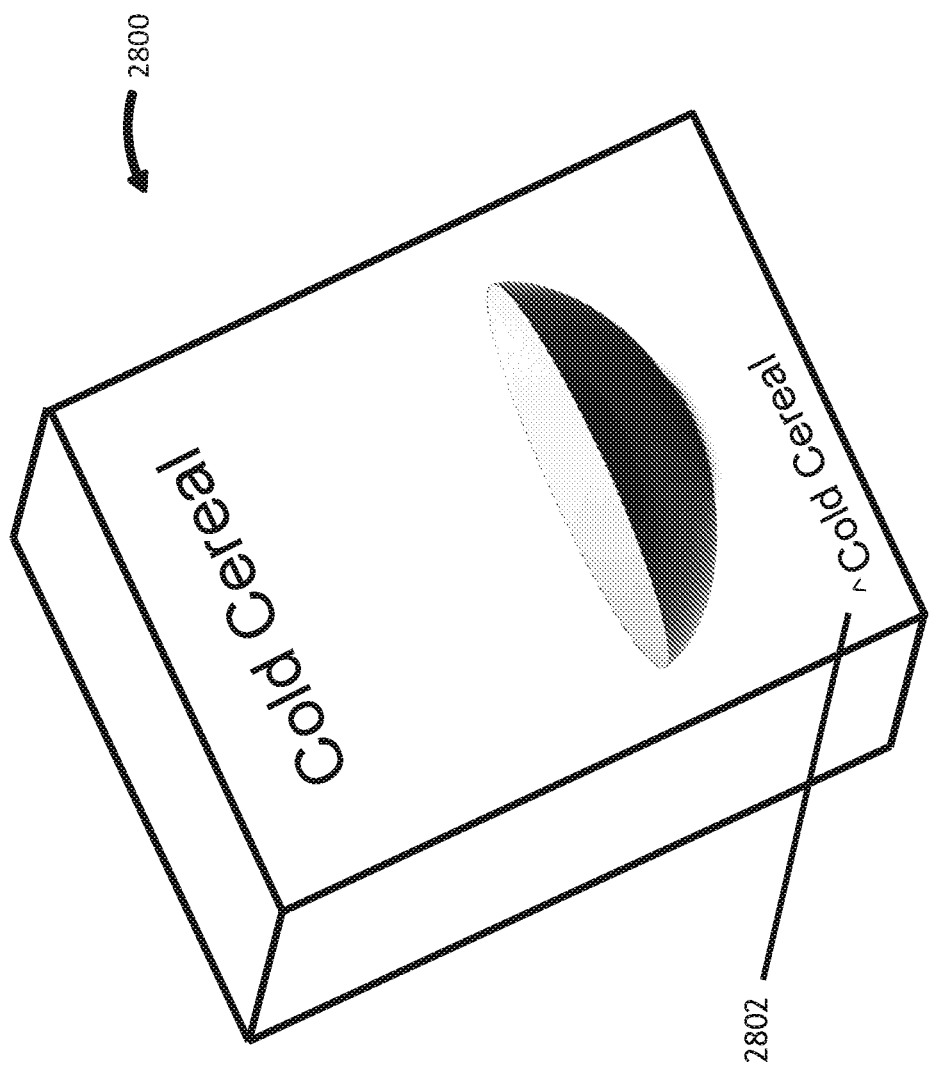
FIG. 28 is a perspective profile view of a product including a moment symbol mark according to an embodiment of the present disclosure.

Point and Learn AR Moment-Based Signage
Placement of Augmented Content at Code Location In one embodiment, moments are associated with a symbol. For example, the symbol "^" may identify moments and be associated with moments for purposes of posting and searching to have a group conversation or common forum for a similar topic. By way of another example, the symbol ">" may identify moments and be associated with moments for purposes of posting and searching to have a group conversation or common forum for a similar topic. In one embodiment, as shown in FIG. 28 as moment use case 2800, products include a moment symbol 2802 that directs individuals to create, access, and/or contribute to a moment 10. An enrolled user 20 may utilize a smart device 18 (handy) to enter the appropriate AR hyperlink symbol (e.g., "^") and address (e.g., "cold cereal") to cause an interactive AR element 84 to emerge at the user's 20 and product location 16. In other embodiments a code 254 or the like on the product may be utilized to cause an emergent moment AR element (AR hyperlink) 12 to appear at the user 20 and product location 16. In such an embodiment 100, a user 20 can readily create, access, and/or contribute to a product relevant moment 10 (see generally, e.g., FIGS. 1A, 1B, 2, 3, 4A, and 4B).

For example, a user may purchase a box of cereal and on the packaging of the cereal is "^Cold Cereal" that indicates to the user there is a moment at the location "^Cold Cereal". For instance, a user utilizing the system 100 enters "^Cold Cereal" and a moment related to the box of cereal purchased appears. In another embodiment, a moment symbol on a product directs users to a message about the product. In operation, a user 20 with a smart device 18 operating an embodiment of the moment system 100 to tag 30 and interact with objects 32 and like in a location with moments 10 via a moment AR element (AR hyperlink) 12 where the smart device 18 is reporting its position to a server 22 over a network 26 storing addressable moment files 10 associated with locations 16 and objects 32. For example, a moment symbol on a product directs users to a message about the product such as, but not limited to, a coupon 2804 (e.g., coupon 36), an animation 218, a contest entry form, a prize 130, a survey 214, or any other message 180 related to the product 198.

In one embodiment, registered users 20 use "geo-cash" (funds 128 tagged 30 to a location 16) to make purchases. For example, "geo-cash" may be utilized to purchase items (e.g., augmented reality items, augmented reality creatures, augmented reality vehicles or any other displayable augmented realized image) or services (e.g., access certain moments 10, subscribe to a particular registered user's 20 moments 10, or any other purchase related to viewing and interacting with moments or augmented reality images).

In one embodiment, moments 10 contain blog information and posts. For example, a moment may be located at a physical location and made available to view by anyone at that physical location. For example, a moment 10 located at the Grand Canyon may be viewed by anyone at the location of that moment. In another embodiment, certain information in a moment is restricted from viewing by specific individuals. For example, specific information in a moment may be restricted by a user 20 to be viewable only by specific individuals. For instance, a user may restrict certain information in a moment to be viewable by only individuals identified as friends of the user 20.

FIG. 29

Viewing Augmented Reality Moment Files in an Augmented Estate System

Figure 29:
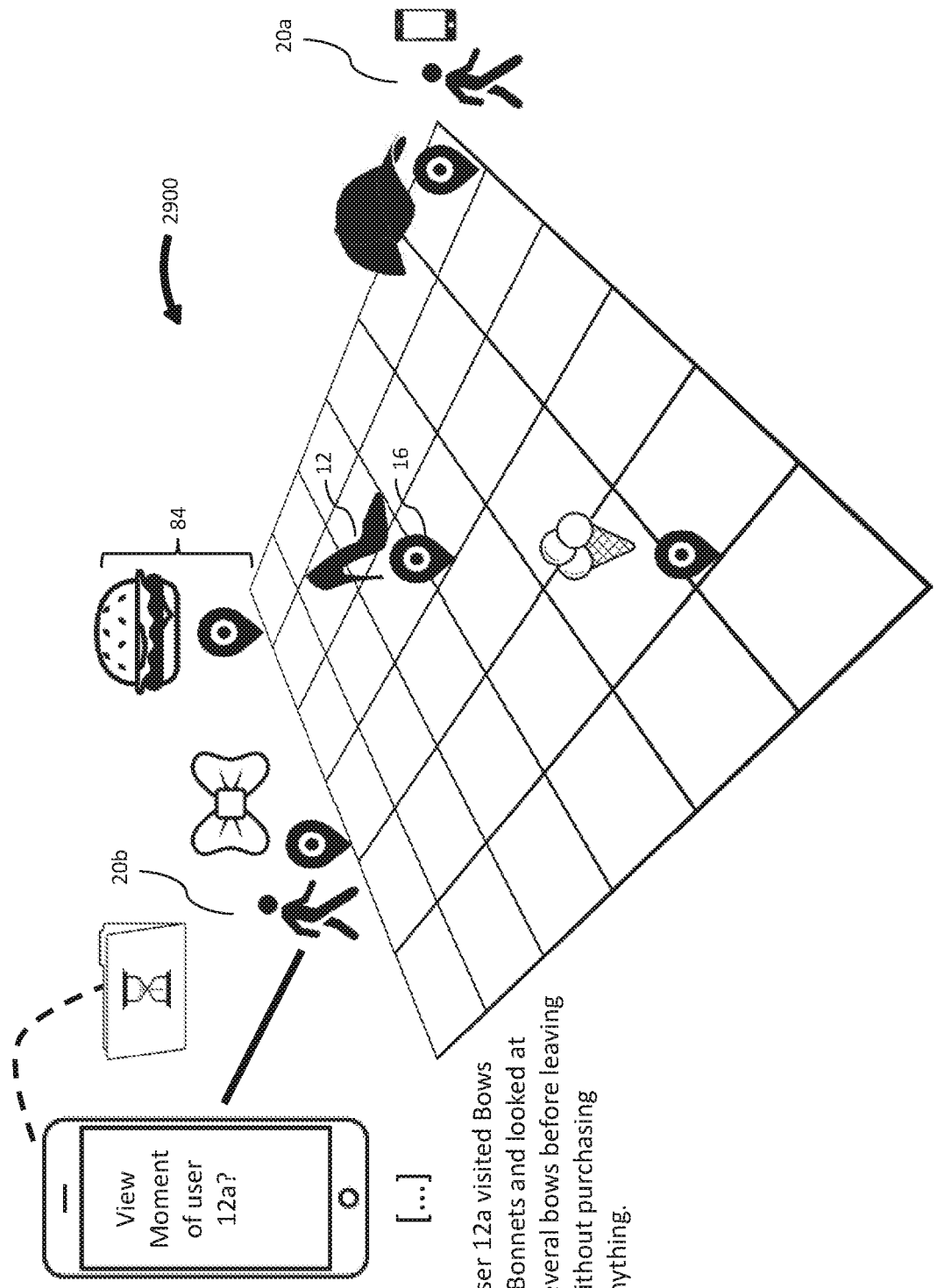
FIG. 29 is an environmental diagram of a map of mobile moment files created by a single user according to an embodiment of the present disclosure.

In one embodiment, as shown in FIG. 29 as moment use case 2900 (AR augmented estate system), a map 138 of all moments created by a user 20a is viewable. In operation of an embodiment of the moment system 100 augmented property holders 124 may utilize user 20 location 16 information (with a user's permission, or e.g., as a condition of utilizing features of embodiments of the invention 100). As a user 20 interacts with objects 32 and the environment of a property 132 via changes in location, and/or reading 150/recording 152 moments 10, data relevant to a user 20 may be considered in how systems 100 of the invention filter 106 and notify (push moments 10) users 20 of relevant media 14 available near (e.g., area of accessibility 82) a user 20. In another embodiment, moments created by a specific user 20 are viewable by other users 20b. For example, moments created by a first user 20a may be viewed and read by another user 20b that visits the location where a specific moment was created by the first user 20a. By way of another example, moments created by a first user 20a may be viewed and read without visiting the location where each moment was created by the first user 20a if another user 20, e.g., 20b pays a fee.

FIG. 30

Augmented Clock-In, Gate, Toll, Waypoint

Figure 30:
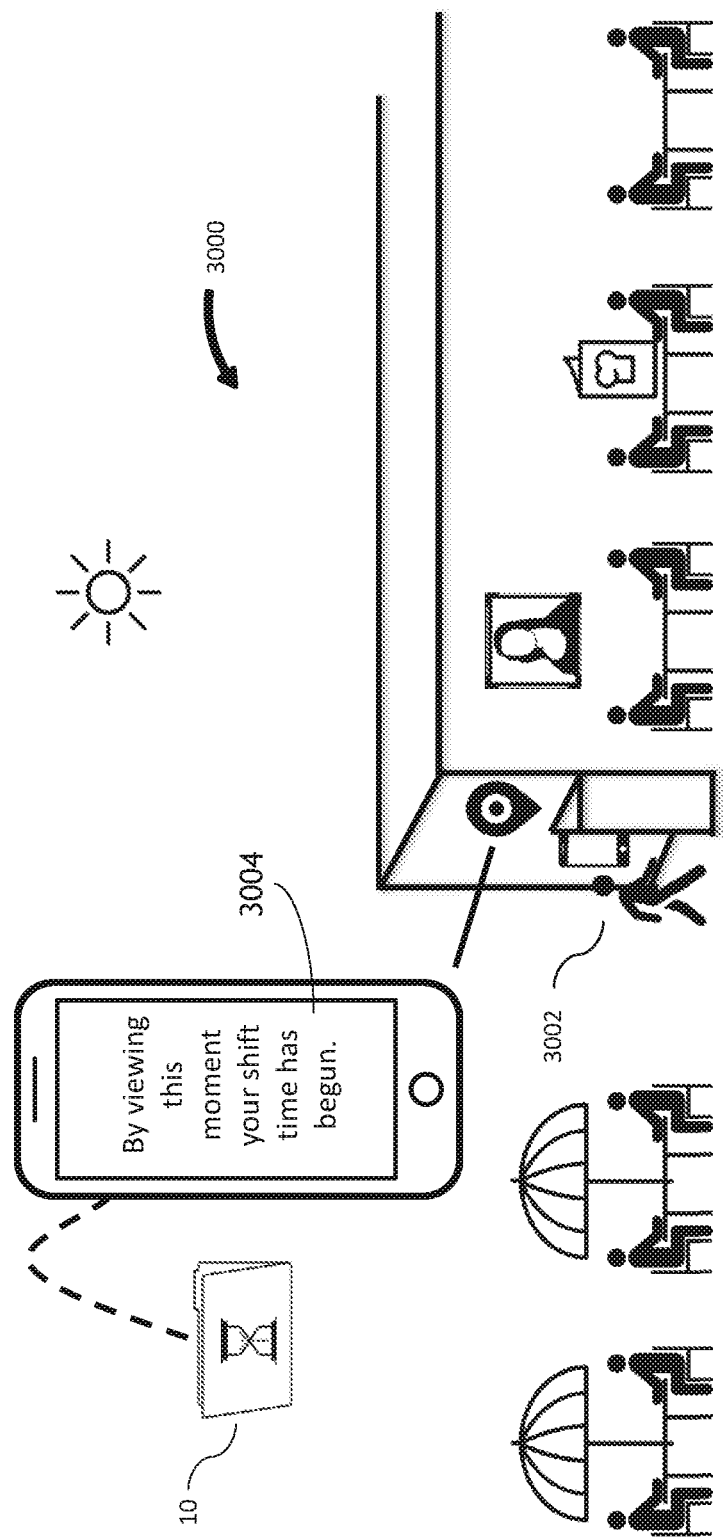
FIG. 30 is an environmental diagram of a mobile moment file for tracking work hours according to an embodiment of the present disclosure.

In one embodiment, as shown in FIG. 30, the moment system 100 may be utilized as an AR location-based frictionless or interactive checkpoint. (3000). For example, moments 10 are utilized, e.g., to keep track of employee hours, purchaser engagement, interest level, purchaser confusion, moment placement strategies, or the like.

For example, administrators (paymasters) may keep track of employee hours by way of one or more moments 10. Likewise, employers may message employees at their work stations with moments 10. Such moments may be interactive 44 For instance, employees 3002 entering work may view a moment 10 to "punch" (check-in, login, check-out, logout) 3004 their time by clicking a moment AR element (AR hyperlink) 12. It is noted herein that the "punch" 3004 is time stamped, and sent to an administrator account. By way of another instance, if an employee is not at a physical location where their job is located, the employee is not able to sign in or in other words "punch" their time, unless the employee has permission by an administrator to work at another location (work station, or the like. By way of yet another instance, an employee may "punch" 3004 their time by clicking on a moment to leave work.

In operation of an embodiments of the moment system 100, suitable for controlling access, or providing the ability to transact exchanges 128, e.g., museum 238, café 3802, or the like, e.g., a user 20 can drag-and-drop moments 10 containing selections and account information into another moment 10 or the like to conclude or engage in a transaction.

FIG. 31

Augmented Reality Location Based Feedback

Figure 31:
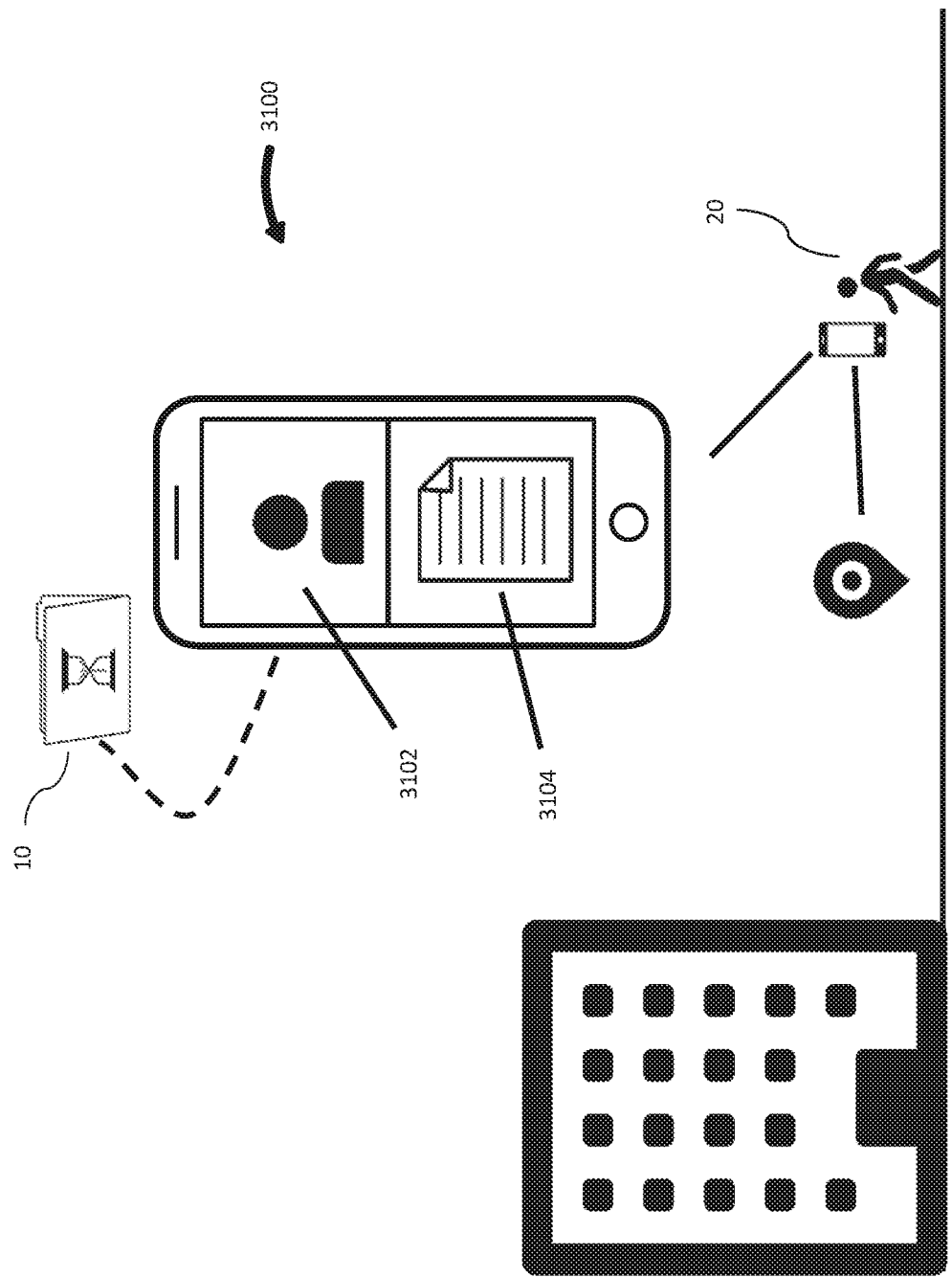
FIG. 31 is an environmental diagram of a mobile moment file for posting a resume and headshot according to an embodiment of the present disclosure.

In one embodiment, as shown in FIG. 31, (3100) the present invention may be utilized to receive feedback in a location-based AR feedback system. For example, a user 20 may leave a resume (biography, video, story, photo, or the like) in a location for an employer (agent, developer, or the like) to filterably and relevantly access and otherwise consume for consideration, comment, and/or to provide feedback 264. For example, an actor may leave, in strategic locations 16, a moment 10 with a headshot 146 as the AR element icon 84, linked to an audition recording, resume, document 148 outlining experience by AR hyperlink 12. Likewise, by way of another similar example, an individual aspiring to work in the publishing industry may leave their portfolio in strategic locations 16 near entrances and offices of prospective hiring staff. In another embodiment, a user 20 pays a fee for their resume to be placed in one or more location 16 where employers will see the resume.

In one embodiment, users 20 view a map 138 of the moments most recently created by a user and retrace the path of moments. In one embodiment, a user delays publication of a moment 10 for a specified amount of time before the moment posts with the original time stamp of the moment. For instance, a moment may allow a user to delay publication of the moment for a specific number of minutes after the moment was created. In another embodiment, a blogger may create and post moments relative to their blog in relevant locations.

FIG. 32

Mixed-Media Location Based Fund Sharing

Figure 32:
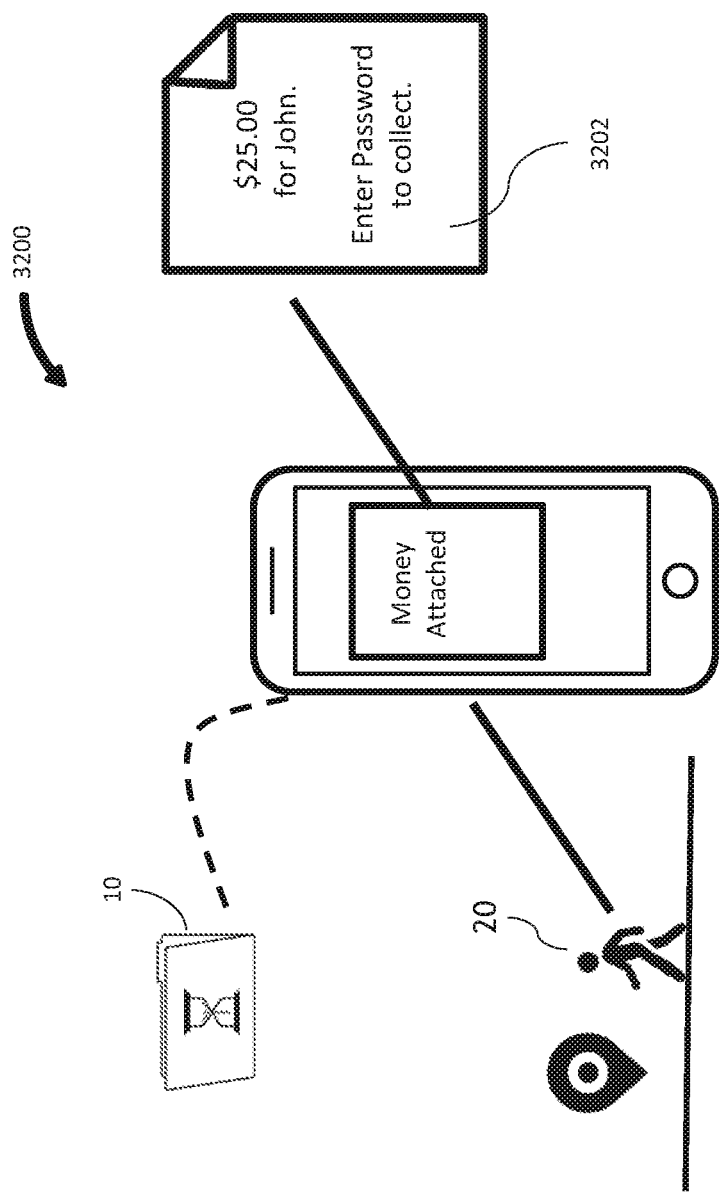
FIG. 32 is an environmental diagram of a mobile moment file for sharing money according to an embodiment of the present disclosure.

In one embodiment, as shown in FIG. 32 (3200), of the moment system 100, an AR location-based funds 128 transfer system 100 is described. A user 20 may place funds 128 attached to a moment 10. For example, a user 20 may leave a moment for another user 20 to open that authorizes the user opening the moment 10 to collect money. For example, a user 20 may send a moment to another user marked as a moment AR element (AR hyperlink) 12 containing a message stating, "I owe you $10 and left it in a moment for you in Forest Park." In a currently preferred embodiment 100 frictionless access to the funds 128 may be provided via a key exchange, blockchain, (e.g., or a distributed ledger system) or other user selectable and enrollable frictionless access methodology for either real-time or batch access. Biometric information such as gestures (on a display or by altering the pose or orientation of the device in a sequence or the like), facial or body recognition, fingerprint, or voice recognition may be utilized to access features of the moment system 100.

In one embodiment, certain physical locations are designated as free property where any enrolled or unenrolled user may post moments 10. In another embodiment, a business may purchase augmented property. For example, a business may buy the rights to restrict moments from being created at a specific physical location.

In another embodiment, a business has a user profile. In another embodiment, a business creates and places moments containing at least one of a coupon 36, or an advertisement 98 strategically placed in various locations 16 (e.g., among various augmented property estates 28). In another embodiment, the system may provide businesses with user accounts for accepting orders and payments. For example, a business may have a physical line and an augmented line of customers. For instance, a user may place an order at a business with directions on order and payment and based on the directions the order will be completed when the user arrives, e.g., drive-through restaurants.

FIG. 33

Moment File Reaction and Sharing

Figure 33:
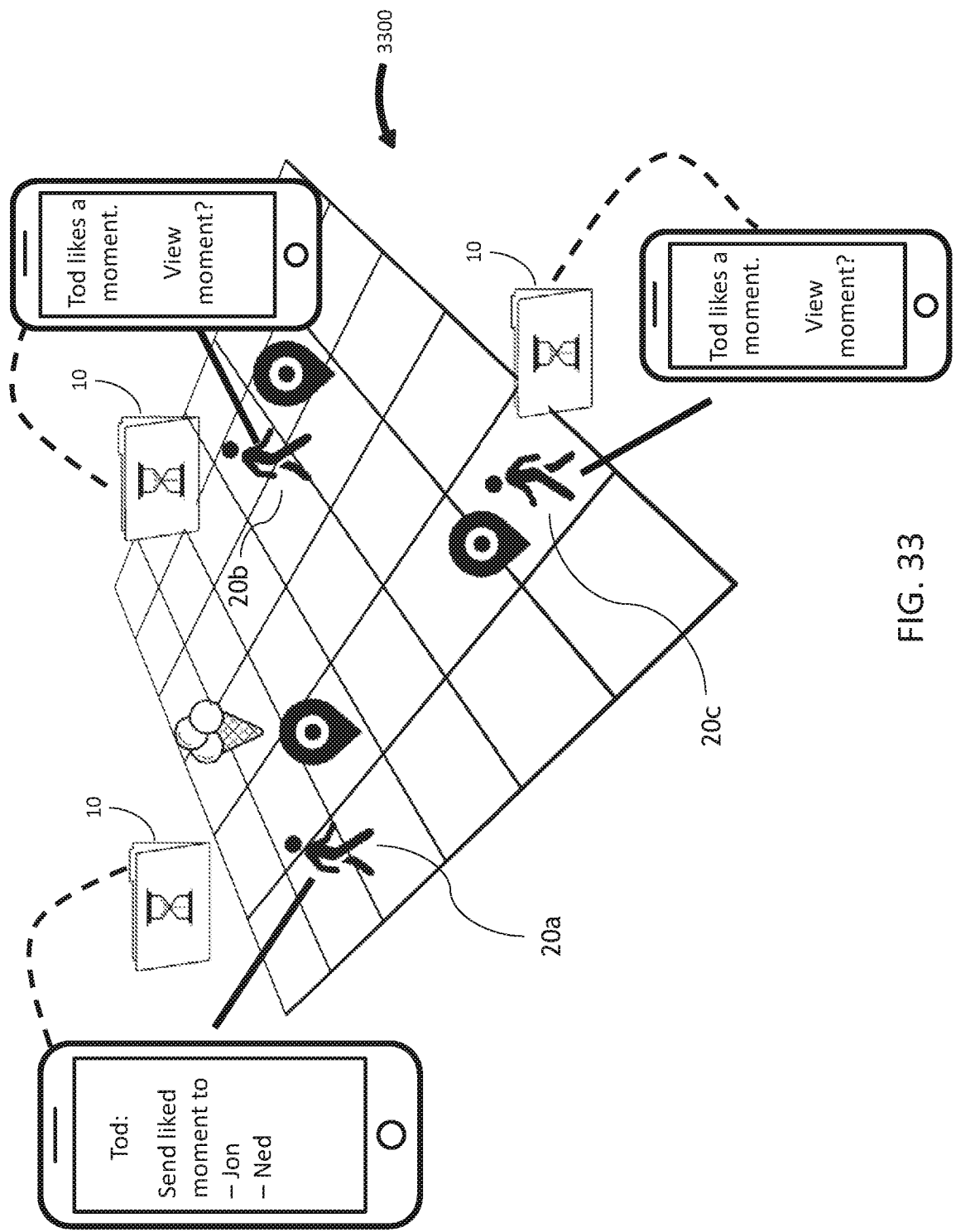
FIG. 33 is an environmental diagram of a mobile moment file for sharing a moment with other users according to an embodiment of the present disclosure.

In one embodiment, a user 20 "likes" a moment 10. In such an embodiment, as shown in FIG. 33 (3300), the moment system 100 provides AR-based content and sharing reactions. In operation, a user 20a "likes" a moment and selects one or more individuals (20b, 20c) to share the moment with and the moment is sent to the current location of each of the one or more individuals selected (20b, 20c). In another embodiment, a user 20 dictates a radius around another individual in which a moment will be placed and the moment is sent to that individual. In another embodiment, a user chooses any location for a moment to be left for another individual. For example, a user may decide to leave a moment for another individual at the Grand Canyon and a moment 10 is sent to such an individual's location or expected location 16, with, e.g., content 14 of a coupon 36 and a notification 96: "Hey, I left a Pip™ [moment 10] for you in the Grand Canyon for a 25% off meal coupon at PHANTOM RANCH." In another example, a user 20 may send a moment 10 to the currently location 16 of yet another individual and a moment 10 is sent to the other individual stating, e.g., "I left a coupon for you at your current location." In yet another example, a user 20 may decide to leave a moment 10 for another individual (enrolled user 20) within a 30-meter radius of the location of the individual and send a moment to the other individual stating "I left a moment somewhere within 30-meters of you with an invitation."

FIG. 34

Game-Play Along Moment Path (Breadcrumbs)

Figure 34:
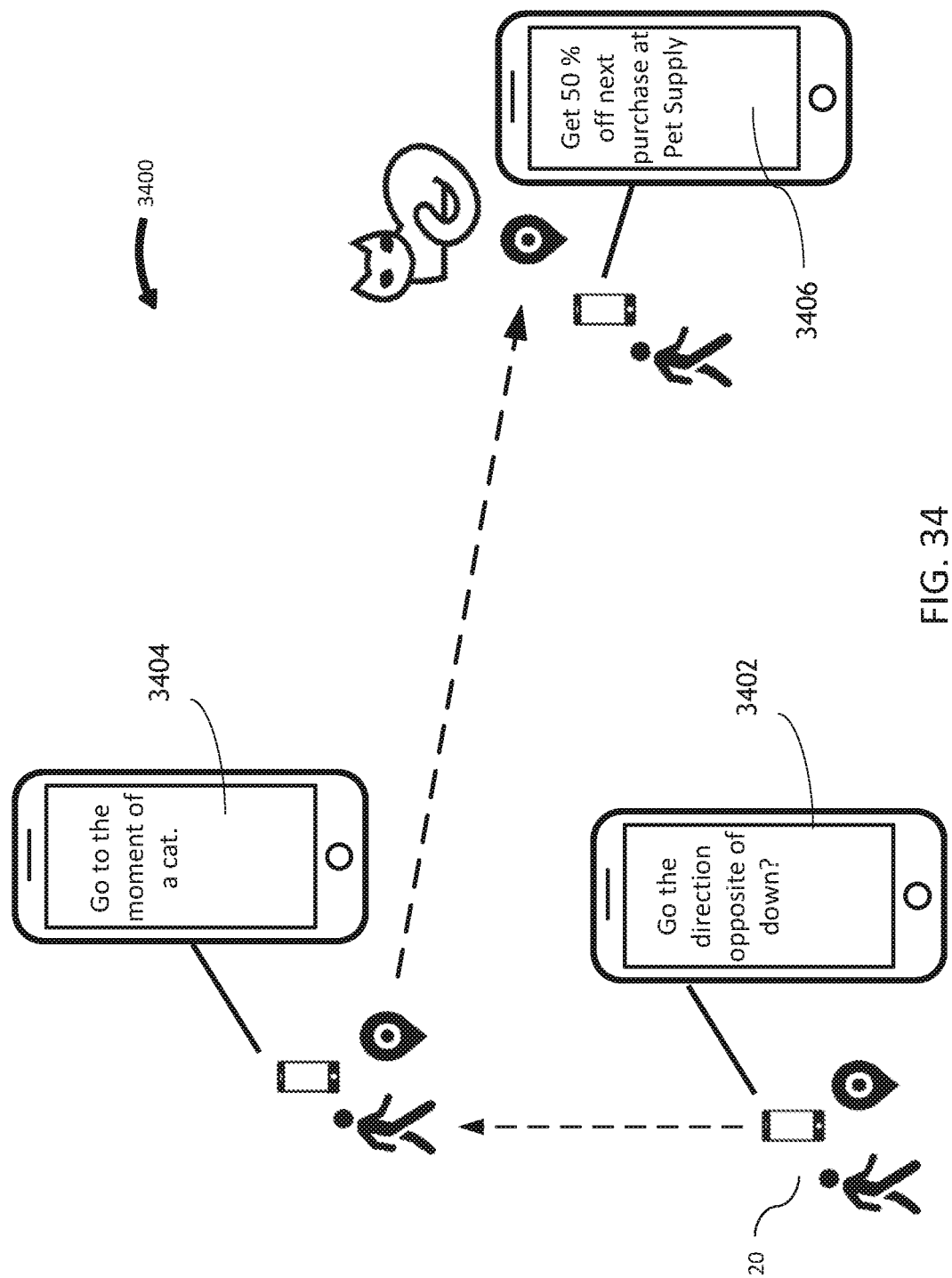
FIG. 34 is an environmental diagram of a set of mobile moment files forming a course according to an embodiment of the present disclosure.

In one embodiment 100, a moment 10 riddle course 3400 is created. For example, a series of moments 10 are created that lead to a prize where access to each moment is gained with a password that is the answer to the riddle in the previous moment 10 in the series. By way of another example, as shown in FIG. 34, a mix of physical 3402 and augmented reality 3404 moment clues lead an individual 20 to a moment with an attached prize 3406 (e.g., prize 158).

In one embodiment, moments 10 are created by/for users 20 to explore or visit new and novel locations 16.

FIG. 35

Tagged Review of Mobile Objects

Figure 35:
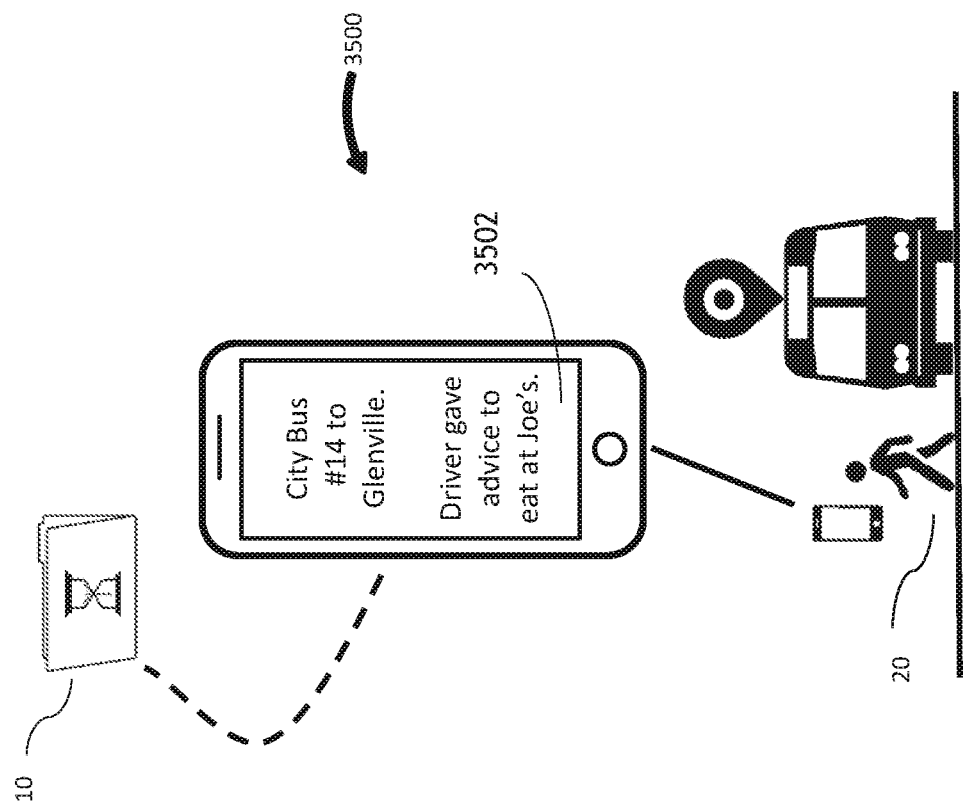
FIG. 35 is an environmental diagram of a mobile moment file of a conversation with a service provider according to an embodiment of the present disclosure.

In one embodiment, as shown in FIG. 35 (3500), a user 20 creates a moment 10 of a conversation 3502 with an employee and locates the moment 10 at the workspace (workstation, office) location 16 of the employee. For example, a user may create a moment associated with a bus/taxi that summarizes advice given to the user 20 by the driver/operator such that the moment 10 may be accessed by future users (patrons) 20.

FIG. 36

Moment Strings/Arrays

Figure 36:
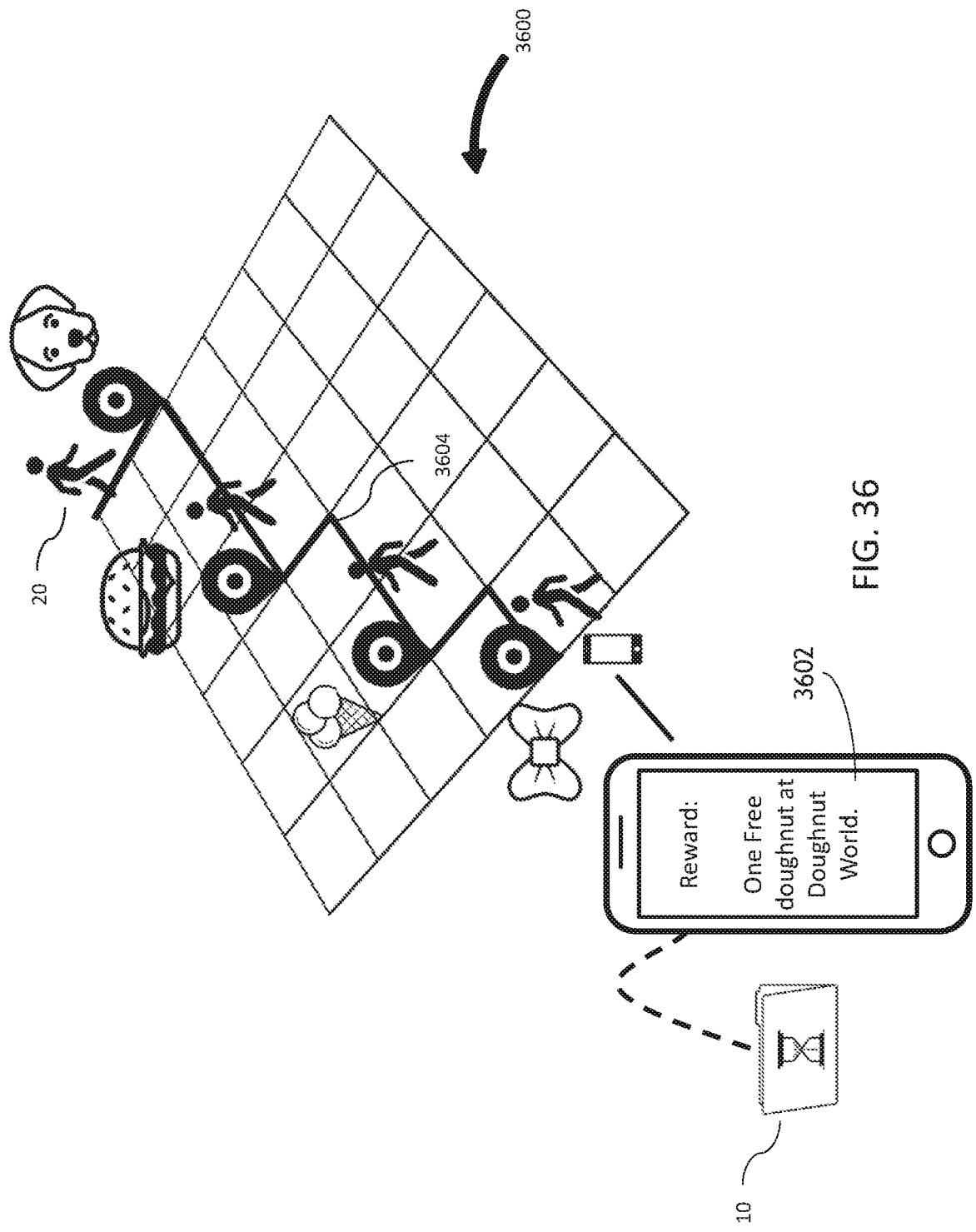
FIG. 36 is an environmental diagram of a map of mobile moment files along a journey of a user according to an embodiment of the present disclosure.

In one embodiment, as shown in FIG. 36 (3600) of the moment system 100, a user 20 is rewarded 196 for leaving moments 10 along, e.g., the route of their travels 162. For example, user 20 may obtain a prize 3602 (e.g., prize 158, 3406) or discount (coupon 36) by leaving moments 10 along their journey 140. In another embodiment, moment trails appear on a map 138 as a line (travel) with nodes (moments 10) along a trail 602. In another embodiment 100, a user 20 searches moment trails based on another user's name (friend group), or interest (art museums, food, bars, shows, etc. In another embodiment 100, a user 20 searches a trail of moments 10 of people they follow (subscribe) at, e.g., art museums, restaurants, and bars. In another embodiment 100, users 20 may filter moment 10 trails by various levels of detail relevant to the user 20. In another embodiment 100, a user 20 rates a moment on the level of detail, perceived feeling 212 or sentiment, length, media 14 (picture 224) AR hyperlinked 12 (or attached or other criteria as dictated by the moment 10 creator recorder (user 20)). In another embodiment 100, a user 20 may subscribe to follow a trail 162 of another individual user 20 (e.g., the user's 20 experiences 198).

In one embodiment 100, moments 10 may contain challenges 254 created to direct users to find something and receive a reward 158. For example, a user 20 may enter a coffee house 3802 and receive a moment challenge that states "Read three moments, and leave one moment for $1.00 off your next purchase."

In one embodiment, advertisement coupons 36 for specific brands displayed to a user may be traded for coupons for a different brand 122 a user 20 may select. In another embodiment 100, a cryptocurrency is involved in a purchase 160 of a good, service, or process in a moment 10 marketplace 126.

FIG. 37

Notification of Proximity to Moments

Figure 37:
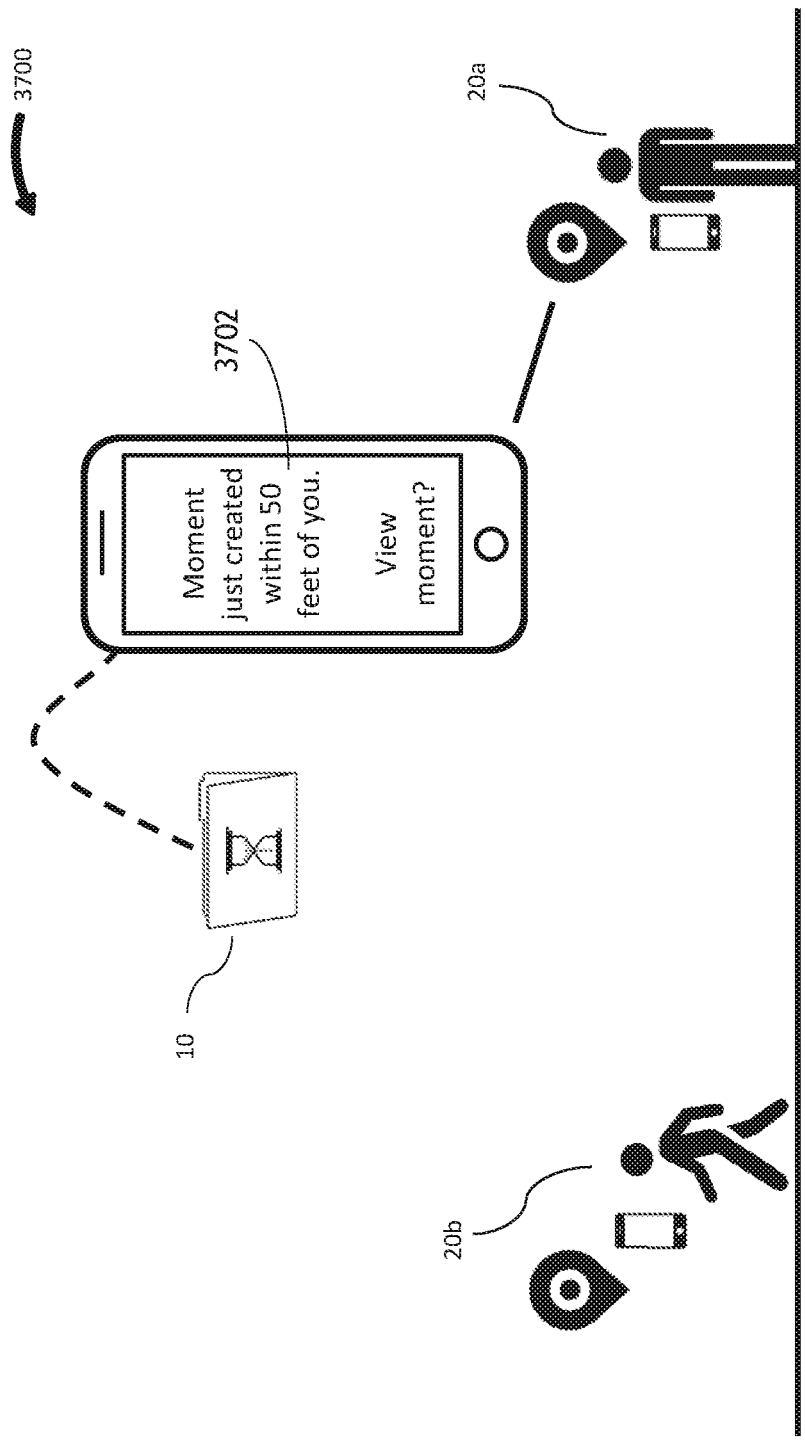
FIG. 37 is an environmental diagram of a mobile moment file notification of a moment being created in proximity of a user according to an embodiment of the present disclosure.

In one embodiment, as shown in FIG. 37 (3700), a user 20a receives a notification 3702 if a moment is created within a specific radius (area of accessibility 82) of the user 20a by another user 20b. For example, a user may adjust user settings, so a notification appears whenever a moment (e.g., relevant) is created within a 15-meter radius of the user.

FIG. 38

User-Informed Branded Moments

Figure 38:
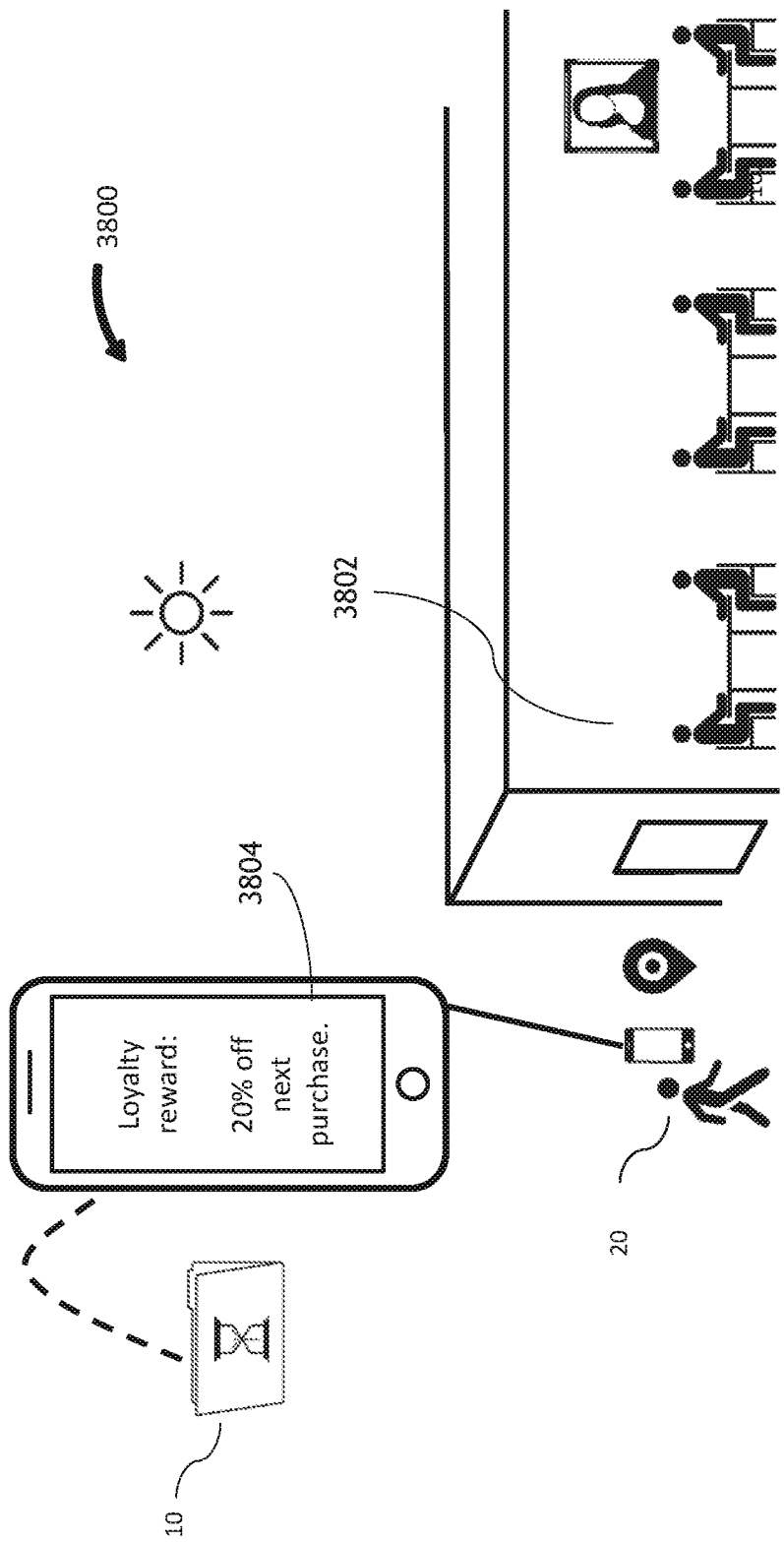
FIG. 38 is an environmental diagram of a mobile moment file of an anchored commercial coupon according to an embodiment of the present disclosure.

In one embodiment, as shown in FIG. 38 (3800), moments 10 are automatically placed in strategic locations based on, e.g., the travel habits of a user 20 within some area or habitat. For example, a moment 10 may be placed at a coffee shop 3802 visited by a user 20 each morning, in order to entice the user 20 to make a purchase 160 with a commercial moment coupon 2804 was targeted and relevant to the user.

In one embodiment, businesses have permanent or semi-permanent "static" moments 10 (e.g., like roadside billboards "VACANCY" or "FREE INTERNET & BREAKFAST" with coupons 36 or the like to entice visitors to a business location physical location 16 (in order to promote a purchase 160 or transaction). In another embodiment, moments 10 may be tagged 30 along a path between a user's apartment and a business. For example, moments 10 may target users of specific demographics for marketing purposes. For example, a 32-year-old mid-western cis-gender, and frequent coffee shop visitor, may be notified of a moment 10 offering a reward collectable at a specific coffee house 3802.

In another embodiment, filterably selecting moment file augmented reality icons for display on a user's handy, identifiers and filters (recorder-based or reader-based) include a character string and matrix, where each character and character position in the string or matrix is indicative of a characteristic of respective ones of a plurality of recorders 152, readers 150, and filters 106. In another embodiment, for a string or matrix utilized for filterably selecting moment file augmented reality icons, the inclusion and position of must match characters, need not match characters, or wildcard character may indicate the theme, class, location, user, category, and location type of moment files to be displayed or not displayed.

In other preferred embodiments an enrolled handy 18 may calculate position data of a moment 10 to be read or accessed as a defined locus to the moment 10, whereby the handy processor may retrieve an augmented reality icon or icons of the moment 10 when the location of the handy 18 corresponds to the defined locus. The defined locus may be, for example, a circle or freeform shape having a radius or other dimensions defined by the recorder 152.

Preferred embodiments of the present invention may have operational characteristics of the device conditional on certain user and estate holder attributes, actions, or the like. Attributes may include, for example, a condition precedent wherein some event must occur, or some action or sequence of actions must be performed, before a benefit or the like accrues to the user or estate holder 28. In such an embodiment a user 20 may receive a coupon 36, chit, or other like reward 130 upon performing an operation associated with a handy 18, or an advertisement 98 designated by an augmented estate holder 124 may be displayed or not displayed depending on a condition precedent and whether that condition is fulfilled. For example, the condition may include one or more challenges answerable by one or more acceptable or proper responses (e.g., a riddle, a question, a security challenge, or otherwise encoded information). If the proper response is submitted via the handy 18, the condition may be taken as fulfilled and any associated benefits or rewards 130 provided. Additionally, a condition may be a condition subsequent wherein, for example, unless the event occurs, or the action/sequence is performed, a benefit or the like may cease to accrue to a user 20 or an augmented estate holder 124. In such an embodiment 100 a user 20 may not continue to enjoy the value of a chit, coupon 36, user level, or the like unless a condition continues to exist. In such an embodiment of a condition subsequent an estate holder 124 must continue to provide some benefit or the like (e.g., perform some action or sequence of actions) to retain an estate hold 132 or the like, or in the example of a user, the user 20 may not continue to accrue or accumulate benefits or attain a new benefit level or the like. The present invention may also include suspensive conditions wherein a benefit is enjoyed by the user or estate holder 124 upon some pseudorandom event or some fortuitous happenstance or the like. For example, in game play or the like a series of Pips™ (moments 10) might need to be discovered for a benefit to accrue or the like (e.g., either collectively, whereby the series of Pips™ may be accumulated in any order, or sequentially, whereby the series of Pips™ must be encountered in a predetermined order or according to some other predetermined conditions). Likewise, an estate holder 124 may obtain discounted or reduced estate hold fees, taxes, or the like according to some pseudorandom or disinterested party selection or the like.

V. FIGS. 39-54 (Modes of Operation)

Figure 39:
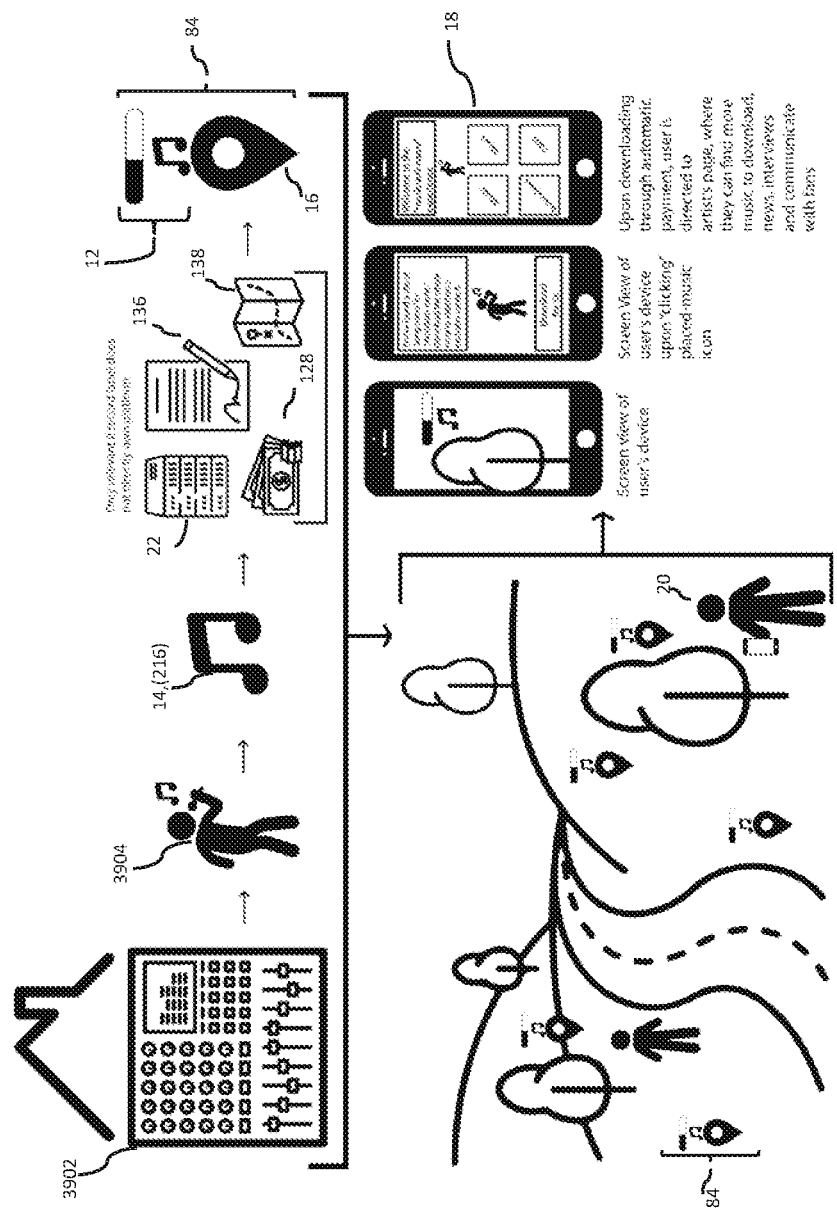
FIG. 39 is an environmental diagram of a mobile location-based content sharing platform.
Figure 40:
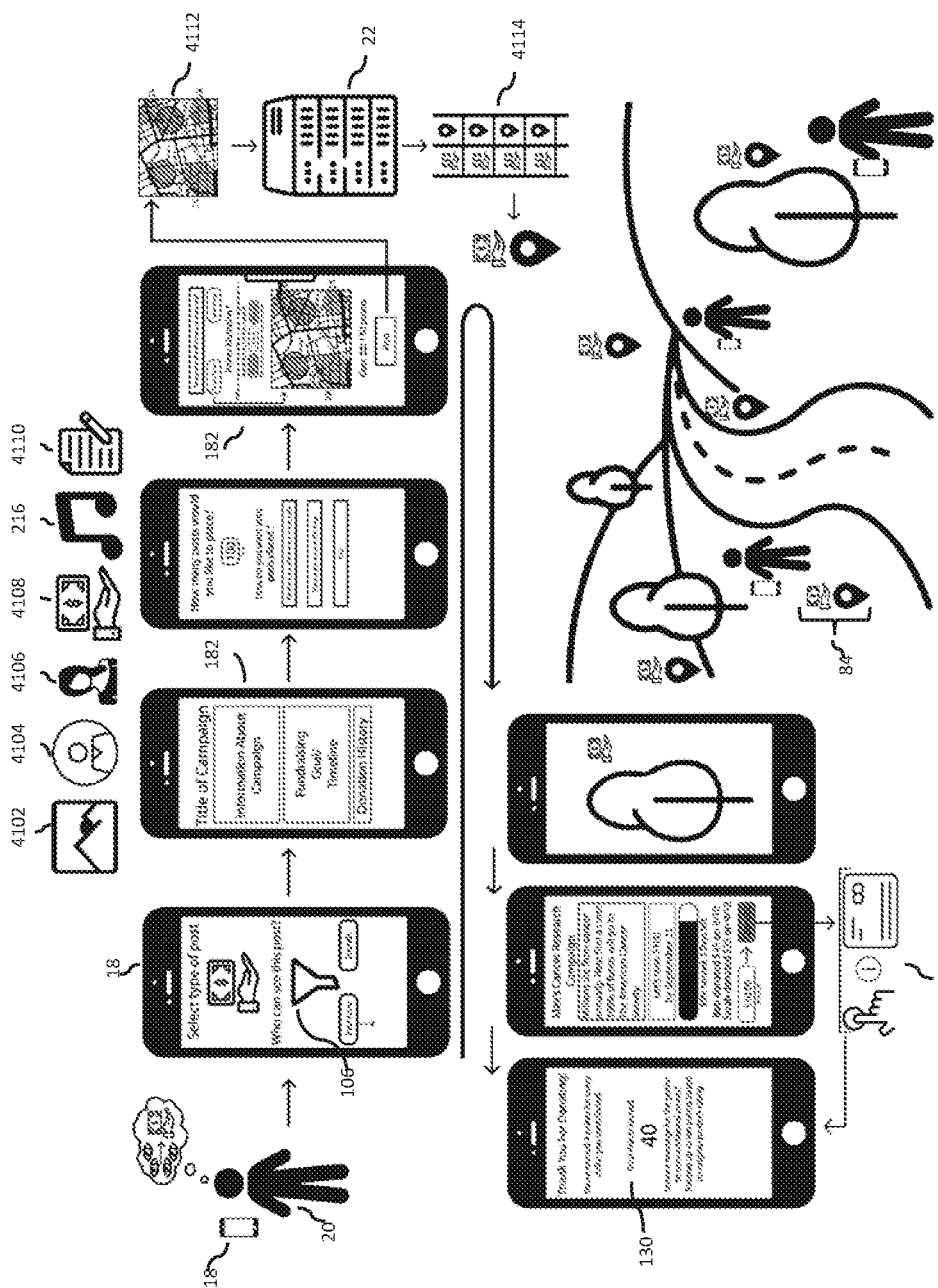
FIG. 40 is an environmental diagram of a mobile location-based content sharing platform.
Figure 53:
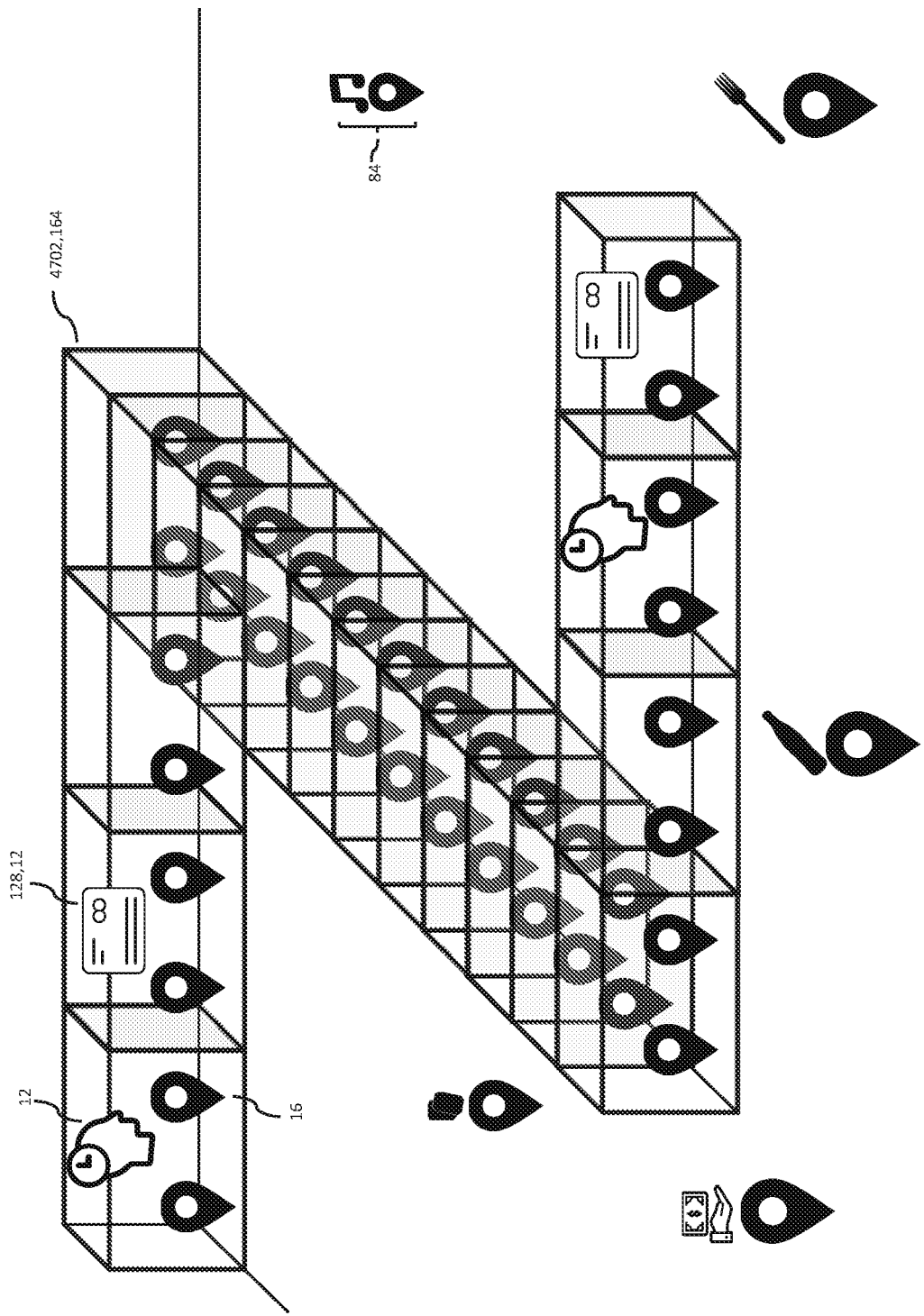
FIG. 53 is an environmental diagram of an augmented reality system with a geofenced boundary.

Turning now to FIGS. 39-54, embodiments of the moment system 100 provide various new and nonobvious enhancements and improvements to AR and mixed-media utilities and provide new and nonobvious features for users and entities operating: (1) content delivery services (broadcast, recorded, and streaming) (FIG. 39); (2) location-based content sharing platform (FIG. 40); (3) location-based content sharing platform (FIG. 41); location-based mixed-media (FIG. 42); augmented selection (FIG. 43); Ultra-Wide Band (UWB) positioning, communication and the Internet of Things (IoT), and frictionless redemption and purchasing (FIG. 44); augmented reality mail delivery (FIG. 45); consumer electronics and appliance manufacturer utilizations (FIG. 46); location-based services and (position and orientation uncertainty) (FIG. 47); drive-through restaurant utilizations (FIG. 48); media outlets and content creators/distributors utilizations (FIG. 49); camera based social media utilizations (FIG. 50); smart device and mobile provider utilizations (FIG. 51); video sharing platform utilizations and geofenced boundaries (FIG. 52); and entertainment venue operator utilizations (FIG. 53).

FIG. 39

Location-Based Mixed-Media Content Delivery Service

FIG. 39 illustrates a location-based content delivery system of the present invention. A music studio (or media creator/distributor 3902) who has a artist (e.g., media creator 3904) under contract to create content, may be promoted via embodiments of the moment system 100. In operation, media 14 (e.g., a song 216 or a clip) may be pushed as moments locatably tagged 30 to strategic locations 16 as moment AR elements (AR hyperlinks) 12 identifiably as an emoji/avatar AR hyperlink 84 of the or representative of the artist. The initial active user display of a user's smart device (handy) 18 view accessible by hyperlinking would display the user's physical and actual surroundings, combined with a Digital Onscreen Graphic (DOG), indicating moment 10 and moment AR element 12 at location 16 as well as artist. Upon "clicking" on the hyperlink, the user is directed to a mobile media page related to the specific content (e.g., song title, musician, other information), and an option to purchase 160 the entire song 216 (through automatic payment of their digital wallet on their device). Upon Downloading, they are directed to a mobile media page devoted to the musician included in the media 14, offering e.g., exclusive content music, news, interviews, and fan-based information/social networking.

FIG. 40

Location-Based Mixed-Media Feedback System

FIG. 40 illustrates a location-based feedback embodiment of the moment system 100. By example, a user 20 initially conceptualizes what type of content they want to consume, in this case, they want to promote a fundraising campaign ((e.g., other options may include art portfolios, professional (Resume/CV), Headshots for Models, original music sharing, and written documents (Essays, poems, petitions)). The user 20 may be directed by embodiments of the invention 100 to select a filter 106 setting (or the like) relevant to whom they desire to have access to the content. In an instance, a user may opt for "everyone" (all users who come into contact with the content). The user 20 may then be directed to a page, asking how many moments they would like to record, and how they would like the moments recorded, e.g., randomized within one or more radii, placed as they go, or a trail following a particular path of interest. In an instance where a user has selected the first option, and has opted for a circular range (versus, e.g., a custom range). Indicated, for example, by color (gray), un-outlined circles, some areas of augmented property 132 may be determined to have more value (e.g., determined by auction 126), e.g., foot traffic, time of day, and other such variables. The user selects what multipliers they are willing to "pay" for, using a point system. The selected radii, (gray, outlined circles) are then analyzed to determine overlap. For Instance, "Range 2" may overlap a 3× point region. The number of beacons placed randomly is therefore distributed based on the percentage of the range that is within the ×1 multiplier and the ×3 multiplier. This location data is sent to a server, which catalogues the type of post/unique information within the post, and a random Lat/Lon within the selected range. This information is converted to digital beacons of a specific type (fundraising) tied to a specific location. These beacons are dispersed according to the user's presets. These beacons can appear as AR icons to users actively seeking them, or push notifications on their devices if they pass through a range of the digital beacon. Upon clicking the icon, users are directed to the information left by the initial user, and given the option to donate (or otherwise interact with the post. This interaction is rated by the initial posting user, and an amount of points 130 is given to the secondary user based on the rating of their interaction.

Lift and learn AR moment-based signage of relevant product and consumer information is also disclosed. In operation a user 20 may utilize the moment system 100 to learn about a product 198 or to do product comparisons. In traditional lift and learn systems a large wall mounted display is used to display product specific information when a user interacts with a product. With the present invention, a moment 10 of each product may be represented as an AR element of the product, touching the AR element of the product brings up product information. Dragging one or more product AR elements together creates a product comparison.

FIG. 41

Location-Based Mixed-Media Messaging

Figure 41:
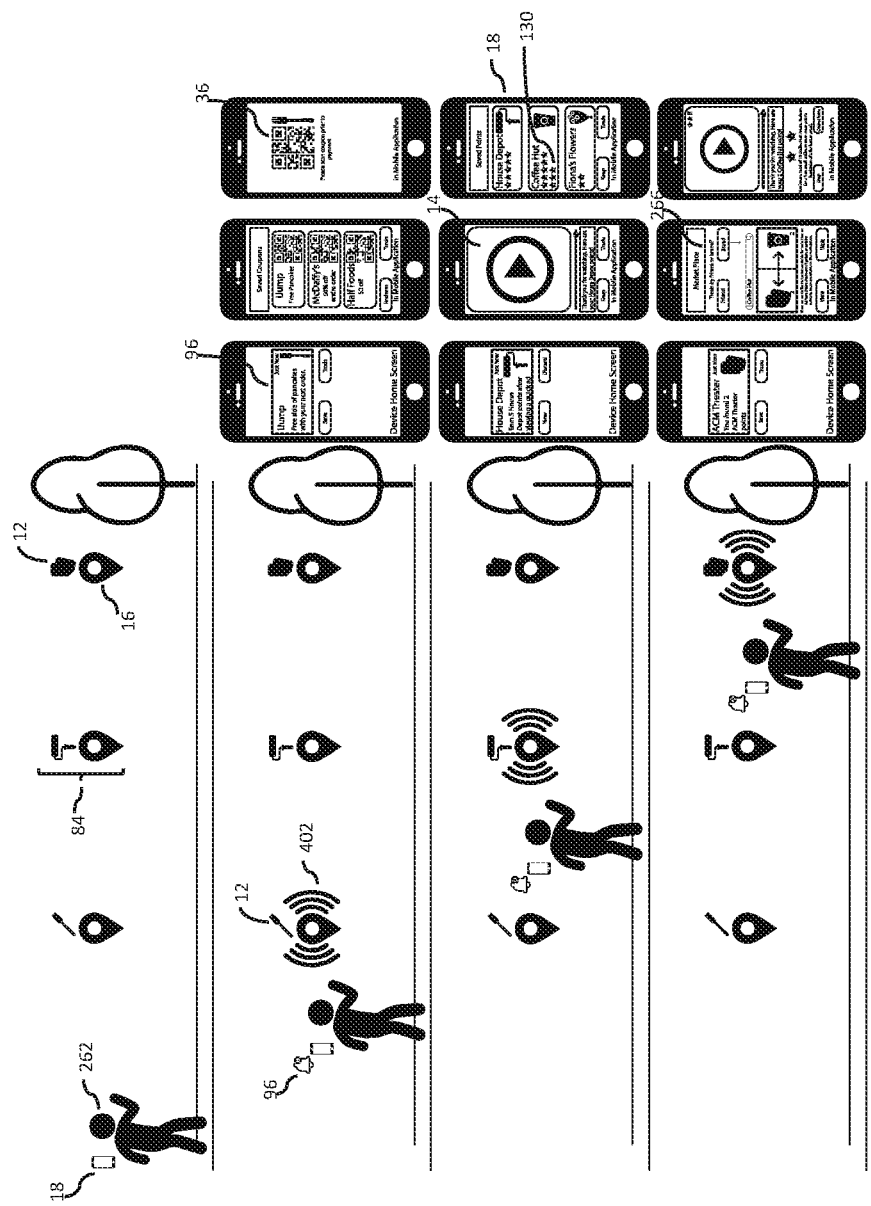
FIG. 41 is an environmental diagram of a mobile location-based content sharing platform.

FIG. 41 illustrates a location-based messaging embodiment of the moment system 100 wherein messages may be filterably pushed to an enrolled reader (smart device (handy) 18) at an enrolled reader's general location for enrolled user notification and subsequent user selection or dismissal.

A user 20 with a handy 18 walks (bikes, drives, flies, or otherwise moves) from one place to another. As a user 20 moves through an area (e.g., walk) their smart device (handy) 18 comes into contact or within range of a moment 10 (area of accessibility 82), associated with a server 22, tagged 30 to a set of coordinates (or an object associated with a lookup code 254 or beacon 78) hyperlinked to media 14. For instance, as a user 20 approaches a moment 10 their device 18 may receive a notification 96. The user 20 may be given the option to "save" or "trade" the content (media 14) in the moment 10. In this example, the moment 10 contains a coupon 36 for a free-side of pancakes. Upon selecting an option, in this case "save," the user 20 is directed by embodiments of the system 100 to a saved coupons page, showing the newly saved coupon as well as previously collected moment 10 content (media 14). In this example, the user has selected "redeem" (at a qualifying location), so a QR code, or the like appears for scanning or transmission.

In another example, an enrolled user 20 with a smart device 18 in the area of accessibility 82 of a moment 10 may receive a notification 96 when located near relevant media 14. In such an embodiment 100, for example, the user 20 receives a notification 96 alerting the user to an amount of points 130 available for collection and redemption within a moment or set of moments 10 nearby or within a store 72 (structure) or on an augmented property 132. Further to this example, an embodiment of the moment system 100 may require secondary moments 10 to be consumed by a user 20 (i.e. an AR experience, a video advertisement, or the like). If, for example, the user 20 desires to collect the points, they must locate and consume the moment or set of moments 10. The points 130 may be made available to the user 20 to redeem, trade, or collect. Upon clicking "keep," for example, in a menu the user 20 may be directed to a menu 40 to select, e.g., to "save" the points the user 20 has collected. In a third example, the user's smart device 18 may receive a notification 96, containing a total point availability for redemption on real or virtual goods (e.g., representative of the augmented estate holder's 124 interests. If for example, a user 20 selects "trade," from the menu 40, the user 20 may be directed to a point marketplace 266. The user 20 may then be provided with the option of trading points 196 with friends, (existing social network connections/contacts, or the like), or to search for user's with point requests for particular brands or the like. Additionally, as an example, the user 20 with nearly a redeemable ten Coffee Hut points, decides to trade two ACM theater points for two Coffee Hut points. In this example, if there are no tradable Coffee Hut points available, the user 20 may be invited to view moment contents 14 (e.g., a video advertisement) to earn the additional necessary points (or to wait for the points to become available). Upon selecting "view," the user 20 is directed to a menu 40 with selections to, e.g., view a video. After viewing the video 220, the user 20 is notified they have earned all ten Coffee Hut points and may redeem (128, 160) the points 130 for a small coffee. The user 20 may also be notified 96 they may either keep the coupon 36, trade the coupon, or collect additional Coffee Hut points to earn improved prizes.

FIG. 42

Location-Based Mixed-Media Frictionless Redemption and Purchasing

Figure 42:
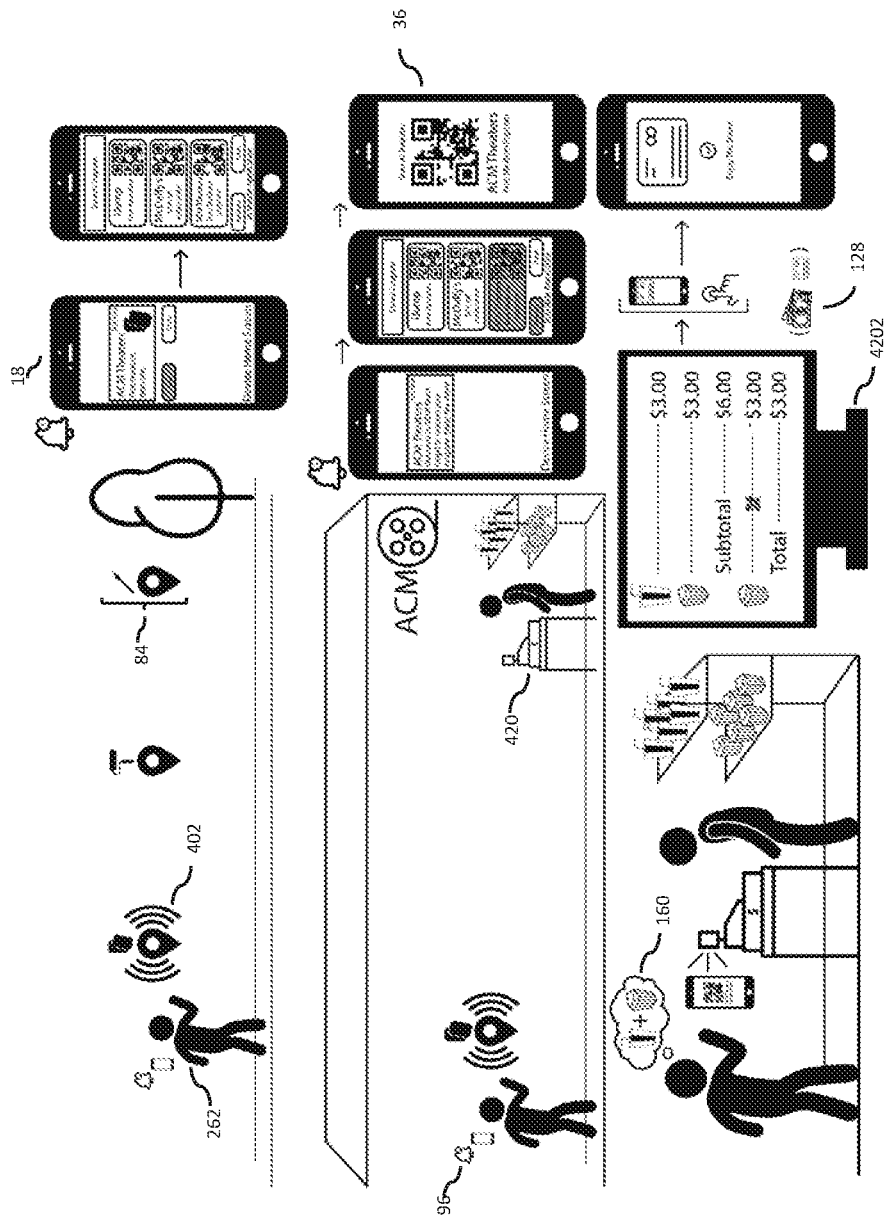
FIG. 42 is an environmental diagram of a mobile location-based payment platform (for use in e.g., a retail [FIG. 12] or similar environment or in an augmented property [FIG. 15] transfer system.

FIG. 42 is an embodiment of the present invention teaching the use of location-based redemption of digitally sourced AR coupons 36 and the like via the location based augmented reality content and messaging system 100 of the present invention. In operation an enrolled user 20 with a smart device (handy) 18 may redeem 160, 1400 (redeemable items, e.g., coupons 36, offers 98, awards 130, prizes 196, points 266, or the like) at a place of business 72, 250.

A user 20 with a handy 18 walks (bikes, drives, flies, or otherwise moves) from one place to another. As they walk, their smart device 18 moves within the area of accessibility 82 of moments 10 identified by moment AR elements 12 associated with a location 16 or object 32 on a server 22 and filterably 106 relevant to the user 20. As a user 20 approaches a relevant moment 10 they may receive a notification 96 (smart device vibration, or aural chirp, or the like) alerting the user to the relevant moment 10. The moment 10 may be marked by a branded AR hyperlink 12 (AR element) or an emoji (avatar) AR hyperlink visually appealing and in some embodiments related to the hyperlinked content (moment 10).

For example, a user 20, during their commute may collect relevant moment 10 content 14 via their smart device 18 in an ON state (or upon receipt of a notification 96 when the smart device 18 is in a STANDBY state). Some of the relevant content 14 may be coupons 36 (points 130). A user 20 may exchange, redeem, trade, or hypothecate the contents of their collected moments 10 at legacy exchange points (cashier station 316) or a kiosk 318. The moment 10 may include augmented estate holder 124 content such as a Digital Onscreen Graphic (DOG), an advertisement 98 which must be viewed before the content may be consumed, or the requirement of an exchange of value (128, 160) of points 130 For example, as a user 20 approaches a moment 10 they may be given the option to "save" or "trade" the content (media 14) in the moment 10. In this instance, a user 20 who is not actively searching for moments 10 may receive a notification 96, whenever they reach a particular point level or the like, or are near a redemption point. Upon selecting "redeem," a QR code, or the like may be generated for simplifying an exchange/purchase process.

FIG. 43

Augmented Selection

In embodiments of the present invention a user 20, with an enrolled smart device (handy) 18, having location services 2110 including device orientation, angular velocity, mapping technologies 138, internet-of-things (IoT) 56 connectivity, pedometer, camera, audio recorder/player, included in the smart device (handy) 18, may point their handy at an object in real space (location, object 16, 16). This object and direction (e.g., building, street, square, area, object, or the like) and embodiments of the present invention can identify places and things of interest (interesting venues to visit, e.g., 230-250), parking availability, dangerous areas to avoid (police report locations), and the like via the server 22, cross-referencing preexisting surveyed map of the area, and combining the user's (device's) current accuracy and the orientation of device (where the camera is pointing/what direction the screen is viewing) will be able to identify and access augmented information via associated tagged moments 10.

When an object is in view, an associated relevant augmented reality element marking a moment 10 may be "clicked" whereupon users gain access to augmented information regarding, e.g., the building, and are provided with options such as "general information," "reservation," menu, purchase options, and the like. For instance, if a tourist is visiting a new city, they are not necessarily aware of their surroundings, panning their phone screen, they are able to click on highlighted objects (surveyed locations) in their surrounding area.

For example, a tourist gets off the bus in New York City, and takes a taxi from the bus stop to the heart of Manhattan. She did a bit of research on what to do and where to go before arriving in the city, but now that she is in the thick of it, she'd like to get more information about her direct surroundings. She retrieves her handy, and opens the relevant software. Using her device, she pans her handy screen, searching for buildings, structures, etc. that are augmentably selectable (represented by a brightly colored outline surrounding the real object and/or translucent field covering object, or the like). She can do so for any building/structure or portion of building/structure that is visible through her device's view from her current location from "any" distance. Along with the highlighted selectability of the building/structure, augmented advertisements hang from the façades of the buildings, as represented by façade informed media 4304. She clicks on an augmented actionable object 4306 highlighted as an AR building representative of "Pizza Pizza" restaurant surrounded by 3D field 4302. Upon doing so, she is provided with a list of actionable options. She can "make a reservation," "pre-order" a pizza, "visit [the] website" get "directions to the location" from her current location (she could be a few meters away, she could be miles away), and an option to automatically have a car pick her up from her current location and take her to the location of interest (utilizing a taxi or other service).

FIG. 44

Ultra-Wide Band Positioning/Communication and the Internet of Things (IoT)

Figure 44:
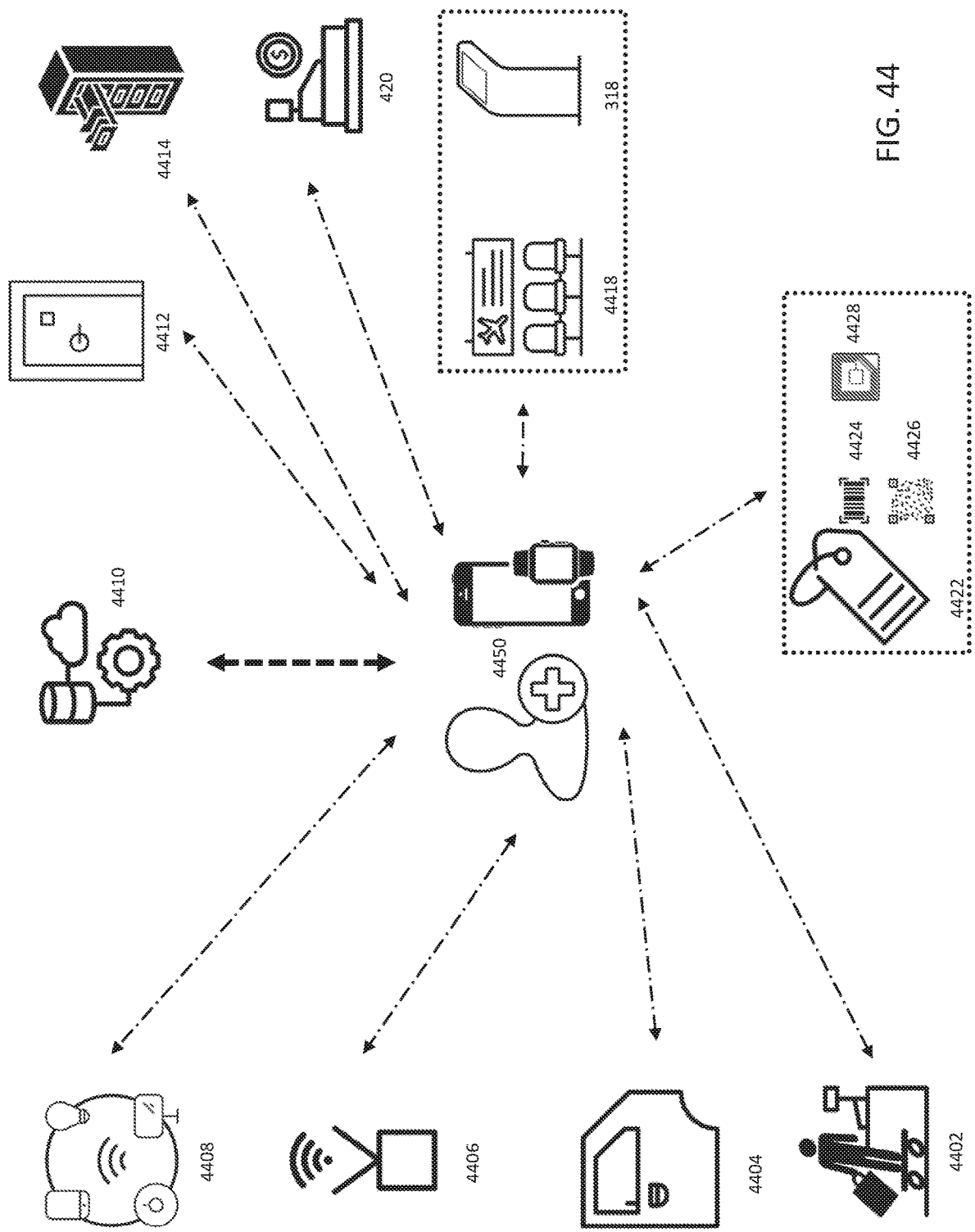
FIG. 44 is an environmental diagram of an ultrawideband (UWB) positioning system for use with embodiments of the present invention.

FIG. 44 is an environmental diagram of an ultrawideband (UWB) positioning system for use with embodiments of the present invention in determining a handy or the likes position relative to/for a moment.

UWB calculates precise locations by measuring signal return times for radio pulses to travel between devices. In operation with tags such as UWB tags (and generally, but with less accuracy, e.g., Wi-Fi, infrared, passive RFID, and active RFID location tags), the present invention may assist users in Logging IN/OUT of a frictionless location-based content access system. Additionally, UWB and the like may be utilized to determine relative position of a user's handy and tagged content available and relevant to the user. Such fine range tags (FiRa) in embodiments of the present invention may allow a user to access mail securely delivered to a specific location within a habitat or the like. Such mail might include targeted relevant catalog material, magazines specifically constructed of content relevant to the user, personal messages, and the like. Likewise, premium content (e.g., movie, newspaper, or magazine) containing special content specifically directed to a user based on travel plans and interests or the like. Such content may be purchased 160 from an AR kiosk (preferably a virtual kiosk marked by an AR element) or the like at a terminal for viewing and/or enjoyment on a flight or the like.

FIG. 45

Augmented Reality Mail Delivery

Figure 45:
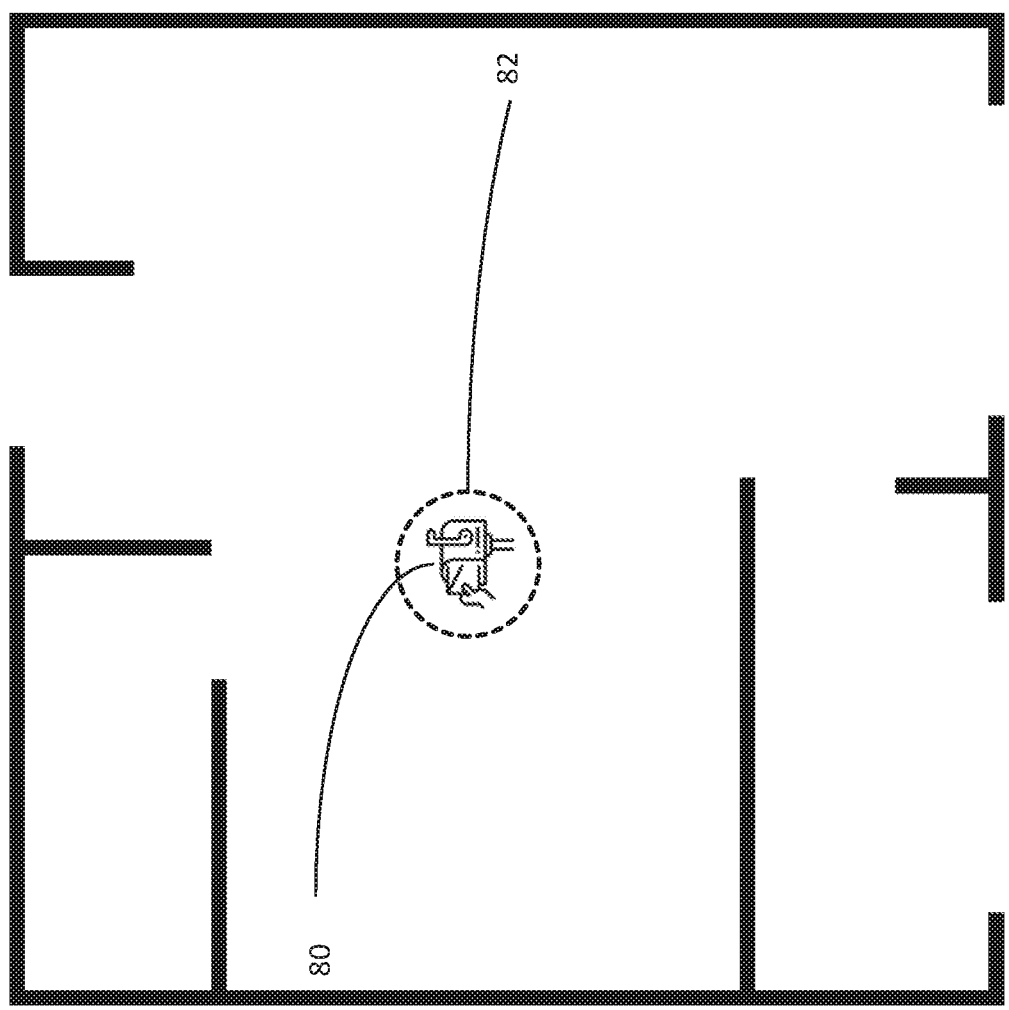
FIG. 45 is a diagram of an augmented reality mail delivery system.

It is common for the public to maintain or have maintained for them a mailbox on or near their residence. This physical mailbox is generally in a common area, on a porch, near a door, near a curb on a frontage street, or the like. The United States Postal Service (USPS) generally delivers residential mail everyday but Sunday. Such paper mail includes correspondence 180, invoices/bills 94, catalogs 86, magazines 92, advertising flyers 98, and notifications 96. Likewise, many members of the public also utilize smart devices to receive electronic mail such as email and texts. Such smart devices are often also utilized to subscribe to news aggregators, and premium content such as magazines and newspapers. During the day an average person collects their mail once a day from their mailbox. Sorts it, discards many items not of interest to the sorter, and organizes and processes the rest. From time to time a member of the public may check their electronic mail throughout the day. Embodiments of the moment system 100 may be utilized to push an AR hyperlink AR element (AR hyperlink) 12 (84) to the interior of an enrolled user's 20 habitat. Such an AR element (AR hyperlink) 12 may contain all of an enrolled users physical mail (albeit more directly related to a specifically filterably directed to user) and all of the enrolled users 20 electronic mail. An enrolled user 20 may move to the area of accessibility 82 designated within their habitat (location 16) to securely peruse, sort, enjoy, and manage their mail, e.g., a favorite chair or the like. FIG. 45 illustrates a location-based mailbox of the present invention.

FIG. 46

Consumer Electronics and Appliance Manufacturer

In various embodiment of the moment system 100 (FIG. 46), manufacturers of smart appliances 58 and user devices, such as smart devices, televisions (displays) 70, streaming and content delivery devices 56, kitchen and household devices 68 such as refrigerators 60, coffee makers, clothes washers and dryers 66, may provide connectivity between such devices and the Internet of Things (IoT) 56. In such utilizations, an enrolled user 20 (smart device (handy) 18) may use the present invention 100 to automatically populate their physical environment with AR control moments and reminders relevant to the use and operation of their connected devices. For example, the refrigerator 60 and the like may track contents via package codes and the like and create shopping lists and product purchase reminders in retail shopping stores such as grocery stores. Such reminder or list moments may be automatically tagged by, e.g., the refrigerator 60 to the exact location of the product that needs purchased. In other embodiments a professional picker may selectively utilize such moments to pick product for delivery to an enrolled user.

Figure 46:
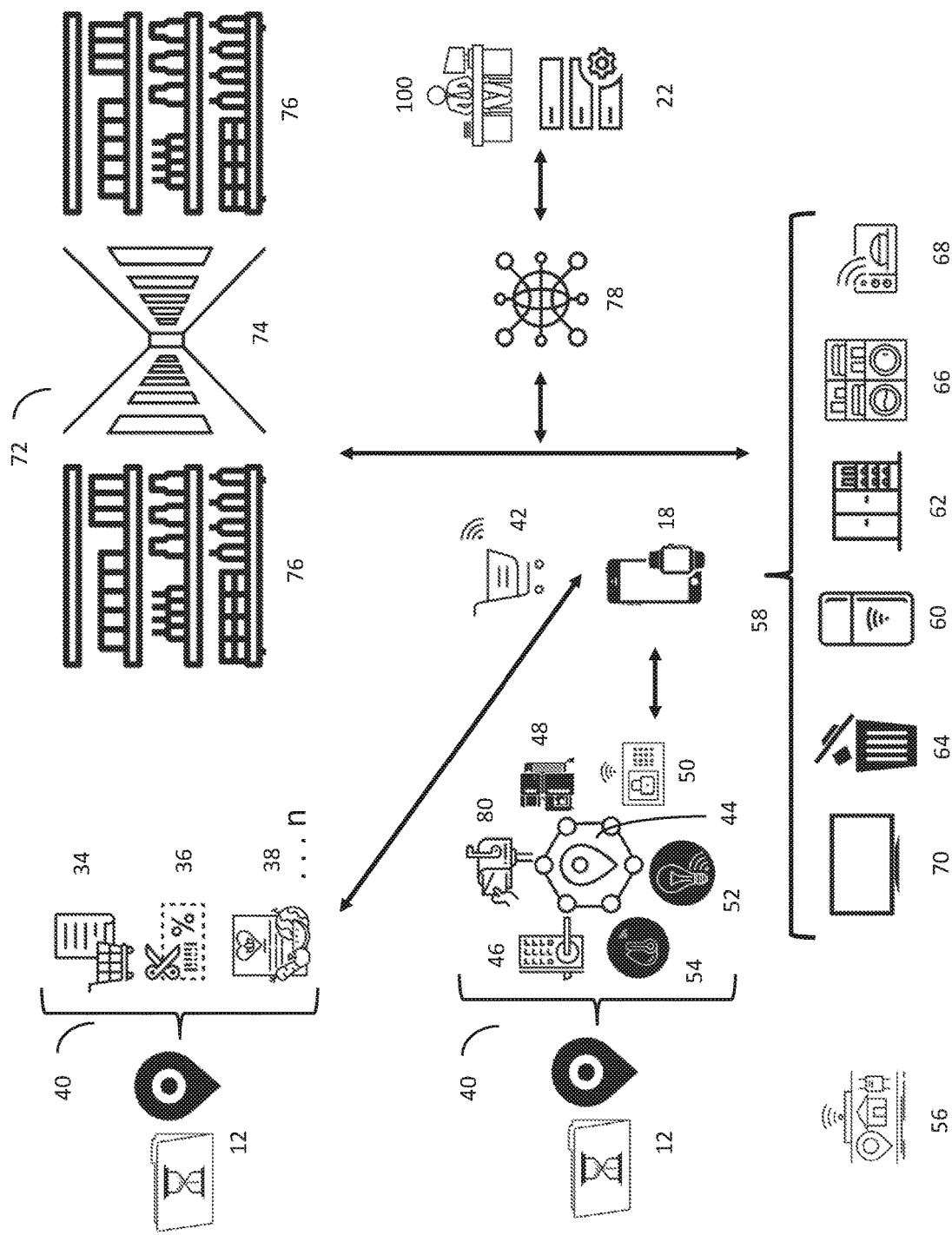
FIG. 46 is an environmental diagram of an augmented reality system used in the context of consumer appliances.
Figure 47:
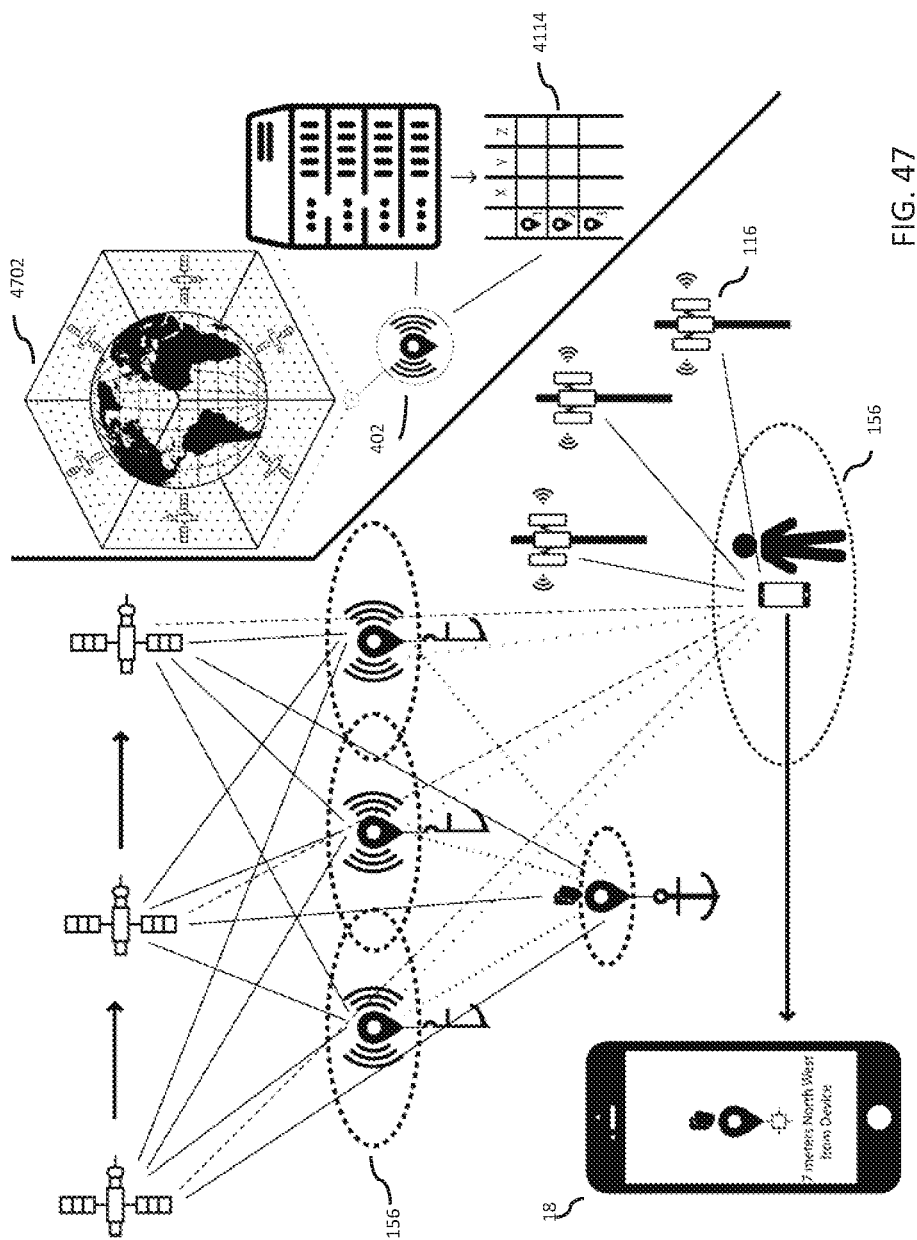
FIG. 47 is a graphic representation of a location reporting system.

In operation of embodiments of the type, e.g., illustrated in FIG. 46, the moment system 100 of the present invention may be utilized to tag moments 10 (including media 14) to locations 16 (including e.g., position, orientation, and time and the like information) and tagged objects 32. For example, a user 20 may utilize their smart device 18 (handy and the like) via location services 24 operating in conjunction with a network 26 and server 22 within an augmented property system 28 of the moment system 100 of the present invention to access (relevant to their location) interactive AR moments 44, for example, to control their surroundings.

Many homes include connected: locks 46, appliances 48, security systems 50, lighting controls 52, environmental systems 54, computers and network access devices 56. In operation, a home owner (user 20) with an enrolled smart device (handy) 18 operating an embodiment of the moment system 100 may place interactive moments (10, 44) around their home. Each of these moments 44, may be tied to a particular room (location 16; or tagged object 32, 84). A user 20 may select such a moment whenever they are within an area of access 82 proximate to such a moment 44 location 16. Selection of the interactive moment (10, 44) provides a menu 40 of items selectably and controllably relevant to the location 16 and/or the user's 20 interests and desires. A user 20 may also read their mail 80. Such mail 80, in accordance with an embodiment of the present invention 100, may contain recently delivered: (a) catalogs 86, (b) snail mail and email 88, (c) texts and other electronic messages 90, (d) magazines and other premium subscription or purchased content 92, (e) bills and invoices 94, (f) notifications 96, and (g) offers or junk mail 98. A user 20 may peruse their mail 80 at a time, as they would in the normal course, review their physical mail delivered to their physical mailbox (and as e.g., delivered by the USPS). Such mail 80 may include augmented estate holder 124 content (provided via a terminal and server 22 over a network 78 (wired or wireless)) and/or such content (catalogs 86, premium content 92, notifications 96, and junk mail 98) may contain content (media 14) such as advertisements and the like specifically of interest to and/or directed toward the user 20.

Likewise, a user 20 may utilize their enrolled smart device (handy) 18 to interactively receive information and control various smart appliances 58 within their home or the like. In operation in embodiments of the moment system 100, a user 20 may utilize their enrolled smart device (handy) 18 to create and read moments (10, 44) tagged to a physical location 16 (or locations) in their home. Such moments (10, 44) may interactively display operational information and the like. Additionally, such smart appliances 58 may track products and/or services consumed by the household (e.g., IN: shopping cart 42, refrigerator 60, pantry 62, cooking appliances 68; OUT: trash receptacle 64, laundry machines 66 and the like) so as to automatically prepare shopping lists 34, menus based upon recipes 38 preparable from existing contents in a refrigerator 60, pantry (cupboards) 62 contents, and/or other ingredients and then push and tag moments 10 at a preferred store 72 in the appropriate aisles 74 and in front of the desired products 76. A consumer electronics and appliance maker may, in accordance with the moment system 100, provide shopping cart moment readers 300 for temporary or permanent attachment to shopping carts 42 allowing a user 20 to enroll the shopping cart 42 as their enrolled smart device (handy) 18 such that a user 20 may more easily view and interact 40 with the moments 10 relevant to their shopping experience.

Such moments 10 may be interactive moments 44 containing for example, an updated shopping list 38 with picking directions, a coupon 36 associated with moment 44 location 16 (or a related product, e.g., necessary to complete a menu or the like). Such a shopping list 38 may be based upon the requirements of a course, a dish, menu, or menus, from and in accordance to an expression of a user 20 desired hierarchy (e.g., representative of a user selection, Maslows hierarchy of needs, choice modelling, discrete choice, or the like), the moment system 100, considering, e.g., one or more of user interest, palette, dietary requirements, available ingredients, substitute ingredients, time available, schedule, preparation time, diners, portion size, season, and weather. In operation a user 20 may utilize their enrolled smart device (handy) 18 to access moments 44 and collect relevant coupons for checkout (e.g., frictionless checkout or the like) wherein their purchases are automatically matched with the coupons 36 stored in the process of reading moments 10 within the store 72. A kiosk 318 or terminal 316 may automatically debit a user's 20 account on the system of the moment system 100 after first deducting from the purchase price of each item any coupon value 36. Additionally, the user's 20 account may receive any chit, award, or the like as designated by the relevant augmented estate holder interest (28, 1306).

Additionally, content 14 such as premium content 92 may be added to a watch list or the like moment 44 by the mail 80 perusal time and the like, network device 56 and/or television 70 based upon, e.g., user 20 schedule, recent interests, projects, previously consumed content, related newly available content, viewers, time of week, available time, and the like, and in accordance with the moment system 100 as selected from a hierarchy by a user 20, or augmented estate holder 28 (the user may be the estate holder 28). In operation a user 20 may utilize an enrolled smart device (handy) 18 to open a moment 44 tagged near an entertainment device such as a network device 56, television 70, radio, or the like. Such moments 44 are preferably tagged proximate to the entertainment device.

FIG. 47

Location-Based Services and (Position and Orientation Uncertainty)

$$u_c(y) = \sqrt{\sum_{i=1}^{n}[c_i u(x_i)]^2} = \left[\sum_{i=1}^{n}[c_i u(x_i)]^2\right]^{1/2}$$

$u_c(y)$=combined uncertainty
$c_i$=sensitivity coefficient
$u(x_i)$=standard uncertainty The combined uncertainty and expanded uncertainty 156 (FIG. 47) of moment files 10 with content 12 tagged to a location 16 or object 32 in accordance with embodiments of the present invention may be calculated according to the expression set forth directly above. Generally, in a location reporting system 114 (e.g., for example both position and orientation) the combined uncertainty of horizontal accuracy is the square root of the sum of the square roots of each uncertainty. Thus, for example, with a sensitivity coefficient of horizontal accuracy reported as the radius of 68% confidence (e.g., blue circle of uncertainty as reported by some location services), and where the recorder 152 had a reported five-meter (5 m) horizontal accuracy, and the reader had a reported ten-meter (10 m) accuracy, then the combined uncertainty would be approximately 16 m. In a system where both the recorder and reader 150 reported horizontal accuracy of one-meter the combined horizontal accuracy uncertainty would perhaps be as much as two meters and an area of accessibility 82 might be preferably set to—five meters. In other embodiments of the moment system 100, an enrolled user 20 might receive a visual clue or the like of the existence of an AR element (AR hyperlink) 12 outside the area of accessibility 82 which might be viewed by, e.g., moving closer to the tagged location 16, and/or locking onto a particular AR element (AR hyperlink) 12 (in one embodiment centering the moment on the display with the target) and then "clicking" (or the like) the AR element (AR hyperlink) 12. Additionally, in some embodiments some detail of the contents of a particular AR element (AR hyperlink) 12 may be revealed whenever a gesture or the like is utilized on an enrolled smart device 18 or the like (e.g., hovering over the moment's 12 AR hyperlink 84).

Various methods for minimizing location uncertainty (position and orientation) are taught by (e.g., U.S. Pat. No. 10,108,859) and may be utilized by the present invention. For example, resection (free stationing), as well as those methods described herein may be employed (such as those illustrated in FIGS. 4 & 9 and 111 ¶¶ [0077]-[0082]). Additionally, adaptation of the techniques described in U.S. Pat. No. 10,244,364 may be utilized (incorporated herein by reference). Likewise, spatial uncertainty is discussed and addressed in Wan N., et al., *Addressing location uncertainties in GPS-based activity monitoring: A methodological framework*. Trans GIS. 2017 August; 21(4):764-781. ePUB 2016 Sep. 19. PMID: 28943777; PMCID: PMC5606983; DOI: 10.1111/tgis.12231 (incorporated herein by reference).

Depending on the smart device 18 (handy) and available services, location services 24 uses a combination of cellular 116, other terrestrial devices 120 (e.g., Wi-Fi, Li-Fi, Bluetooth, UWB, various other tags 30), and space-based platforms such as GNSS (GPS) 114 to determine your location. When a smart device, such as an iPhone or the like, is not within a clear line of sight to GNSS satellites 114, your device can determine your location using crowd-sourced Wi-Fi5 and cell tower locations, iBeacons, and the like.

Like other handy (smart device 18) applications, embodiments of the moment system 100, can show your location on the screen, including maps (e.g., eSpatial, maptive, Apple Maps, GOOGLE Maps, and the like) indicate current (approximate) location using a marker (a blue marker in Apple Maps). If an accurate location cannot be determined precisely, a blue circle (in Apple Maps) also appears around the marker. The size of the circle shows how precisely the smart devices (smart device (handy) 18) location has been determined—the smaller the circle, the greater the precision.

In other embodiments of the moment system 100, a user 20 with an enrolled smart device 18, may operate a device 18 without location-based services available, installed, or turned OFF. In such an embodiment, the smart device 18 is not reporting a position, rather a user 20 operating such a device simply reports their position utilizing a map or the like to send a selected location via a cellular network 116 or the like. In such a "self-reported positioning" embodiment a user may, for example, pan around a map displayed on an embodiment of the moment system 100 and subsequently mark their location ("check-in"). Many other local positioning systems and indoor positioning systems are available for indoor use (GPS and GSM are imprecise indoors), so other methods are preferred such as co-pilot beacons for CDMA networks, Bluetooth, UWB, RFID, UWB, and Wi-Fi.

In other embodiments of the moment system 100, near LBS (NLBS) utilizing, for example, local-range technologies such as Bluetooth low energy, WLAN, infrared and/or RFID/Near field communication technologies, may be leveraged to provide location services 24. Such NLBS devices are especially suitable for use inside closed premises, and restricted or regional areas. Also available are operator-based and GPS-independent location service utilizing the deep level telecoms network (SS7). This solution enables accurate and quick determination of geographical coordinates for smart devices and the like 18 (smart devices) that do not have GNSS 114.

In other embodiments of the moment system 100, location services may be provided utilizing one or more of the following: (1) Bluetooth mesh networking-specification providing a mesh networking variant to Bluetooth low energy (BLE) with increased number of nodes and standardized application layer (Models); (2) Light-Fidelity (Li-Fi)-wireless communication technology similar to the Wi-Fi standard, but using visible light communication for increased bandwidth; (3) Near-field communication (NFC)-communication protocols enabling two electronic devices to communicate within a 4 cm range; (4) Radio-frequency identification (RFID)-technology using electromagnetic fields to read data stored in tags embedded in other items; (4) Wi-Fi for local area networking based on the IEEE 802.11 standard, where devices may communicate through a shared access point or directly between individual devices; (5) ZigBee communication protocols for personal area networking based on the IEEE 802.15.4 standard, providing low power consumption, low data rate, low cost, and high throughput; (6) Z-Wave wireless communications protocol used primarily for home automation and security applications; (7) LTE-Advanced High-speed communication specification for mobile networks; (8) Low-power wide-area networking (LPWAN) wireless networks designed to allow long-range communication at a low data rate, reducing power and cost for transmission (LoRaWan, Sigfox, NB-IoT, Weightless, and RPMA); (9) Very small aperture terminal (VSAT) satellite communication technology using small dish antennas for narrowband and broadband data; (10) Electronically Scanned Arrays (ESA); and the Internet of Things (IoT) (56, FIG. 46), see also generally FIG. 47.

FIG. 48

Drive-Through Restaurants

Figure 48:
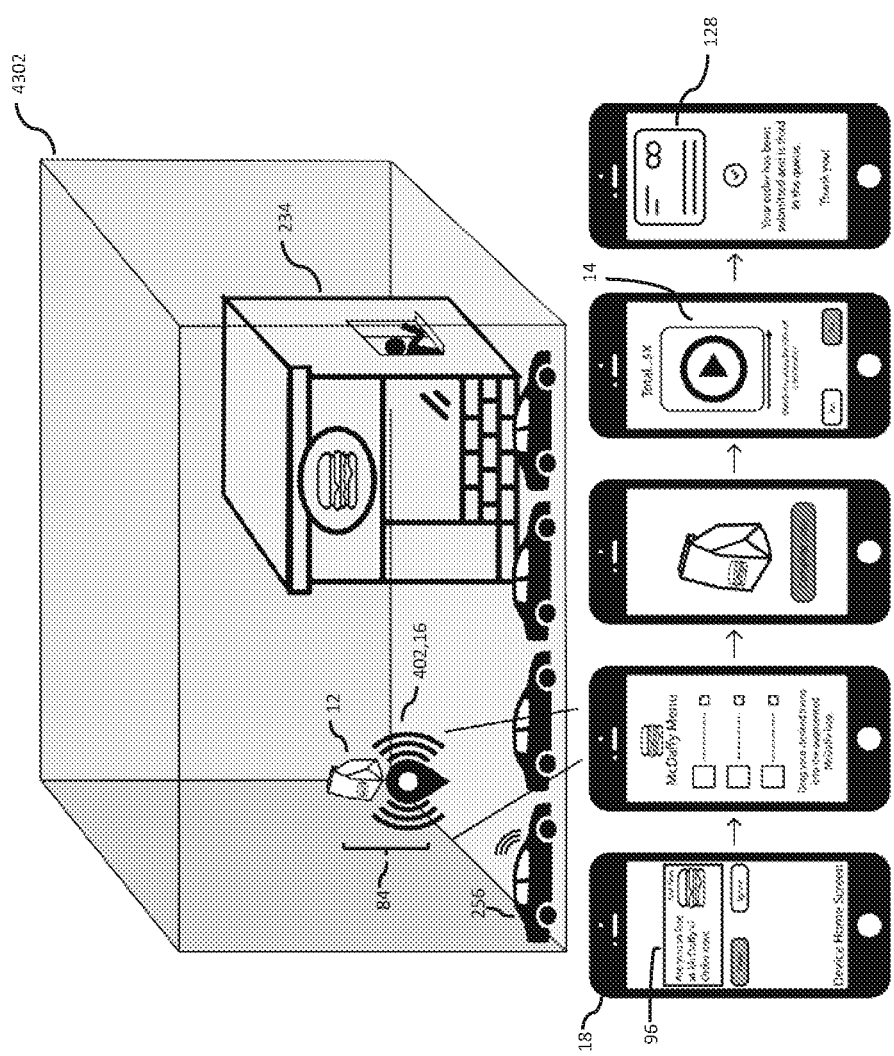
FIG. 48 is an environmental diagram of an augmented reality system used at a drive-through restaurant.
Figure 49:
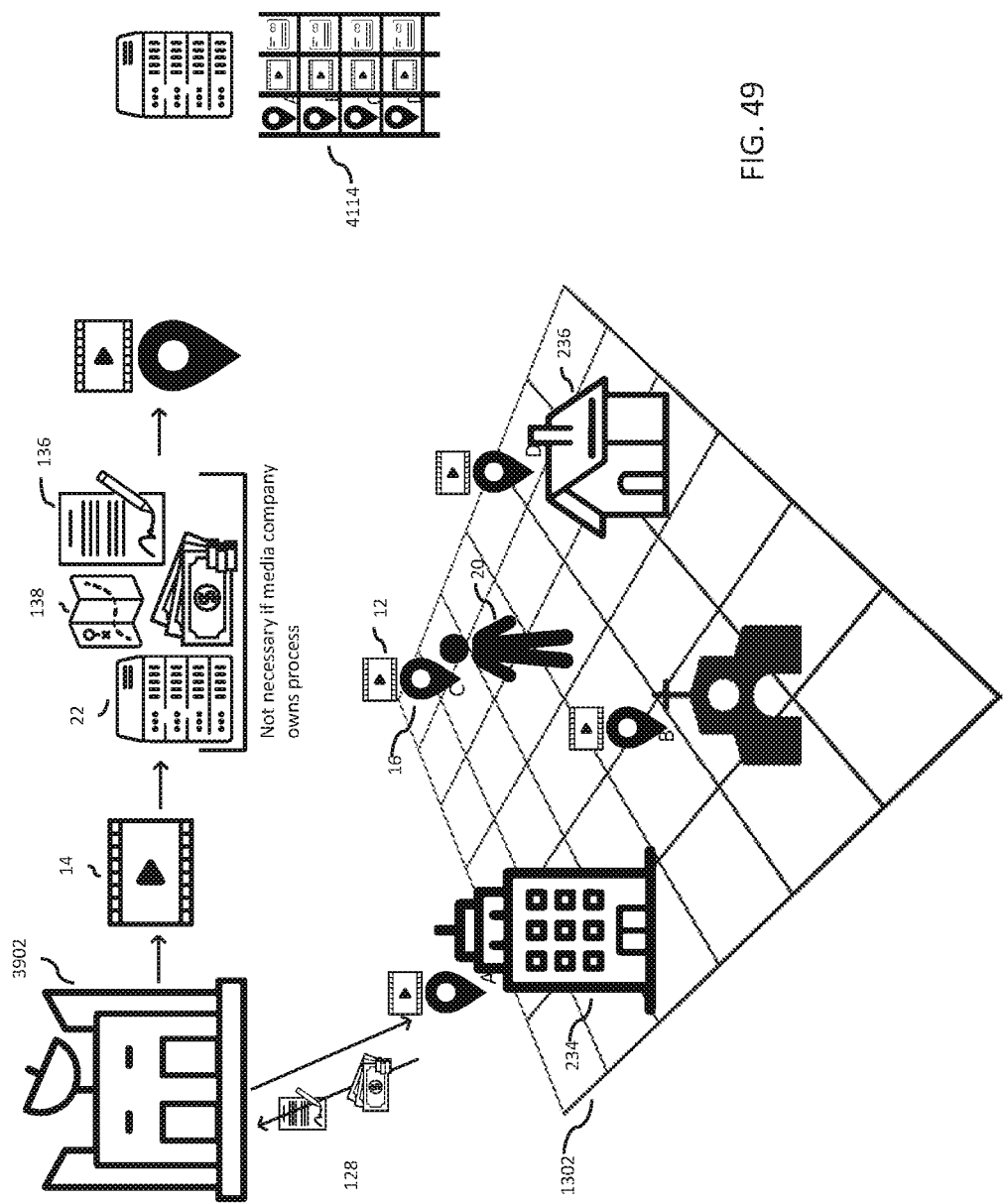
FIG. 49 is an environmental diagram of an augmented reality system used for media outlet content distribution.
Figure 50:
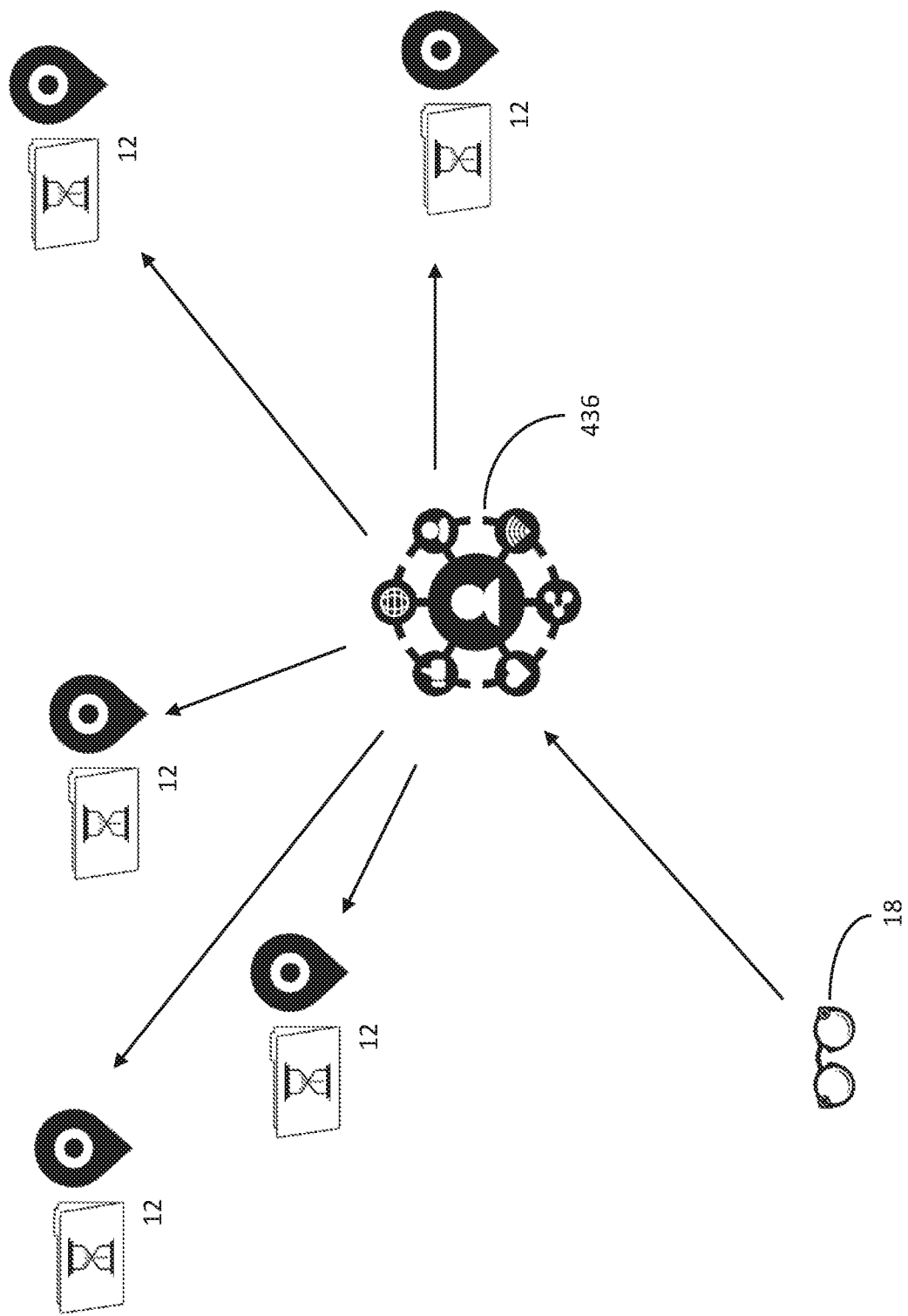
FIG. 50)
Figure 51:
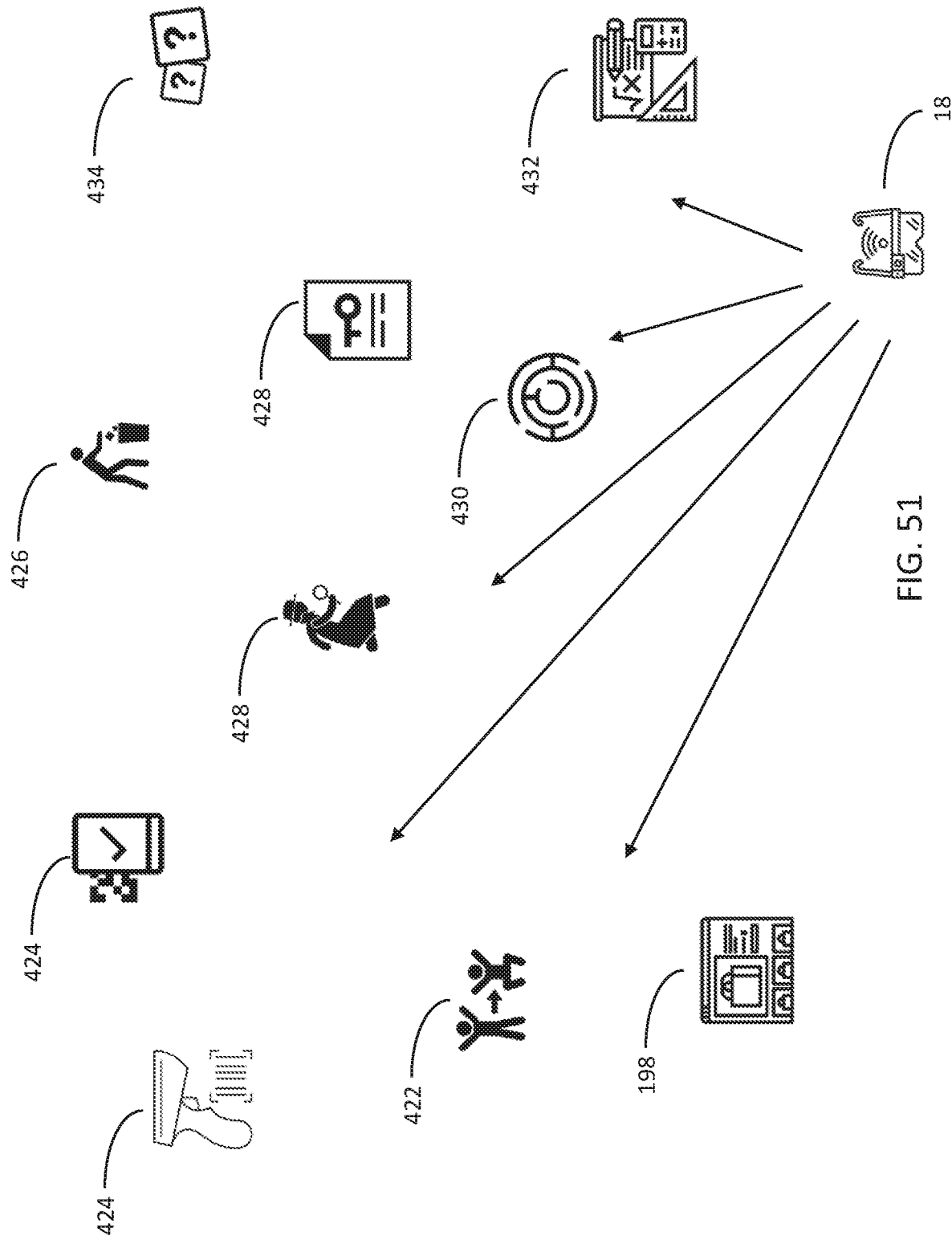
FIG. 51 is an environmental diagram of an augmented reality system utilized on a smart device.
Figure 52:
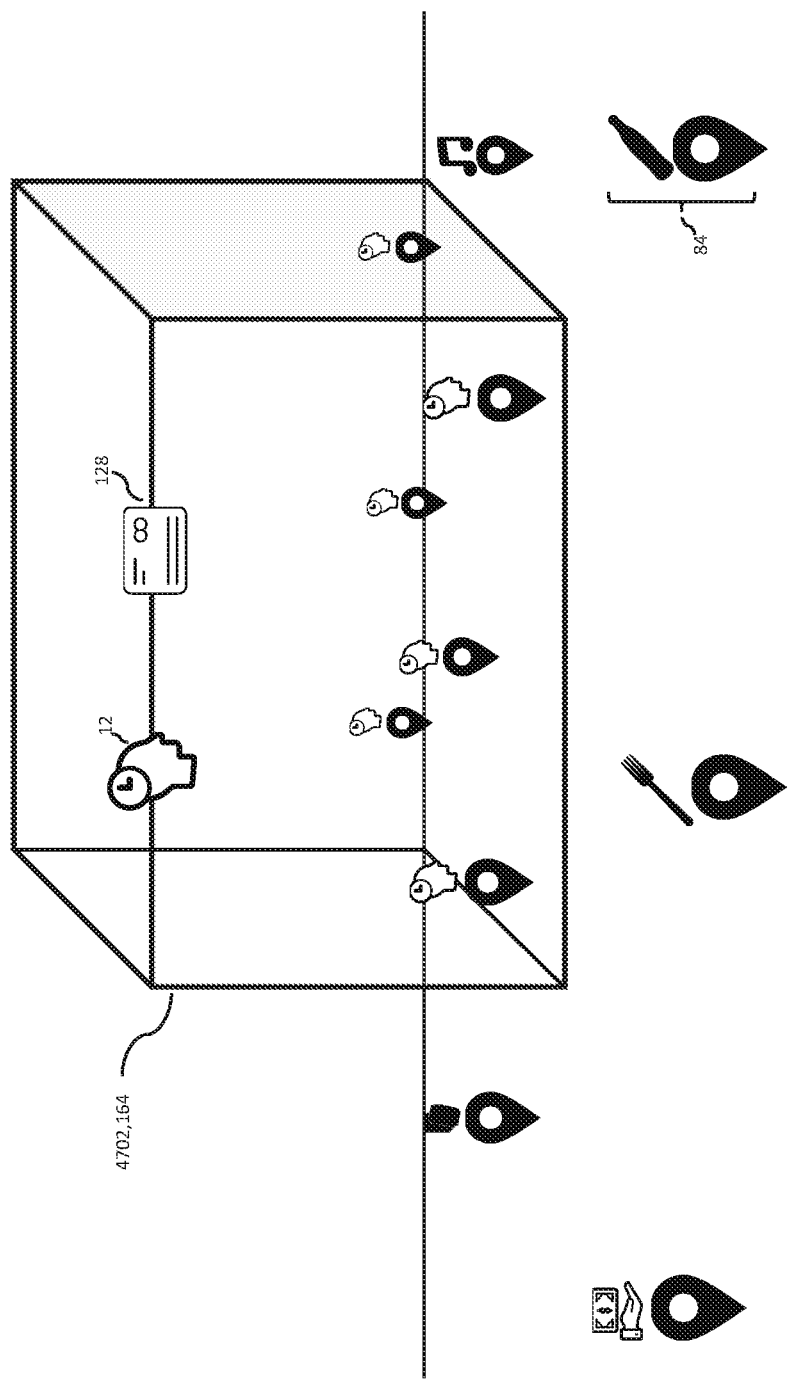
FIG. 52 is an environmental diagram of an augmented reality system with a geofenced boundary.

As illustrated in FIG. 48, an embodiment of the present disclosure includes a multilocation restaurant which may sell, lease, rent, loan, auction, and trade the augmented property 132, e.g., in and outside of each location. In operation, the present invention provides an additional revenue platform for providing additional services to the various constituents of each location, e.g., customers, community interests, vendors, and suppliers. The franchise benefits by allowing augmented content on the property from the revenue generated by hypothecating the augmented property 132 and the development of minable consumer data made available by tracking moment usage and the like. Additionally, each location may enjoy additional revenue from up-sales to customers (e.g., 25% off milkshake coupon) and revenue from the sale of anonymized data to advertisers. Restaurant locations may attract new customers by placing coupons or the like in moments at popular public and private locations (zoo, theater, stadium, shopping mall, parks, and the like). Users may benefit from more accurate order placement and time in a drive-through, and check-out lines by creating an order and payment moment tagged and placed in a designated order location. Customers may also collect moments for points 130 and the like to be redeemed at other locations and retail venues and the like.

Community members may leave public service moments 10 advertising upcoming events, requests, and information. Such community moments may also contain advertising for which non-profits might receive some compensation for click-throughs of community moments containing an advertiser's content (digital onscreen graphic, short video spot, or the like). Customer community members may leave comments and suggestions. All moments may be filterable and recorded and/or read for relevant consumption. Additionally, moments of interest are selectably visible where relevant to a particular enrolled user.

In embodiments of the invention advertisers are able to place moment advertisements and advertisement is moments, at select strategically placed properties (e.g., in 2012, 68,000,000 individual diners visited McDonalds® 36,000 locations). Advertising metrics may be collected anonymously and mined for effectiveness and data may be reported real-time in a dashboard moment 1836 of an embodiment of the moment system 100.

FIG. 49

Media Outlets and Content Creators/Distributors

A media company, for example, a newspaper, a radio station, an advertising agency, a television station, and/or streaming service, may utilize embodiments of the present invention. For example, such a media company may provide to its customers, as a revenue source, the ability to send exclusive relevant content to registered locations (residences, waiting rooms, employee break rooms, airport terminal gate areas) under an augmented estate system of the present invention. If preferred, the media (moments) may only be consumed by enrolled users located in proximity to the tagged location or object.

In operation, a media company (or a media company customer) may contract to send content relevant to enrolled users tagged to augmented estate locations controlled by the media company, media company customer, or available at auction or the like. Such content may be utilized to increase market share, customer demographic makeup, up-sell, awareness, or measure customer engagement. As those skilled in the art of marketing will recognize, marketing success and guidance metrics may be measured, for example: overall traffic, channel-specific traffic, conversions, bounce rate, search trends, new versus returning visitor ratio, queries, user demographics, and brand sentiment.

Additionally, a media company might associate an enrolled user relevant advertisement tagged in accordance with an embodiment of the present invention to a standard media platform advertisement, e.g., kiosk, endcap, flyer, television, a computer, a smart device, billboard, magazine, newspaper, or the like. In such an embodiment an enrolled user might be notified of tagged content (a moment or moments) relevant to the standard media platform advertisement and the enrolled user. For example, an interactive AR element or the like, with a menu for selecting options, may assist an enrolled user in making a series of selections, ordering, utilizing a coupon, exchanging chits and/or awards, or the like. Likewise, the interactive AR element may be an advertisement or message, where after the advertisement ends, a notification is provided on the enrolled user's handy (smart device 18) which may report, for example, "Your experience is ending, and you earned 2 (brand) points. Please continue enjoying (name of show)."

Furthermore, exclusive enrolled user relevant content may be utilized or created for specific platforms, for specific users, and the like. In order for an area to not be too crowded with relevant content containing AR elements, a media company or augmented estate holder may limit the number and type of moments within the estate or within a portion of an estate by auction result, available bandwidth, number and type of users, time, location, type, interest, or the like.

In yet still other media company embodiments of the present invention, live content, crowd sourced gaming based on moments of the present invention. For example, a host asks questions, and interactive moments shows what percentage of people answered correctly (made it to the next tagged location, or the like), and how many players, for example, have been eliminated.

Moments containing, e.g., of replays, athletic interviews, statistics, memorials, and the like, of sporting events, tagged at sporting venues and the like, may also be provided according to at least one aspect of an embodiment of the invention. Embodiments of the invention may also provide a subscription service to send a moment tagged to a user selected location containing selected sports highlights relevant to an enrolled user.

In accordance with other embodiments of the present invention, broadcasters and other media industry members may send interactive moments to viewers for awarding enrolled users whom have successfully demonstrated the ability to answer trivia or quiz questions related to broadcast programming and the like.

FIG. 50

Camera Based Social Media

Embodiments of the present invention may be utilized to create location based interactive moments tied to an augmented property 132 system capable of notifying enrolled users when they are proximate to relevant interactive moments. In operation, an enrolled user may utilize their handy to view relevant location-based interactions of other enrolled users. As other enrolled users post content in moments tagged to a particular location or object, other enrolled users subscribing to a particular location or object (or subscribed to an enrolled user posting moments), may, depending on access level set and managed by the augmented property location owner 124, and subscribed to by the enrolled user, view relevant moments individually, batch, stream or the like. Likewise, moments 10 may be recorded, saved, viewed, or accessed chronologically as a story, or moments may be stitched together according to a category, user, interest, relationship or the like. Thus, in at least some embodiments of the present invention enrolled users can vicariously experience locations from a distance by social media platform 436.

In other embodiments camera-based media can provide advertisers with venue based relevant content associated advertisements and the like via the augmented property 132 system of the present invention. User utilization data may be leveraged to enhance user engagement and experience providing additional revenue and retail usage of moments.

FIG. 51

Smart Device and Mobile Providers

In an embodiment of the moment system 100, a coupon reader may be utilized on a smart device (handy) 18 to store coupons for redemption at a participating venue. As an enrolled user 20 reads 150 moments 10, or records 152 moments 10, certain moments 10 may contain, in addition to other content 14 or as a moment's primary content, redeemable items may be exchanged at kiosks, store checkout terminals, waypoints, with or without friction. Coupon 36, chits, points 130, or redeemable content may be position and redeemed by augmented estate holders according to an embodiment of an augmented property 132 system operated in accordance with the present invention.

Likewise, an enrolled smart device (handy) 18 may be utilized in accordance with an embodiment of the present invention to locate redeemable content via intellectual or athletic exercises scored and monitored via moment placement. For example, a clue 428, riddle 430, math question 432, trivia question 434, product knowledge question 198, or a timed physical exercise 422 between one moment and another (bottom of the trail to top of the trail, lap around the pond, or from a moment at the bottom of the stairwell to a moment at the top floor.

In yet another embodiment of the present system 100, an enrolled user may utilize an enrolled smart device (handy) 18 to create a moment 10 at a secure, difficult to reach, obscure, or remote location to store items in their trash folder (empty their trash folder into a moment) or archive special files and folders. In such an embodiment, such archived moments and the like are stored to a server 108.

In still yet other embodiments an enrolled smart device (handy) 18 may be utilized in accordance with the present invention to track demographic, psychographic, content related to a location. A group of enrolled transitioning user sentiments, feelings, and the like associated with individual moments over time may be tracked and displayed in a dashboard of the invention 100 or the like. The system 100 may be utilized to inform enrolled members and the community of interesting content, ideas, viewpoints, social problems associated with or relevant to a particular location. Performance and ticket information may be made available as an interactive moment tagged to a performance venue. Likewise, the sleek famous exterior and interior of various retail outlets may be virtually viewed and interacted with via an AR element of a company logo tagged to a competitor's location (an enrolled user's then position). Clicking on the moment logo (AR element) navigably displaying the contents and selectable goods and services in stock and available for testing, examining, studying additional details and options. In a preferred embodiment such goods and services may be frictionlessly accessed and purchased.

FIG. 52

Video Sharing Platforms

Video sharing services are known in the art of social media. Such services allow users to create and share short video, often paired with song clips. Such services allow a community or sponsor to set a challenge prompt, and users submit videos, which are voted on by other users. Coins are awarded to participants and users can tip creators with virtual goods. These services, although notorious for engagement and irksome push notifications, are extremely popular with Generation Z.

In embodiments of the moment system 100 for cooperatively adding features to video sharing services, video sharing service users can leave video content 14 and the like tagged to locations 16 in moments 10 relevantly filtered for viewing and consumption by other users with enrolled smart device (handy) 18 of the moment system 100.

Users of embodiments of the present invention may leave moments 10 as part of other video sharing, non-AR based sharing platforms. Additionally, in other related embodiments of the moment system 100, brand sponsorship associated with a challenge may take advantage of the augmented property 132 features of the moment system 100. Other users can vote on (rank) various challenge submissions, and such challenges may be location 16 centric.

Advertisers can leave coins associated with their brands in individual moments 10 in collaboration with various other augmented property holders 124. When an enrolled user 20 approaches the area of accessibility 82 of an individual moment 10 (or bundle of moments 10) the user may filterably 106 select to receive notification of the availability and viewability of relevant content 14 nearby marked by a clickable AR element 158. User's 20 may collect redeemable items 130 (points or the like). These items 130 may be collected to be redeemed, bought/sold/traded on a marketplace (further uniting and connecting users), or given as tips to their favorite creators (during live video streams).

In another embodiment creators with enhanced status (e.g., popularity, point holdings, and the like) may gain access to selected augmented properties 132 according to an agreement 136 with terms provided by augmented property holders 124. Such premium locations (augmented properties) may include those with higher foot traffic and dwelling times. It is envisioned that the premium locations may be bounded by a geofence boundary 164 defined by a 3D global location grid.

In an operation of one embodiment, a user 20 may be notified 96 of a challenge. The user 20 may then select an enrolled version of the moment system 100 on their smart device (handy) 18 to open the challenge AR element (AR hyperlink) 12 and create media 14 according to the set challenge. The present invention may allow the user to place their created moment 10 in their current location 16, or at a number of locations randomly (or e.g., via selection) via a payment 160 or exchange of redeemable awards 130. The more locations 16 contracted the more opportunities the AR element (AR hyperlink) 12 recorder's content will be tagged and subsequently viewed.

Additionally, in accordance with other aspects of the invention 100, a user 20 may utilize, for example, an interactive menu 40 to access an AR dashboard 1836 marked by an AR element to set a filter 106 to receive notifications only of relevant content near their location 16.

The moment system 100 may also be utilized in another embodiment to place excerpts of premium content 92 in high traffic or increased dwelling time areas, where the premium content may include for example, song clips of new, popular, or trending songs. Augmented estate holders 124 may receive payments or awards based upon click-throughs, purchasers, and the like according to an agreement 136.

Additionally, depending on user's 20 location services 16 settings, the user 20 may receive AR element (AR hyperlink) 12 notifications, e.g., "You just passed a _____ Pip™ [(AR element (AR hyperlink) 12)], want to go back?" This could also be included in a paid version, allowing a user 20 to collect coupons and points frictionlessly.

FIG. 53

Entertainment Venue Operators

Turning now to FIG. 53, some operations of an embodiment of the moment system 100 are illustrated in and associated with entertainment venues. Some entertainment venue operators operate multiple venues, for example in 2018 Disney had 157 million visitors to its parks. Moments 10 may be placed in and around these venues containing coupons 36; useful tips (texts 90) and the like providing information about a location 16, future events; interactive control moments 44 with interactive menus 40 for making purchases or reservations; transferring funds 1508; redeeming awards 1710, 3602, and the like.

Users 20 with enrolled devices 18 queued at an entertainment venue such as an amusement park, stadium, concert hall, and the like may play interactive AR element (AR hyperlink) 12 based games, create and leave content 10, make plans, send location-based messages, create memorials, and the like with embodiments of the moment system 100. An administrator of the augmented estate corresponding to the entertainment venue may choose to section off a particular path within their property (e.g., a queue), whether to charge a fee for or limit the type of memory file placement. In the above example, the administrator of the augmented estate has decided to limit the type of memory files within the three-dimensional path. A user is prompted by a location-based notification or otherwise to place a specific kind of memory file within the boundary of the three-dimensional path. Attempts to place a memory file type not matching the instruction of the 3D field will not be executed.

Advertisers may contract 136 with augmented estate holders 124 (in collaboration with or without venue operators) to place moments 10 in and around the venue. These moments 10 may be designated by media containing clickable AR logos 84 (AR emoji, avatar, icons, branded logos 122, products, and the like) relevant to a user 20 and/or location 16. In operation, venue operators may collaborate with sponsors (e.g., drink, snack, movie), advertising partners (e.g., hotels, restaurants, transportation, and other venue operators) to provide product and service knowledge, availability, cross-appeals, and discounts to enrolled users 20. A venue operator (or augmented property holder 124) may utilize a terminal 202 (or smart device (handy) 18 (FIGS. 1A and 1B) to access a server 108 of an embodiment of the present system 100 to leave moments 10 relevant to specific users, sets of users having identifiable filtered traits, and the like via a filter 106 over a network 56 connected to the enrolled smart devices (smart device (handy) 18).

Likewise, the system 100 may allow offers in moments 10 from a business providing goods or services to be strategically and relevantly placed at a location of a competitor's tangible place of business. Additionally, the system 100 may provide in other embodiments the ability for an augmented property holder 124 to provide moments 10 with advertisements 98 placed in non-competing businesses to attract customers symbiotically (commensalism, parasitism, mutualism). A system 100 of the present invention may measure and report impressions and click-throughs via a redemption process or the like.

Enrolled users 20 of embodiments of the moment system 100 may also receive promotions (offers/advertisements 98) providing the opportunity to tag 30 moments 10 containing media 14 memorializing a visit or previous visit to the entertainment venue, i.e., ride photos, recordings, family photos, and the like. The entertainment venue operator may designate special areas (LEAVE A LEGACY®, WALK AROUND THE WORLD™) for permanent or semi-permanent placement of special moments 10 in these locations 16. An enrolled user's 20 smart device 18 may be set to only see AR elements marking such user 20 created moments 10 or related to a user moment (same time period, same city, relatives, friends, and the like).

In yet other embodiments available to entertainment venue operators of the moment system 100, exclusive AR content may be pushed to enrolled users. Such exclusive AR content may be marked (tagged 30 to a location 16) by an AR hyperlink of a famous character 84. Such embodiments may be utilized to increase user traffic in otherwise low traffic venue areas. Special content as moments 10 containing media 14 relevant to a user's stay may be tagged to a user's hotel room for arrival. Such hotel room arrival moments 10 may contain park passes, coupons, awards, and the like.

FIG. 54

Multi-Layered AR Location-Based Media Platform

Figure 54:
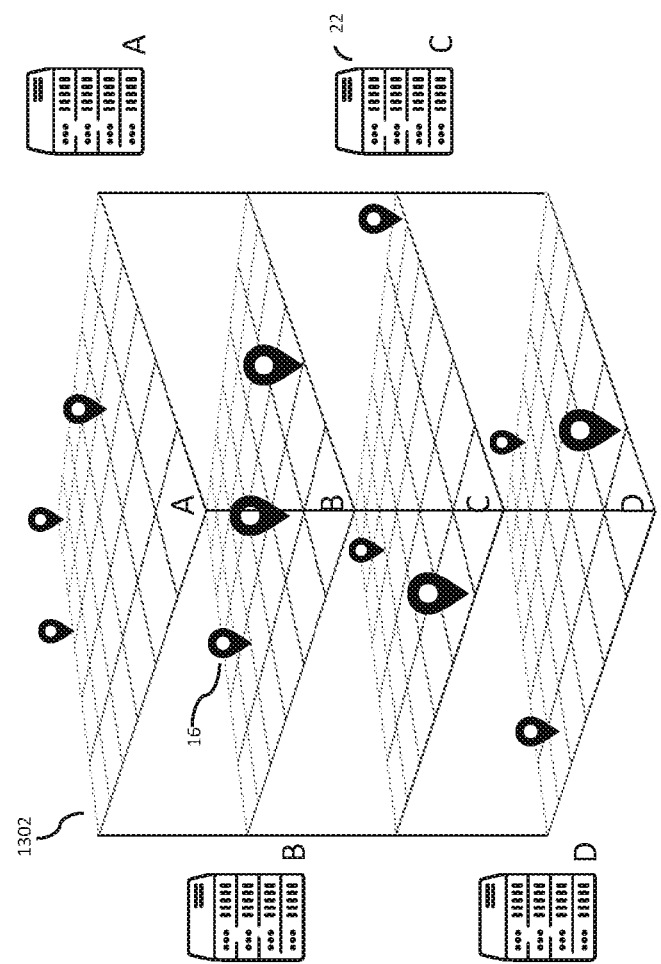
FIG. 54 is an environmental diagram of a multilayered media platform.

Turning now to FIG. 54, a multi-layered AR location-based media platform embodiment 1302 of the present invention 100 is illustrated. Independent servers 22 (A, B, C, D . . . (n)) may each operate a separate augmented estate system of an embodiment of the present invention 100. In such an embodiment 1302 moments 10 in one layer are not visible to or accessible in or between layers (A, B, C, D . . . (n)). An estate holder 124 may hold an interest in one or more layers.

VI. General Elements of Operation

Embodiments of the moment system 100 utilized various methods, apparatus, systems, devices, components, e.g., smart devices (smart devices and the like 18); networks (both wired and wireless), satellite or terrestrial, near and far field; location services; property ownership and transfer; display augmentation; cloud-based services; filtering techniques; notification services; and other known elements in operations of embodiments of the present moment system 100.

Augmented Reality (Mixed Reality)

Augmented reality (mixed-media reality) generally utilizes a camera to stream real-world footage to a display and graphics algorithm. Registration provides a computer a reference on where to place virtual objects. In some implementations high-contrast icons are referenced for registration, but more commonly location and position services (GPS, accelerometers, orientation sensors, and barometric sensors) along with landmarks like street lines, buildings, and the skyline are used to help with registration.

Computer vision interprets output and determines how and where to integrate virtual objects. For placement of mixed-media some AR applications use a simple in-field physical registration mark. More sophisticated systems use advanced algorithms can do shadows, occlusion (things in front of the virtual items), and kinematics (physics and interaction with real-world objects). In operation, the display streams both the real-world footage with any registered AR content thus allowing a smart device 18 to be a "porthole" or "magic mirror" into the AR world. In VR the real world ("meatspace") is replaced with digitally created imagery.

Simultaneous Localization and Mapping (SLAM) utilizes an algorithm to identify key points in a camera frame to calculate a spatial relationship between a smart device (smart device (handy) 18) and multiple key points. For example, in using AR development tools like Google ARCore, Apple ARKit or Microsoft Mixed Reality, the smart device 18 must first learn more about the local environment. It does this with by processing data from the camera and other sensors like the accelerometer and the gyroscope. In SLAM the system then: (1) builds a map of the environment, or the like; (2) locates the device within that environment; and (3) if location services 16 are available (GNSS 114 and beacons 30 or the like) to triangulate a location (and orientation). In operation, all points have a spatial relationship with each of their neighbors. As a result, SLAM must work with a probability distribution. For some points, a higher precision may be available. For others, the uncertainty may be large. Generally, filters (algorithms) are utilized to calculate the positions based on uncertainties (Extended Kalman Filter, Maximum a Posteriori (MAP) estimation, or Bundle Adjustment (BA)) are utilized. Since the relationships between the points constantly updated as positions and position information are received, alignment (registration) is challenging. As disclosed in the instant invention 100, aligning new measurements with earlier measurements helps to maintain registration of virtual objects (moments 10) and the real-world.

A SLAM system consists essentially of four parts: (1) Sensor data: on mobile devices, this usually includes a camera, accelerometer and gyroscope; (2) Front-End: feature extraction and alignment with, e.g., landmarks (map points, 3D position); (3) Long-term association reduces drift by recognizing places that have been encountered before (loop closure); and (4) Back-End: establishment of frame relationships, i.e., localizing the camera (pose model), and geometrical reconstruction. SLAM is well known to those working in augmented reality. Various software and program tools are also available for those seeking a direct path to deploying augmented reality elements mapped on a user display. See, e.g., Cadena, C., et al., *Past, Present, and Future of Simultaneous Localization and Mapping: Toward the Robust-Perception Age*, IEEE TRANSACTIONS ON ROBOTICS, VOL. 32, NO. 6, DECEMBER 2016 1309; and Thrun, S., et al., *Probabilistic Robotics (Intelligent Robotics and Autonomous Agents series)*. 1$^{st}$ Ed. The MIT Press 2005 ISBN-13: 978-0262201629, ISBN-10: 0262201623 (both the paper and book are incorporated by reference herein in their entirety).

Various SLAM implementations are familiar to those in the art, for example: (1) ORB-SLAM Algorithm; (2) Google ARCore; (3) Microsoft AR; (4) Metaio and FlyBy (Apple); and (5) Unity AR Foundation and related Unity SDKs. Other SLAM techniques are also known and may be adopted for operation in various embodiments of the moment system 100, for example: EKF SLAM, FastSLAM, L-SLAM, (Matlab code), GraphSLAM, Occupancy Grid SLAM, DP-SLAM, Parallel Tracking and Mapping (PTAM), LSD-SLAM (available as open-source), S-PTAM (available as open-source), ORB-SLAM[6] (available as open-source), ORB-SLAM2 (available as open-source), OrthoSLAM, MonoSLAM, CoSLAM, SeqSlam, iSAM (Incremental Smoothing and Mapping), CT-SLAM (Continuous Time), and RGB-D SLAM.

Filters

Collaborative filtering (CF) is a technique used by recommender systems to limit offering to those relevant to a particular user. In collaborative filtering automatic predictions (filtering) are made about the interests of a user by collecting preferences or taste information from a user and many users (collaborated matches). The underlying assumption of the collaborative filtering approach is that if a person A has the same opinion as a person B on an issue, A is more likely to have B's opinion on a different issue than that of a randomly chosen person. For example, a collaborative filtering recommendation system for media 14 ranks media a user 20 might like (given a partial list of that user's tastes, i.e., likes or dislikes). Although these predictions are specific to a particular user, they are based on use information derived from many users.

Collaborative filtering is one of the techniques used for dealing with the problem associated with making interest recommendation from a large pool of available media. Collaborative filtering encompasses techniques for matching people with similar interests and making recommendations on the basis of cross-referencing similarities found between users. The premise is based upon the observation that the best recommendation often comes from someone with similar tastes.

Collaborative filtering algorithms often require (1) active user participation; (2) a method of representing user interests; and (3) an algorithm for creating a hierarchy of similar interests. In operation a user expresses preferences by rating media in a hierarchy. These ratings may then be viewed as an approximate representation of interests. The filter then matches a user's ratings against other users' and identifies and then matches similarities.

Various filtering techniques are available and described in the literature. For example, memory-based, model-based, hybrids, and context aware methodologies. The following texts are incorporated herein in their entirety (nonessential subject matter MPEP 608.01(p), 37 CFR 1.57(e)): Aggarwal, C., *Recommender Systems: The Textbook*, IBM T. J. Watson Research Center Yorktown Heights, NY, USA, Springer International Publishing Switzerland, 2016. See most notably, i.e., Chapters 4, 5, 6, 9, and 11; See, also e.g., Liu, B., *Web Data Mining: Exploring Hyperlinks, Contents, and Usage Data*, $2^{nd}$ Ed., Springer 2011; and Khan, G. F., *Social Media Analytics, CreateSpace*, Seattle 2018, ISBN: 1977543979 (incorporated herein by reference in their entirety).

Other filtering methods may also be utilized, for example, those described in U.S. Pat. No. 5,030,948 (incorporated herein in its entirety) for Multiple Characteristic Sensitive Addressing Schema for a Multiple Receiver Data Processing Network. In operation in an embodiment of the moment system 100, location-based services 24 may be utilized to (upon user 20 selection and approval) determine and or predict a user's 20 location 16; and using a filter 106 (addressing schema similar to or of the type described in U.S. Pat. No. 5,030,948, Rush), a server 22 may inform a user 20 (based upon user trait, interest, and/or characteristic selection), with notifications 96 when a user 20 is in (or is expected to be in) or near the area of accessibility 82 of a relevant AR element (AR hyperlink) 12 (marked to a location 16 by an AR emoji, avatar hyperlink 84) viewable by an enrolled smart device (handy) 18.

Auctions

In some embodiments of the moment system 100 for hypothecating control of augmented property 132, bidders 142 may by agreement enter into an auction system 126 of the present invention with other augmented property holder 124 or others desiring to obtain ownership rights in augmented property 134 through a deed or the like. In some embodiments of an auction system 126 of the moment system 100, a reverse auction may be utilized. In a reverse auction the traditional roles of buyer and seller are reversed. Thus, there is one buyer and many potential sellers. Unlike an ordinary auction, generally known as a "forward auction" buyers compete to obtain goods or services by offering increasingly higher prices. In contrast, in a reverse auction, the sellers compete to obtain business from the buyer and prices typically decrease as sellers underbid each other. Using an augmented property map 138 bidders and sellers may determine boundaries 144, ownership interests, e.g., type of ownership/control, limitations as to time and effect, and the like in accordance with a predetermined agreement 136.

A unique bid auction may also be utilized wherein each bid is kept confidential and one clear winner (or set of bidders) is defined after the auction finishes. Procurement auctions, e-auction, sourcing events, e-sourcing or eRA, eRFP, e-RFO, e-procurement, B2B auctions may also be utilized where advertising campaigns require large or small undirected or directed control 134 of a group of augmented properties 132.

Other types of auctions, sometimes referred to as "consumer auctions" utilize non-traditional sales processes having some characteristics with auctions and are currently a preferred form of auction 126 for use in at least one embodiment of the moment system 100. These auctions are generally held over the Internet (online). Online auctions come in many different formats, but most popularly they are ascending English auctions, descending Dutch auctions, first-price sealed-bid, Vickrey auctions, or sometimes even a combination of multiple auctions, taking elements of one and forging them with another. Auctions 126 of this type are currently preferred as they remove the physical limitations of traditional auctions such as reachability, geography, presence, time, space, and a small target audience. Online auctions include business-to-business (B2B), business-to-consumer (B2C), and consumer-to-consumer (C2C) auctions.

Virtual Property

The moment system 100 for providing tagged to location relevant media 14 to a location 16 and accessible and marked by a clickable AR element (icon or the like 158) operates in and is associated with a virtual economy (or sometimes synthetic economy) of augmented property 132 and augmented estates 28, held by augmented property holders 124 according to a property ownership schema 136 based upon an agreement 136 in a tangible physical space augmented boundary 144 system 138. In operation, unlike the virtual economies in MUDs (Multi-User Dimension) and massively multi-player online role-playing games (MMORPGs). The augmented property of the present invention, although virtual, is based upon real-world elements (tangible property), e.g., streets, facilities, buildings, spaces, roads, airspace, and the like.

The total land surface area of Earth is about 57,308,738 square miles, of which about 33% is desert and about 24% is mountainous. Subtracting this uninhabitable 57% (32,665,981 miles$^2$) from the total land area leaves 24,642,757 square miles or ~15.77 billion acres of habitable land. Embodiments of the moment system 100 allow for this property to be hypothecated and utilized in a socially beneficial manner.

Notifications

In various embodiments of the moment system 100, users 20 with enrolled devices 18, may receive notifications 96 of nearby relevant content (media 14). Such notifications may be haptic based, aural, or visual based. In a currently preferred embodiment of the moment system 100 of the moment system, push notifications may be utilized associated with or without a brief arrival indication (haptic based, aural, or visual based). Generally, push notifications are small messages sent to specific users 20 or a group of users based upon some filter protocol 106 (e.g., collaborative or otherwise), sent from and are sent to a server 22 over a communication network (116, 56, 118, 120) based at least partially on a user's 20 location 16 as determined by location-based services 24. Push technology, or server push, is a style of Internet-based communication where the request for a given transaction is initiated by the publisher or central server. It is contrasted with pull/get, where the request for the transmission of information is initiated by the receiver or client.

Push services are often based on information preferences expressed in advance by augmented property estates 28. This is generally referred to as a publish/subscribe model. A user 20 "subscribes" to various media categories and the like (FIG. 2A), for example information "channels" provided by a server 22; whenever new content (media 16) moments of interest as marked and tagged to a location or object in a user 20 clickable (hyperlinked) AR element on, e.g., a channel, and a server 108 pushes that information out to the client.

Synchronous conferencing and instant messaging are other examples of push services available to embodiments of the moment system 100. Chat messages and sometimes files may be pushed as location 16 based moments 10 to a user location 16 or expected user location as soon as relevantly received by the moment system of the moment system 100. In operation of embodiments of the moment system 100, a user 20 with an enrolled smart device 18, may allowing information about their location 16 to be stored. Over time a user's 20 location may be predicted according to various methods, for example: Continuous Time Series Markov Model (CTS-MM); Adaboost-Markov Models; Geographic-Temporal-Semantic-Based Location Prediction (GTS-LP); and Poisson Regression Analysis. The system 100, may push moments 10 to an expected user 20 current or predicted location 16 where the moment 10 contains relevant to the user 20 media 14.

Augmented Reality Hyperlinks

A hyperlink is a reference to data a user may follow by, e.g., clicking or tapping. Generally, a hyperlink points to a whole document or to a specific element within a document. Hypertext is text with hyperlinks. The moment system 100 proposed the AR hyperlink as an interactive AR element allowing an enrolled user 20 to access content 14 via an enrolled smart device (handy) 18 (U.S. Provisional Patent Application 62/352,433 filed Jun. 20, 2016).

The document containing a hyperlink is known as its source document. For example, in an online reference work such as WIKIPEDIA, or GOOGLE, many words and terms in the text are hyperlinked to definitions of those terms. Hyperlinks are often used to implement reference mechanisms such as tables of contents, footnotes, bibliographies, indexes, letters and glossaries. In some embodiments of the AR hyperlinks 12 of the present invention, the link may be bidirectional (both the AR element 84 and the media 14 may be followed so both act as anchors and as targets). The present invention also comprehends other AR links, e.g., many-to-many links, AR links that cause the target document to replace the document being displayed, and AR links which transclude the linked target as a fragment that replaces the link anchor within the AR element 84. In still other embodiments of the invention 100, the AR links 84 may be followed automatically by a program or the like which traverses AR links so as to gather all available linked media 14 in a Web spider or crawler. In such embodiments of the invention 100 a user 20, may for example, collect relevant moment 10 content (media 14) such as coupons 36 for redemption 160 as appropriate at a preferred store 72 (shopping location store 250) (FIG. 46) as appropriate to items selected by a user 20 in a shopping cart 42, at for example, a frictionless checkout kiosk 318 (FIG. 44).

In other embodiments of the moment system 100, an AR link 84 may have various active linked components, e.g., an avatar's face, hand, body leg, sign, or the like) may each link to different media 14 content depending on some relevant filtered characteristic 210. Additionally, an AR link 84 may be altered by subsequent users 20. AR links may be one-to-many, extended link, or a multi-tailed link which leads to multiple endpoints (multivalued).

In operation of an embodiment of the moment system 100, a user 20 with an enrolled smart device (handy) 18 may gesture, press, or hover their finger over an AR link 84 to open (access) the linked content (media) 14. Various linking protocols may be employed in embodiments of the moment system 100, for example: Xlink; Wikis; OpenSimulator; Open Cobalt; Permalinks; and HTML (URL or the like) links.

Referring to FIG. 13, a block diagram disclosed, the block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 100 (e.g., system 100) in the example form of a computer system, within which instructions (e.g., software, a program, an application, an applet, an app, or other executable code) for causing the machine 100 to perform any one or more of the methodologies discussed herein can be executed. Additionally, or alternatively, the instruction can implement any embodiment, and so forth. The instructions transform the general, non-programmed machine into a particular machine programmed to carry out the described and illustrated functions in the manner described. In alternative embodiments, the machine 100 operates as a standalone device or can be coupled (e.g., networked) to other machines. In a networked deployment, the machine 100 may operate in the capacity of a server machine or a client machine in a server-client network environment, or as a peer machine in a peer-to-peer (or distributed) network environment. The machine 100 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions, sequentially or otherwise, that specify actions to be taken by the machine 100. Further, while only a single machine is illustrated, the term "machine" shall also be taken to include a collection of machines 100 that individually or jointly execute the instructions to perform any one or more of the methodologies discussed herein.

The machine 100 can include processors, memory/storage, and I/O components, which can be configured to communicate with each other such as via a bus. In an example embodiment, the processors (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor and processor that may execute instructions. The term "processor" is intended to include multi-core processor that may comprise two or more independent processors (sometimes referred to as "cores") that can execute instructions contemporaneously. Although FIG. 13 may include multiple processors, the machine may include a single processor with a single core, a single processor with multiple cores (e.g., a multi-core processor), multiple processors with a single core, multiple processors with multiples cores, or any combination thereof.

The memory/storage can include a main memory, a static memory, or other memory storage, and a storage unit, both accessible to the processors such as via the bus. The storage unit and memory store the instructions embodying any one or more of the methodologies or functions described herein. The instructions can also reside, completely or partially, within the memory, within the storage unit, within at least one of the processors (e.g., within the processor's cache memory), or any suitable combination thereof, during execution thereof by the machine. Accordingly, the memory, the storage unit, and the memory of the processors are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single-medium or multiple-media (e.g., a centralized or distributed database, or associated caches and servers) able to store instructions. The term "machine-readable medium" shall also be taken to include any medium, or combination of multiple media, that is capable of storing instructions (e.g., instructions) for execution by a machine (e.g., machine 100), such that the instructions, when executed by one or more processors of the machine 100 (e.g., processors), cause the machine 100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components can include a wide variety of components to receive input, provide output, produce output, transmit information, exchange information, capture measurements, and so on. The specific I/O components that are included in a particular machine will depend on the type of machine. For example, portable machines such as mobile phones will likely include a touch input device or other such input mechanisms, while a headless server machine will likely not include such a touch input device. It will be appreciated that the I/O components can include many other components that are not shown in FIG. 3C. The I/O components are grouped according to functionality merely for simplifying the following discussion and the grouping is in no way limiting. In various example embodiments, the I/O components can include output components and input components. The output components can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components can include biometric components, motion components, environmental components, or position components among a wide array of other components. For example, the biometric components can include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components can include acceleration sensor components (e.g., an accelerometer), gravitation sensor components, rotation sensor components (e.g., a gyroscope), and so forth. The environmental components can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components may include communication components operable to couple the machine to a network or devices via a coupling and a coupling, respectively. For example, the communication components include a network interface component or other suitable device to interface with the network. In further examples, communication components include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 18 may be another machine or any of a wide variety of peripheral devices (e.g., a peripheral device coupled via a USB).

Moreover, the communication components can detect identifiers or include components operable to detect identifiers. For example, the communication components can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network or a portion of the network may include a wireless or cellular network, and the coupling may be a Code Division Multiple Access (CDMA) connection, a Global System for Mobile communications (GSM) connection, or other type of cellular or wireless coupling. In this example, the coupling can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions can be transmitted or received over the network using a transmission medium via a network interface device (e.g., a network interface component included in the communication components) and utilizing any one of a number of well-known transfer protocols (e.g., HTTP). Similarly, the instructions can be transmitted or received using a transmission medium via the coupling (e.g., a peer-to-peer coupling) to devices. The term "transmission medium" shall be taken to include any intangible medium that is capable of storing, encoding, or carrying the instructions for execution by the machine 1300, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

We claim:

1. A system for recording and sharing moments with enrolled readers in proximity to the locus of a recorded moment, the system comprising:
   a recorder including at least one processor and a communication link with a server,
      the recorder configured to generate at least one moment file including a location; a pose; at least one recorder-introduced filter selected from a group including a moment age, a moment duration, a moment creation time, a moment medium, a moment subject or interest, or a moment theme; and at least one element selected from a group including a coupon, an advertisement, a menu, or shopping cart;
      the at least one recorder-introduced filter including an area of accessibility associated with the location;
      said recorder configured to transmit the at least one moment file to the server by the communication link;
   the at least one moment file accessible to at least one reader, the at least one reader associated with:
      at least one reader-introduced filter;
      location-based services;
      and
      a communication transceiver for periodically reporting at least one of a reader pose, a reader position, an expected reader position, or said at least one reader filter to said server;
   the at least one reader configured to receive a notification when the at least one reader is within the area of accessibility and the at least one recorder-introduced filter matches the at least one reader-introduced filter;
   the at least one reader configured to display the at least one moment file via the notification;
   wherein the area of accessibility is located within an augmented property of an augmented reality estate system.

2. The system for recording and sharing moments with enrolled readers in proximity to the locus of a recorded moment of claim 1, wherein the server is configured to send the notification to the at least one reader.

3. The system for recording and sharing moments with enrolled readers in proximity to the locus of a recorded moment of claim 2, wherein the communication link of the recorder includes a wired or a wireless connection.

4. The system for recording and sharing moments with enrolled readers in proximity to the locus of a recorded moment of claim 1, wherein the recorder is operable by an augmented property holder of the augmented property.

5. The system for recording and sharing moments with enrolled readers in proximity to the locus of a recorded moment of claim 4, wherein the augmented property holder is determined by real property ownership.

6. The system for recording and sharing moments with enrolled readers in proximity to the locus of a recorded moment of claim 1, wherein the reader-introduced filter includes at least one of a reader permission, a moment age, a moment creation time, a moment medium, a moment subject or interest, a moment theme, or a type of media.

7. The system for recording and sharing moments with enrolled readers in proximity to the locus of a recorded moment of claim 1, wherein the recorder includes at least one of a terminal or a second reader.

8. The system for recording and sharing moments with enrolled readers in proximity to the locus of a recorded moment of claim 1, wherein the expected reader position is determined by at least one of a Continuous Time Series Markov Model; an Adaboost-Markov Model; a Geographic-Temporal-Semantic-Based Location Prediction; or a Poisson Regression Analysis.

9. The system for recording and sharing moments with enrolled readers in proximity to the locus of a recorded moment of claim 1, wherein one or more advertisements are placed at the expected or the known reader position along with the at least one moment file.

10. The system for recording and sharing moments with enrolled readers in proximity to the locus of a recorded moment of claim 1, wherein the at least one moment file is automatically placed by the recorder according to a recommender system.

11. The system for recording and sharing moments with enrolled readers in proximity to the locus of a recorded moment of claim 1, wherein the recorder is configured to place the at least one moment file at a plurality of expected reader locations.

12. The system for recording and sharing moments with enrolled readers in proximity to the locus of a recorded moment of claim 1, wherein the at least one moment file is placed at a location remote from the recorder.

13. The system for recording and sharing moments with enrolled readers in proximity to the locus of a recorded moment of claim 12, wherein the at least one moment file is placed using one or more location and position services.

14. The system for recording and sharing moments with enrolled readers in proximity to the locus of a recorded moment of claim 1, wherein the location of the moment file is tagged to an object.

15. The system for recording and sharing moments with enrolled readers in proximity to the locus of a recorded moment of claim 14, wherein:
- the augmented property and the area of accessibility corresponds to a real property under the control of a user; and
- the tagged object is located within the real property.

16. The system for recording and sharing moments with enrolled readers in proximity to the locus of a recorded moment of claim 15, wherein the tagged object includes a smart device connected to at least one of a network or a location service, the smart device selected from a group including an appliance, a control, or a security system.

17. The system for recording and sharing moments with enrolled readers in proximity to the locus of a recorded moment of claim 1, wherein the moment file includes an AR hyperlink represented by one of an AR (a) logo, (b) avatar, (c) emoji, (d) 3D element, or (e) icon.

18. The system for recording and sharing moments with enrolled readers in proximity to the locus of a recorded moment of claim 1, wherein:
- the augmented property corresponds to a real property under the control of a real property owner; and
- the at least one reader includes at least one guest of the real property owner, the at least one guest located within the augmented property.

* * * * *